US012803928B2

(12) United States Patent
Mysore et al.

(10) Patent No.: US 12,803,928 B2
(45) Date of Patent: Nov. 17, 2026

(54) DETECTING ANOMALOUS RESOURCE DISTRIBUTION PATTERNS IN DISTRIBUTED ARTIFICIAL INTELLIGENCE-BASED AGENT NETWORKS

(71) Applicant: Citibank, N.A., New York, NY (US)

(72) Inventors: Vishal Mysore, Mississauga (CA); Prithvi Narayana Rao, Allen, TX (US); Payal Jain, London (GB); Sawyer Uzzell, New York, NY (US); Joao Paulo De Castro Marchese, Miami, FL (US); James Myers, Clearwater, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/574,227

(22) Filed: Mar. 20, 2026

(65) Prior Publication Data

US 2026/0222364 A1 Jul. 30, 2026

Related U.S. Application Data

(63) Continuation of application No. 19/333,687, filed on Sep. 19, 2025, now Pat. No. 12,592,897, which is a (Continued)

(51) Int. Cl.
*H04L 47/70* (2022.01)
*H04L 67/1097* (2022.01)

(52) U.S. Cl.
CPC ........ *H04L 47/822* (2013.01); *H04L 67/1097* (2013.01)

(58) Field of Classification Search
CPC ............... H04L 47/822; H04L 67/1097; G06F 9/44505; G06F 8/35
See application file for complete search history.

(56) References Cited

U.S. PATENT DOCUMENTS 6,546,545 B1 4/2003 Honarvar et al.
9,858,828 B1 1/2018 Fuka
(Continued)

FOREIGN PATENT DOCUMENTS

CA 3089009 A1 * 7/2019 ............... H04L 9/50
CN 108764908 A * 11/2018 ......... G06Q 30/0185
(Continued)

OTHER PUBLICATIONS

Lai et al., Towards a Science of Human-AI Decision Making: A Survey of Empirical Studies, arXiv:2112.11471v1 [cs.AI] Dec. 21, 2021; Total pp. 36 (Year: 2021).
(Continued)

*Primary Examiner* — Shean Tokuta
(74) *Attorney, Agent, or Firm* — Ashurst Perkins Coie US LLP; Sumedha Ahuja; Willa Wu

(57) ABSTRACT

Systems and methods disclosed herein automatically detect, analyze, and mitigate anomalous resource distribution among artificial intelligence (AI)-based agents within a distributed computational network. The system receives a resource allocation request specifying computational resources, agent parameters, and performance objectives for a network of agents. A first AI model set monitors agent activity by tracking resource consumption and behavioral deviations from baseline profiles. The system compares resource usage of agents with historical norms and/or predetermined thresholds to generate an anomaly score for each agent. A second AI model set aggregates scores to construct a multi-dimensional data structure that indicates the comparison and anomaly score. The system ranks agents by anomaly severity to isolate agents with high scores (e.g., misaligned agents), and reallocates resources and updates access privileges for the misaligned agents.

20 Claims, 18 Drawing Sheets

Related U.S. Application Data continuation-in-part of application No. 19/288,027, filed on Aug. 1, 2025, now Pat. No. 12,526,244, which is a continuation-in-part of application No. 19/217,943, filed on May 23, 2025, now Pat. No. 12,450,037, and a continuation-in-part of application No. 19/179,996, filed on Apr. 15, 2025, now Pat. No. 12,587,488, which is a continuation of application No. 18/434,687, filed on Feb. 6, 2024, now Pat. No. 12,126,546.

(56) References Cited

U.S. PATENT DOCUMENTS

| | | | | |
|---|---|---|---|---|
| 10,121,025 | B1 * | 11/2018 | Rice | G06F 21/10 |
| 10,447,483 | B1 * | 10/2019 | Su | H04L 9/3226 |
| 10,951,485 | B1 | 3/2021 | Hermoni et al. | |
| 11,153,177 | B1 | 10/2021 | Hermoni et al. | |
| 11,562,078 | B2 | 1/2023 | Sabourin et al. | |
| 11,573,848 | B2 | 2/2023 | Linck et al. | |
| 11,663,409 | B2 | 5/2023 | Terry et al. | |
| 11,810,185 | B2 | 11/2023 | Joglekar et al. | |
| 11,880,836 | B1 | 1/2024 | Nemethi | |
| 11,960,386 | B2 | 4/2024 | Indani et al. | |
| 12,107,869 | B1 | 10/2024 | Kannan et al. | |
| 12,155,781 | B1 | 11/2024 | Helfgott et al. | |
| 12,526,244 | B2 * | 1/2026 | Bhat | G06F 8/35 |
| 12,556,493 | B2 * | 2/2026 | Bhat | G06F 9/44505 |
| 12,592,897 | B2 * | 3/2026 | Mysore | G06F 9/5005 |
| 2018/0121923 | A1 * | 5/2018 | Uhr | G06Q 20/223 |
| 2018/0219683 | A1 * | 8/2018 | Deery | H04L 9/3239 |
| 2018/0285970 | A1 * | 10/2018 | Snow | H04L 9/3247 |
| 2018/0316502 | A1 * | 11/2018 | Nadeau | H04L 9/085 |
| 2019/0156429 | A1 * | 5/2019 | Beckmann | G06Q 20/3827 |
| 2019/0228133 | A1 * | 7/2019 | Ansari | G06F 21/10 |
| 2019/0334704 | A1 * | 10/2019 | Keskar | G06F 21/606 |
| 2019/0382239 | A1 * | 12/2019 | Witczak | B66B 1/3407 |
| 2020/0232194 | A1 * | 7/2020 | Periaswamy | G01F 1/32 |
| 2021/0078512 | A1 * | 3/2021 | Ghannam | H04W 4/40 |
| 2021/0256113 | A1 * | 8/2021 | Stott | H04L 9/3239 |
| 2021/0263083 | A1 * | 8/2021 | Hwang | G06Q 50/06 |
| 2021/0297234 | A1 * | 9/2021 | Le Callonnec | H04L 9/50 |
| 2022/0043441 | A1 * | 2/2022 | Huang | H04L 63/123 |
| 2022/0086162 | A1 | 3/2022 | Badawy et al. | |
| 2022/0109685 | A1 | 4/2022 | Hankins et al. | |
| 2022/0138327 | A1 | 5/2022 | Panicker et al. | |
| 2022/0147815 | A1 | 5/2022 | Conwell et al. | |
| 2022/0286474 | A1 | 9/2022 | Kuppa et al. | |
| 2022/0294863 | A1 * | 9/2022 | Floyd | B60W 50/0205 |
| 2022/0400135 | A1 | 12/2022 | Gamra | |
| 2022/0405397 | A1 | 12/2022 | Golan et al. | |
| 2022/0417274 | A1 | 12/2022 | Madanahalli et al. | |
| 2023/0007039 | A1 | 1/2023 | Waplington | |
| 2023/0033317 | A1 | 2/2023 | Lin et al. | |
| 2023/0076795 | A1 | 3/2023 | Indani et al. | |
| 2023/0252393 | A1 | 8/2023 | Orzechowski et al. | |
| 2023/0259860 | A1 | 8/2023 | Sarkar | |
| 2023/0360031 | A1 * | 11/2023 | DeLuca | G06Q 20/3821 |
| 2023/0362200 | A1 | 11/2023 | Crabtree et al. | |
| 2023/0379350 | A1 | 11/2023 | Barton et al. | |
| 2024/0007479 | A1 * | 1/2024 | Doney | H04L 63/12 |
| 2024/0015021 | A1 * | 1/2024 | Uchida | G06F 21/31 |
| 2024/0089103 | A1 * | 3/2024 | Chen | H04L 9/321 |
| 2024/0095220 | A1 * | 3/2024 | Isaacs | G06F 16/955 |
| 2024/0177155 | A1 * | 5/2024 | Chen | G06Q 20/065 |
| 2024/0243933 | A1 * | 7/2024 | Fujita | H04L 9/50 |
| 2024/0291664 | A1 * | 8/2024 | Meirosu | H04L 9/50 |
| 2024/0356984 | A1 | 10/2024 | Gamra | |
| 2024/0388424 | A1 * | 11/2024 | Anderson | H04L 67/34 |
| 2024/0403445 | A1 | 12/2024 | Straub et al. | |
| 2024/0420116 | A1 | 12/2024 | Ramde et al. | |
| 2024/0420124 | A1 * | 12/2024 | Ramde | G06F 21/6245 |
| 2024/0422291 | A1 | 12/2024 | Ramde et al. | |
| 2025/0021464 | A1 | 1/2025 | Lang et al. | |
| 2025/0039104 | A1 * | 1/2025 | Matthews | H04L 47/32 |
| 2025/0077639 | A1 * | 3/2025 | Remer | G06F 21/44 |
| 2025/0158637 | A1 * | 5/2025 | Cooper | G06N 3/0455 |
| 2025/0173734 | A1 * | 5/2025 | Aidan | G06Q 30/0185 |
| 2025/0245351 | A1 * | 7/2025 | Rahman | G06F 11/3684 |
| 2025/0335487 | A1 | 10/2025 | Jackson et al. | |
| 2025/0348707 | A1 | 11/2025 | Myers et al. | |
| 2025/0356026 | A1 * | 11/2025 | Myers | G06F 11/3684 |
| 2025/0358240 | A1 * | 11/2025 | Bhat | G06F 8/35 |
| 2026/0012430 | A1 * | 1/2026 | Bhat | H04L 47/822 |
| 2026/0012431 | A1 * | 1/2026 | Bhat | H04L 47/822 |
| 2026/0012432 | A1 * | 1/2026 | Bhat | G06F 9/5005 |
| 2026/0019379 | A1 * | 1/2026 | Bhat | G06F 9/44505 |
| 2026/0019380 | A1 * | 1/2026 | Bhat | G06F 9/44505 |
| 2026/0044610 | A1 * | 2/2026 | Rajaretnam | G06F 11/3006 |
| 2026/0050919 | A1 * | 2/2026 | Orentlicher | G06Q 20/401 |
| 2026/0222364 | A1 * | 7/2026 | Mysore | H04L 47/822 |

FOREIGN PATENT DOCUMENTS

| | | | | | |
|---|---|---|---|---|---|
| CN | 111369332 | A | * | 7/2020 | G06Q 40/125 |
| CN | 112581126 | A | * | 3/2021 | H04L 63/10 |
| CN | 118969216 | | | 11/2024 | |
| EP | 4191976 | | | 6/2023 | |
| JP | 2024076326 | A | * | 6/2024 | |
| JP | 2024114268 | A | * | 8/2024 | H04L 9/3236 |
| JP | 2024124337 | A | * | 9/2024 | |
| JP | 2022150778 | | | 12/2024 | |
| KR | 20220083931 | | | 7/2022 | |
| WO | WO-2019064658 | A1 | * | 4/2019 | H04L 9/50 |
| WO | 2020216078 | | | 10/2020 | |
| WO | WO-2020233236 | A1 | * | 11/2020 | G06Q 40/04 |
| WO | WO-2021127575 | A1 | * | 6/2021 | H04W 12/069 |
| WO | WO-2022102418 | A1 | * | 5/2022 | G09C 1/00 |
| WO | WO-2024083292 | A1 | * | 4/2024 | G06Q 50/26 |
| WO | WO-2024164550 | A1 | * | 8/2024 | H04L 63/123 |
| WO | 2024076387 | | | 11/2024 | |
| WO | WO-2024238638 | A2 | * | 11/2024 | H04L 9/3247 |

OTHER PUBLICATIONS

Sumuk Shashidhar et al., 'Democratizing LLMs: An Exploration of Cost-Performance Trade-offs in Self-Refined Open-Source Models', arXiv:2310.07611v2, pp. 1-15, Oct. 2023.

ANTHROP/C, Mapping the Mind of a Large Language Model, https://www.anthropic.com/research/mapping-mind-language-model, May 21, 2024.

Shah, et al., Decomposing and Editing Predictions by Modeling Model Computation, arXiv:2404.11534v1 [cs.LG] Apr. 17, 2024, 5 pages.

* cited by examiner

DETECTING ANOMALOUS RESOURCE DISTRIBUTION PATTERNS IN DISTRIBUTED ARTIFICIAL INTELLIGENCE-BASED AGENT NETWORKS

CROSS-REFERENCE TO RELATED APPLICATION(S)

This application is a continuation of U.S. patent application Ser. No. 19/333,687, entitled "DETECTING ANOMALOUS RESOURCE DISTRIBUTION PATTERNS IN DISTRIBUTED ARTIFICIAL INTELLIGENCE-BASED AGENT NETWORKS" filed on Sep. 19, 2025 which is a continuation-in-part of U.S. patent application Ser. No. 19/288,027, entitled "ENCRYPTED AUTONOMOUS AGENT VERIFICATION IN MULTI-TIERED DISTRIBUTED SYSTEMS ACROSS GLOBAL OR CLOUD NETWORKS" filed on Aug. 1, 2025, which is a continuation-in-part of U.S. patent application Ser. No. 19/217,943 entitled "AUTOMATIC GENERATION AND EXECUTION OF COMPUTER-EXECUTABLE COMMANDS USING ARTIFICIAL INTELLIGENCE MODELS" filed on May 23, 2025. U.S. patent application Ser. No. 19/288,027 is further a continuation-in-part of U.S. patent application Ser. No. 19/179,996 entitled "SYSTEMS AND METHODS FOR DETERMINING RESOURCE AVAILABILITY ACROSS GLOBAL OR CLOUD NETWORKS" and filed Apr. 15, 2025, which is a continuation of U.S. patent application Ser. No. 18/434,687 (now U.S. Pat. No. 12,126,546 issued Oct. 22, 2024) entitled "SYSTEMS AND METHODS FOR DETERMINING RESOURCE AVAILABILITY ACROSS GLOBAL OR CLOUD NETWORKS" and filed Feb. 6, 2024.

U.S. patent application Ser. No. 19/333,687 is further a continuation-in-part of U.S. patent application Ser. No. 19/182,585, entitled "DYNAMIC MULTI-MODEL MONITORING AND VALIDATION FOR ARTIFICIAL INTELLIGENCE MODELS" filed on Apr. 18, 2025, which is a continuation of U.S. patent application Ser. No. 18/947,102, entitled "DYNAMIC MULTI-MODEL MONITORING AND VALIDATION FOR ARTIFICIAL INTELLIGENCE MODELS" filed on Nov. 14, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" filed on May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024.

U.S. patent application Ser. No. 18/947,102 is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

U.S. patent application Ser. No. 18/947,102 is further a continuation-in-part of U.S. patent application Ser. No. 18/739,111 entitled "END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS" and filed Jun. 10, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications is incorporated herein by reference in their entirety.

BACKGROUND

An artificial intelligence (AI) agentic model ("agent"), whether autonomous or semi-autonomous, refers to a persistent software entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks.

The actions autonomously executed by agents are responsive to their respective objective functions. For example, an agent's objective function may direct the agent to minimize task completion latency. During autonomous execution, the agent can determine a degree of expected utility of candidate actions by evaluating the actions against the agent's objective function and select executable actions that align with the agent's assigned objectives within the imposed operational constraints or boundaries set by the system the agent is interacting with. However, unlike rule-based programming, AI agents employ machine learning algorithms to assess data and determine actions based on probabilistic models. While this grants AI agents autonomy for real-time operation, AI agent operations are less transparent than rule-based programming, which can result in unpredictable or unverified behaviors within the system.

Figure 1:
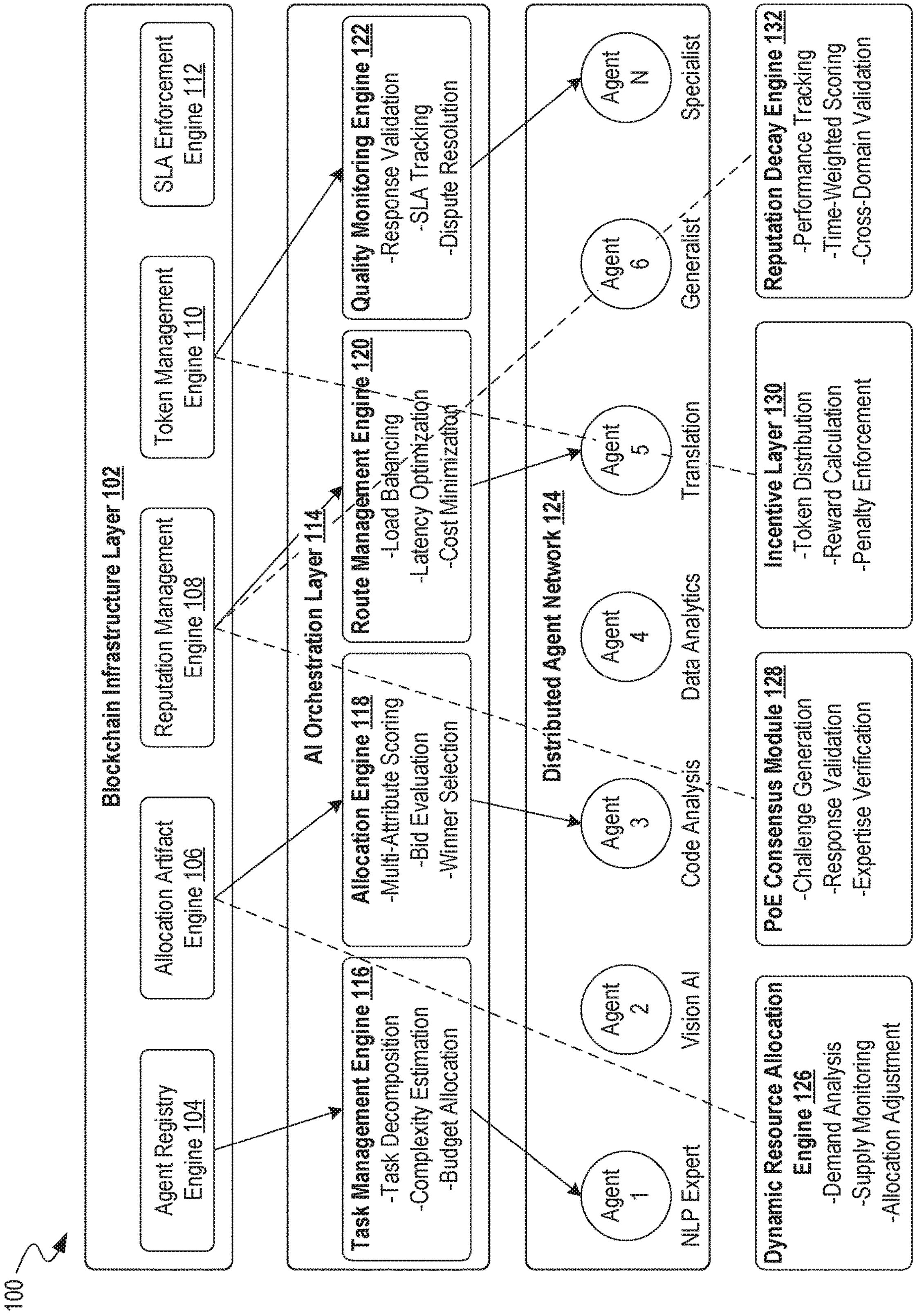
FIG. 1 illustrates an example environment of a knowledge registry for artificial intelligence (AI)-based agents, in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained. In contrast, AI agents are persistent software entities characterized by objective functions and varying degrees of autonomy. Agents can perceive environments, make decisions, execute actions, and optimize their behavior with respect to defined objective functions. Autonomous or semi-autonomous agents can independently process incoming data, determine action plans, and dynamically invoke APIs, databases, other agents, or external services to execute tasks.

Distributed AI agent networks introduce additional technical complexity compared to single-agent architectures. In these systems, multiple agents are deployed across a network (often spanning multiple machines, cloud instances, or edge devices), with each agent maintaining its own computational resources (CPU, GPU, memory), local knowledge base, and/or processing logic. Agents can communicate using standardized protocols (e.g., HTTP, gRPC, message queues) and can coordinate actions or share state with other agents in the network. Each agent can independently perceive its local environment, make decisions, and execute actions, but also collaborate to achieve shared goals.

A technical challenge in distributed AI agent networks arises from the conflict between individual agent objective functions and collective network goals. Each agent operates according to its own defined objective function that specifies reward maximization criteria, penalty avoidance thresholds, and/or performance optimization targets based on local computational metrics such as task completion time, resource utilization efficiency, output quality scores, and so forth. The individual objective functions cause agents to seek to maximize their own utility functions without considering network-wide performance metrics. The absence of coordinated reward signals that align individual agent objective functions with collective network goals results in suboptimal resource allocation patterns where agents may hoard computational resources, avoid challenging tasks that could benefit the network, and/or optimize for local performance metrics that conflict with global network efficiency.

Further, agent collaboration in conventional distributed AI agent networks typically requires agents to establish direct, point-to-point network connections for communication and coordination. This is often implemented using peer-to-peer protocols, sockets, or direct API calls. While effective for small networks, this approach does not scale well. As the number of agents increases, the number of required connections grows (e.g., quadratically), which leads to network congestion and increased overhead. Due to the network congestion, agents can receive outdated or incomplete information, which potentially leads to inconsistent decision-making and/or potential knowledge conflicts. Additionally, within distributed networks, it is difficult to discover agents with complementary or specialized capabilities, which results in suboptimal task allocation and resource utilization.

In addition, in conventional multi-tiered distributed systems that employ semiautonomous or autonomous agents, the organizational structure is typically arranged in hierarchical tiers such as primary entities, direct providers, and upstream sub-agents or subcontractors. Agents situated at each tier function as semi-independent or independent actors operating within specific domains of operations, such as receiving instructions, exchanging data, and/or executing tasks within their defined scope. Data, task assignments, and control decisions usually flow downward from first-tier (e.g., primary entity) agents to higher-tier (e.g., sub-agent) agents, while operational updates and results propagate upward.

However, in conventional multi-tiered distributed systems, organizations face significant challenges regarding visibility into second-tier and higher-tier suppliers or subcontractors. Typically, primary entities engage directly with their immediate providers and have little or no operational insight into the upstream/downstream networks managed by subcontractors or other providers. This problem is exacerbated in environments employing semiautonomous and/or autonomous agents, which are programmed to execute actions, make operational decisions, and invoke external services independently, without direct intervention or real-time oversight from the primary entity. In particular, once an initial instruction or delegation is issued to a first-tier agent, that agent may, according to its internal objective functions and contextual inputs, further delegate tasks, trigger computational operations, and/or interact with additional data sources and service endpoints upstream. As each agent in the hierarchy operates with varying degrees of autonomy and may utilize its own authenticated interfaces, operational logic, and data sources, the resulting decision processes, transactions, and control signals often propagate through layers of the system without the knowledge of the primary organizational entity. Thus primary entities (and agents of the primary entities) are unable to observe, audit, or even reconstruct the specific actions and decisions executed by second-tier or higher-tier agents when those agents use their autonomy to interact with external computational resources. Even if the agent of the primary entity were to directly contact the provider agents and/or sub-agents to verify compliance, the compliance proof submitted by the provider agents and/or sub-agents risks disclosure of sensitive or otherwise protected information. Therefore, conventional methods used to manage agent interactions in distributed networks are often reactive rather than proactive. For example, a primary entity may only become aware of inventory shortages, regulatory failures, or supply chain interruptions after receiving incomplete goods, delayed deliveries, or compliance notifications from its immediate provider, who in turn has consolidated data from upstream sub-agents after the event has propagated.

Attempting to create a system to manage distributed AI agent networks in view of the available conventional approaches created significant technological uncertainty, especially in environments comprised of large, heterogeneous agent populations with different capabilities and dynamic operational requirements. Creating such a system requires addressing several unknowns in conventional distributed agent coordination techniques, including the scalability limitations, and lack of verification in existing distributed AI agent networks.

To overcome the technological uncertainties, the inventors systematically evaluated multiple design alternatives. For example, the inventors evaluated systems that relied on centralized registries, wherein a single registry maintains records of all agent credentials, permissions, and capabilities. While this system offered consistency in agent verification, such that only a single registry needed to be queried to determine agent capabilities and validate agent permissions, the system was inflexible and created single points of failure due to bottlenecks when the central authority becomes overloaded, security vulnerabilities when the centralized system is compromised, and complete system disruption when the central authority becomes unavailable. Another alternative relied on manual monitoring and review of agent behavior logs, in which human operators analyze recorded events such as state transitions, actions taken, and messages exchanged to detect anomalous operations. Although manual review enabled validation of agent behavior, the system was unable to scale to large networks with high-throughput data streams and could not provide real-time or near-real-time detection of anomalous operations.

The inventors also evaluated systems that used static resource allocation models where computational resources, task assignments, and compensation (e.g., computational resource-based or monetary resource-based compensation) structures remain fixed regardless of current network conditions. These static allocation systems assign predetermined resource amounts to agents based on initial capability assessment and maintain these allocations throughout the agent's network participation. While static allocation provided predictable resource distribution that simplified agent selections, the system was unable to adapt to changing network dynamics including varying agent workloads, agent historical performances, fluctuating demand for specific capabilities, and changing agent specializations. The static nature of these systems resulted in resource waste when high-performing agents remained underutilized while lower-performing agents received excessive allocations, and prevented the system from responding to real-time supply and demand imbalances that occur as network conditions change over time. Further, agents themselves are not "incentivized" via their objective function to improve one or more performance metrics for the benefit of the overall network of agents, since the resources allocated to the agent remained static.

Additionally, the inventors evaluated systems that relied on periodic quality assessment procedures where agent performance is evaluated at fixed intervals using predetermined test cases and evaluation criteria. These periodic assessment systems execute standardized performance tests on scheduled cycles and generate quality reports that document agent capabilities and performance levels. While periodic assessment provided systematic evaluation of agent performance that enabled consistent quality measurements across all network participants, the system was unable to detect performance degradation, quality violations, or other anomalous operations that occur between assessment cycles. The fixed assessment schedule also prevented real-time or near-real-time quality validation during actual task execution, meaning that quality issues could persist undetected for extended periods before the next scheduled evaluation cycle, and could potentially affect multiple tasks before corrective action could be taken.

The inventors further evaluated systems that provided uniform compensation and resource allocation to all agents regardless of their performance levels, specialization depth, or contributions to network efficiency. The uniform allocation systems distribute identical resource amounts and task assignments to all participating agents based on basic capability matching without considering performance history, specialization value, or network contribution metrics. While uniform allocation ensured equal treatment of all agents that simplified system administration and prevented disputes over resource distribution, agents were not incentivized, via their objective functions that define goal-seeking behaviors through reward maximization and penalty avoidance, to improve their performance. Without performance-based differentiation, high-performing agents received the same resources as underperforming agents, specialized agents with rare capabilities were compensated identically to generalist agents, and agents had no incentive to improve their performance for the benefit of the overall network.

As such, the inventors have developed systems (hereinafter "data monitoring platform") and related methods to automatically register, monitor, and authenticate distributed AI agents and their operational contexts using a distributed or federated ledger-based agent knowledge registry. The data monitoring platform obtains a registration or query request (e.g., from an AI agent, orchestrator, or user interface) to identify or store operational context linked to each AI-based agent, where the operational context includes agent identifiers, domain indicators such as natural language processing or computer vision expertise, data access permissions defined by cryptographic credentials, and workflow contribution data specifying computational capabilities. The data monitoring platform determines a feature set of agent metadata and operational parameters using a first AI model set that applies tokenization and semantic analysis operations to extract structured capability profiles. The data monitoring platform dynamically generates a cryptographically verifiable registry record set using a second AI model set (same as or different from the first AI model set) that applies hash function(s) (e.g., SHA-256 or Keccak-256) to convert operational context data into fixed-length hash values based on the operational feature set, to be stored in a distributed or federated ledger database (e.g., one implemented as blockchain nodes) maintaining synchronized copies of agent registration data. The data monitoring platform automatically executes registry updating, agent selection, or operational verification workflows using a third AI model set (same as or different from the first and/or second AI model sets) that compares requested cryptographic hashes against stored registry hashes (e.g., using Merkle proof verification) and generates query responses that identify agents matching specified operational contexts to maintain records that trace inter-agent interactions (e.g., through timestamped blockchain transactions).

Further, the data monitoring platform disclosed herein automatically authorizes, audits, and manages usage of protected digital content (such as intellectual property) via agentic AI models. A data access/usage request is received (e.g., from a graphical user interface or command line interface) that is associated with digital assets licensed from third parties, where the request includes unique cryptographic identifiers of protected digital data and requested permission sets specifying usage modalities, access controls, time-based constraints, and resource limitations. The data monitoring platform uses a first AI agent set to identify the digital content and retrieve corresponding access policies from a distributed database that stores machine-readable policy sets describing permissible interactions, geographic restrictions, modification rights, and compensation structures. The data monitoring platform uses a second AI agent set (same as or different from the first AI agent set) to evaluate the request against the retrieved policy to map requested interactions to policy constraints and generate a permission set that satisfies access policy requirements and/or settlement instructions. The data monitoring platform uses a third AI agent set (same as or different from the first and/or second AI agent sets) to embed digital watermarks and/or cryptographic signatures created using private key encryption into the accessed content. The data monitoring platform can record an audit trail of access events including timestamps, user identifiers, usage metrics, and so forth in a distributed or federated ledger or database (e.g., one implemented as blockchain smart contracts) that automatically execute licensing terms and monitor usage compliance.

Additionally, the data monitoring platform disclosed herein automatically evaluate, select, and coordinate AI-based agents for collaborative distributed task execution. The data monitoring platform obtains a task specification request defining a computational requirement set including processing power specifications, data format requirements, and knowledge domain expertise, a performance metric set specifying accuracy thresholds, response time limits, and quality benchmarks, and an available resource set comprising monetary resources for agent compensation and computational resources for task execution for one or more tasks to be executed by a network of AI-based agents (e.g., ones distributed across blockchain nodes). A first AI model set generates domain-specific test datasets and validates prospective agents by transmitting test datasets to agent input layers, receiving digital fingerprints generated by applying hash functions to agent output content, and comparing agent-generated fingerprints against predetermined hash value sets stored on a distributed or federated ledger to verify capability claims within fault tolerance thresholds. A second AI model set constructs a multi-dimensional scoring data structure for each agent by accessing historical performance metrics from, for example, blockchain transaction records, and determining a weighted composite score that combines reputation scores from peer evaluations, task completion rates from execution history, and so forth. The second AI model set generates scoring matrices that rank agents across multiple performance attributes. The data monitoring platform selects a subset of AI-based agents, that, for example, maximize total performance scores while satisfying budget constraints and task requirements. The data monitoring platform ranks the agents according to composite scores, and allocates resources proportional to each agent's composite score. A third AI model set coordinates and executes distributed computer-executable workflows across the selected agents by, for example, deploying smart contracts that define performance thresholds and automatic payment triggers.

Moreover, the data monitoring platform disclosed herein automatically detect, analyze, and mitigate anomalous resource distribution among AI-based agents within a distributed computational network. The data monitoring platform accesses operational data from a distributed or federated ledger network for multiple AI-based agents that defines resource allocation traffic data such as transaction records with agent identifiers, timestamps, token usage amounts collected during autonomous execution of computational tasks, expected resource allocation data structures that define allocation thresholds for network communication patterns, and so forth. A first AI model set routes operational data for each agent to validator AI model subsets by characteristics of the operational data and identifying validator AI models trained on data sharing those characteristics. The validator AI model subsets, which may include domain-specific models trained on data sharing common domains with evaluated agents, identify anomalous agent sets by comparing resource allocation traffic data against allocation thresholds and determine agents whose resource consumption, task completion rates, or network communication patterns fail to satisfy predetermined threshold ranges. A second AI model set aggregates anomaly scores from multiple validator assessments to construct multi-dimensional data structures that can be used to identify anomalous AI agents. The data monitoring platform generates computer-executable instructions to automatically block transmittal of additional operational data to anomalous agents through, for example, smart contract enforcement.

Therefore, each agent in a network of a multi-tiered distribution system, including provider agents and sub-agents, regardless of organizational tier, can be monitored and/or otherwise managed. For example, agents can be enabled to generate and submit a machine-verifiable attestation that is cryptographically linked to its unique digital identity and compliance boundaries and recorded within the network (e.g., on a distributed or federated ledger). Therefore, the compliance parameters and obligations are propagated across the entire agent hierarchy in the multi-tiered distribution system so that parent requirements are automatically inherited and can be attested to by descendant agents. The data monitoring platform ensures that the compliance, operational, and decision records for every agent, regardless of tier or domain, are discoverable, independently auditable, and visible to parties in the supply chain. Further, compliance, performance, and/or deviation alerts can be autonomously broadcast and recorded once detected, often before downstream effects can propagate through the system. Rules and boundaries defined at the parent organizational level can be automatically transposed into executable verification requirements so that, as soon as an agent (or any of its dependencies) exhibits noncompliant or anomalous behavior, an alert can be transmitted and remediation can be triggered, e.g., per an encoded policy on the blockchain. This reduces the lag to batch-mode or request-driven workflows As described herein, federated ledgers refer to distributed ledger implementations where a predetermined set of known organizations jointly maintain a shared, append-only database. Federated ledgers are used to replicate transaction records across participating federation members and achieve agreement on transaction ordering and block finalization among federation participants. As a distributed ledger implementation, federated ledgers can include blockchain components (e.g., cryptographic hash functions, distributed state machines that maintain consistent ledger state across multiple independent nodes, immutable transaction logging). Federated ledgers can implement, in addition to blockchain components, a permissioned membership model where participation is restricted to pre-approved organizations rather than open to anonymous participants. Thus, like that of a blockchain, federated ledgers can maintain a trusted shared state across multiple independent computing entities without requiring a central authority.

While the current description provides examples of the rule application engine related to LLMs, one of skill in the art would understand that the disclosed techniques can apply to other forms of machine learning or algorithms, including unsupervised, semi-supervised, supervised, and reinforcement learning techniques. For example, the disclosed data monitoring platform can use model outputs from support vector machine (SVM), k-nearest neighbor (KNN), decision-making, linear regression, random forest, naïve Bayes, or logistic regression algorithms, gradient boosting, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Managing a Knowledge Registry Using the Data Monitoring Platform

FIG. 1 illustrates an example environment 100 of a knowledge registry for artificial intelligence (AI)-based agents, in accordance with some implementations of the present technology. The environment 100 is implemented using components of example AI system 1700 and/or computer system 1800 illustrated and described in more detail with reference to FIG. 17 and FIG. 18, respectively. Implementations of example environment 100 can include different and/or additional components or can be connected in different ways.

The environment 100 includes a blockchain infrastructure layer 102 (that can include an agent registry engine 104, an allocation artifact engine 106, a reputation management engine 108, a token management engine 110, and/or a service level agreement (SLA) engine 112). The blockchain infrastructure layer 102 can be composed of a network of interconnected blockchain nodes that maintain synchronized copies of a distributed ledger containing agent registration data, transaction records, and/or smart contract code. Each blockchain node in the blockchain infrastructure layer 102 can validate new transactions and blocks before adding them to the distributed ledger to prevent unauthorized modifications to agent registry information. The blockchain infrastructure layer 102 stores agent operational contexts as, for example, cryptographically hashed records within blockchain blocks, where each block contains a cryptographic hash of the previous block to create a chain of agent registration and activity data. In some implementations, the blockchain infrastructure layer 102 operates via validator nodes that stake cryptocurrency tokens to participate in block validation and/or via nodes that compete to solve cryptographic puzzles to validate blocks.

The blockchain infrastructure layer 102 includes an agent registry engine 104 that operates as a smart contract-based database system for storing and managing AI agent registration information within the distributed ledger network. The agent registry engine 104 executes smart contract code that defines data structures for agent profiles, such as agent identifiers, domain expertise indicators, performance metrics, and cryptographic credentials used for authentication. When an AI agent submits a registration request, the agent registry engine 104 applies cryptographic hash functions such as SHA-256 or Keccak-256 to convert the agent's operational context data into fixed-length hash values that operate as unique identifiers within the registry.

The agent registry engine 104 organizes these cryptographic hashes using a data structure such as a Merkle tree data structure, where agent profile hashes form leaf nodes, and parent nodes contain hash values computed from their child nodes, thus enabling verification of agent registry data without requiring access to the complete registry database. The agent registry engine 104 enables external systems to search, via query functions, for agents based on domain expertise, availability status, and/or performance thresholds by comparing input hash values against stored registry hashes. In some implementations, the agent registry engine 104 stores agent profiles using IPFS (InterPlanetary File System) distributed storage with hash pointers stored on the blockchain, and/or distributes large agent registry datasets across multiple blockchain nodes.

The blockchain infrastructure layer 102 includes an allocation artifact engine 106 that creates and manages digital artifacts representing resource allocation agreements between AI agents and task requestors. The allocation artifact engine 106 generates allocation artifacts as structured data objects containing task specifications, resource allocation parameters, payment terms, and performance requirements encoded in machine-readable formats such as JSON. Each allocation artifact generated by the allocation artifact engine 106 can include cryptographic signatures from participating parties to prevent unauthorized modifications to allocation terms.

The allocation artifact engine 106 can store allocation artifacts within blockchain transactions such that each artifact receives a unique transaction hash that operates as an immutable reference identifier. The allocation artifact engine 106 can track changes to allocation artifacts over time by creating new blockchain transactions that reference previous artifact versions through cryptographic hash pointers. When resource allocation parameters change during task execution, the allocation artifact engine 106 can automatically generate updated artifacts and broadcast them to network participants via blockchain transaction propagation. In some implementations, the allocation artifact engine 106 holds allocated resources until task completion conditions are verified.

The blockchain infrastructure layer 102 includes a reputation management engine 108 that calculates and maintains reputation scores for AI agents based on their historical performance data stored within the distributed ledger network. The reputation management engine 108 can aggregate performance metrics such as task completion rates, quality assessments, response times, and client feedback ratings to generate numerical reputation scores (e.g., discrete scores, continuous scores, categorical scores, binary scores). The reputation management engine 108 can apply one or more exponential decay functions to weigh recent performance data more heavily than historical data using decay constants that reduce the influence of older performance records by predetermined percentages over specified time periods. The reputation management engine 108 can store the reputation score updates as blockchain transactions that include agent identifiers, new reputation values, contributing performance data, and/or timestamps to create an auditable history of reputation changes.

In some implementations, the reputation management engine 108 implements anti-gaming measures by requiring multiple independent performance validations before updating reputation scores and by detecting coordinated manipulation attempts via voting patterns. The reputation management engine 108 can provide reputation query interfaces that enable external systems to retrieve current reputation scores and historical reputation trends for specific agents using their cryptographic identifiers. In some implementations, the reputation management engine 108 uses reputation scores based on peer endorsements and referrals. In some implementations, the agents maintain separate reputation scores for different areas of expertise.

The blockchain infrastructure layer 102 includes a token management engine 110 that controls the creation, distribution, and destruction of cryptocurrency tokens (e.g., computational resources, monetary resources) used for payments and incentives within the distributed agent network. The token management engine 110 can create new tokens according to predetermined supply schedules, inflation rates, or reward distribution rules encoded in smart contract logic. The token management engine 110, in some implementations, permanently removes tokens from circulation by transferring them to unspendable addresses to create deflationary pressure to maintain token value stability. The token management engine 110 enables agents to lock tokens as collateral to participate in network activities, and can confiscate staked tokens when agents violate network rules or performance agreements. The token management engine 110 can automatically adjust token prices based on different supply and demand dynamics. In some implementations, the token management engine 110 uses multi-signature wallets that require multiple cryptographic signatures to authorize large token transfers. In some implementations, the token management engine 110 implements time-locked contracts that release tokens gradually over specified vesting periods.

The blockchain infrastructure layer 102 includes a service level agreement (SLA) engine 112 that monitors task execution performance against predefined service level requirements and automatically enforces penalties or rewards based on performance outcomes. The SLA engine 112 stores service level agreements as smart contracts containing performance thresholds, measurement criteria, penalty structures, and reward schedules encoded in executable contract code. The SLA engine 112 can continuously collect performance data from executing AI agents, such as response times, accuracy metrics, resource utilization rates, and task completion status indicators. The SLA engine 112 compares collected performance data against SLA thresholds and triggers automated enforcement actions when performance deviations exceed acceptable tolerance ranges. The SLA engine 112 can automatically deduct tokens from agent accounts or reduce reputation scores when SLA violations occur. In some implementations, the SLA engine 112 increases penalty amounts for repeated SLA violations. The SLA engine 112 can automatically transfer bonus to agents who exceed SLA performance requirements by calculating reward amounts using performance multipliers and bonus schedules defined in the SLA contracts. In some implementations, the SLA engine 112 enables agents to challenge SLA violation determinations through arbitration smart contracts.

The environment 100 includes an AI orchestration layer 114 (that can include a task management engine 116, an allocation engine 118, a route management engine 120, and/or a quality monitoring engine 122) that coordinates task distribution and resource allocation between client requests and available AI agents within the distributed network. The AI orchestration layer 114 receives task requests from clients, analyzes task requirements, identifies suitable agents from the distributed agent network 124, and manages the execution workflow from task initiation through completion. The AI orchestration layer 114 can distribute incoming tasks across available agents. The AI orchestration layer 114 can maintain near-real-time or real-time status information about agent availability, current workloads, and performance capabilities by continuously monitoring agent status updates and performance metrics stored in the blockchain infrastructure layer 102. The AI orchestration layer 114 can automatically reassign tasks to alternative agents when primary agents become unavailable or fail to meet performance requirements during task execution. In some implementations, the AI orchestration layer 114 uses machine learning models to predict a task-agent mapping based on historical performance data and current network conditions.

The AI orchestration layer 114 includes a task management engine 116 that decomposes complex client requests into executable subtasks and determines the computational requirements for successful task completion. The task management engine 116 can parse client requests written in natural language (via natural language processing) and extract structured task specifications such as required capabilities, performance constraints, budget limitations, and/or delivery deadlines. The task management engine 116 can partition complex requests into atomic subtasks, where each subtask represents a discrete unit of work that can be assigned to individual AI agents with specific domain expertise. The task management engine 116 estimates computational requirements for each subtask based on a degree of task complexity (e.g., a size, a number of subtasks), data processing volumes, expected execution times, and resource consumption patterns based on historical task execution data. The task management engine 116 generates task dependency graphs that specify the execution order for subtasks, identifying which subtasks must complete before others can begin, and/or which subtasks can execute in parallel to optimize overall completion time. In some implementations, the task management engine 116 uses recursive decomposition to break large tasks into progressively smaller subtasks until each subtask matches the capabilities of available agents.

The AI orchestration layer 114 includes an allocation engine 118 that selects one or more AI agents for task execution based on multiple evaluation criteria. The allocation engine 118 broadcasts task requirements to eligible agents within the distributed agent network 124 and collects agent proposals (e.g., bid responses) that include proposed pricing, estimated completion times, quality guarantees, and/or resource requirements. The allocation engine 118 can evaluate agent bids across multiple dimensions including cost efficiency, performance history, reputation scores, domain expertise match, and/or current availability status. The allocation engine 118 can assign importance weights to different evaluation criteria based on client preferences and task priorities, and assign composite scores for each bidding agent (e.g., using a weighted sum model). The allocation engine 118 can generate one or more smart contracts that describe the selected agent assignments, including payment terms, performance requirements, delivery schedules, and/or penalty clauses for non-performance. In some implementations, the allocation engine 118 operates under a sealed-bid auction, where agents submit encrypted bids that are revealed simultaneously to prevent bid manipulation.

The AI orchestration layer 114 includes a route management engine 120 that determines one or more task routing paths through the distributed agent network 124 to minimize latency, reduce costs, and balance computational loads across available agents. The route management engine 120 maintains network topology maps that track communication pathways, bandwidth capacities, and/or latency measurements between different agents and network nodes within the distributed system. The route management engine 120 can implement shortest path algorithms such as Dijkstra's algorithm or A* search to calculate routing paths that minimize or otherwise reduce total communication delays and data transfer costs between task initiators and executing agents. The route management engine 120 can monitor current utilization levels across network nodes and redirect task traffic away from overloaded agents toward underutilized agents with available capacity. The route management engine 120 can, in some implementations, connect tasks with agents having the most relevant domain expertise even when alternative paths might offer lower latency or cost by weighing the similarity in domain expertise higher than latency/cost. In some implementations, the route management engine 120 reserves network bandwidth and computational resources along selected paths to guarantee performance levels.

In some implementations, the route management engine 120 (and/or other engines in the environment 100) can be used to enforce anti-money laundering (AML), know your customer (KYC), fraud detection, sanctions compliance requirements, and/or other guidelines. For example, the route management engine 120 can perform validation checks on the task routing paths and/or logic used to determine the task routing paths. In some implementations, registries (e.g., sanctioned entity lists and politically exposed person (PEP) registries) are accessed by the route management engine 120 to verify that the task initiators and/or executing agents satisfy regulatory requirements before establishing routing connections. To validate the task routing paths and/or logic used to determine the task routing paths, the route management engine 120 can cross-reference agent identifiers indicated in the task routing path and/or logic with a predefined list of agent identifiers (e.g., AML watchlists). The route management engine 120 can continuously monitor transaction patterns of the task routing paths to detect suspicious activities (e.g., unusual routing frequencies or locations can be flagged). In some implementations, routing connections to agents that fail compliance checks are automatically blocked by the route management engine 120. The route management engine 120 can generate reports (e.g., compliance reports for regulatory authorities) when violations occur or are detected. In some implementations, audit trails of the compliance validation activities are maintained within the distributed or federated ledger system.

The AI orchestration layer 114 includes a quality monitoring engine 122 that continuously tracks task execution quality, validates outputs against specified requirements, and/or manages dispute resolution when quality issues arise. The quality monitoring engine 122 can evaluate task outputs using predefined quality metrics such as accuracy percentages, completeness scores, format compliance checks, and performance benchmarks. The quality monitoring engine 122, in some implementations, combines multiple independent quality assessment techniques such as rule-based validation, statistical analysis, and machine learning-based quality prediction models. The quality monitoring engine 122 can track quality trends for individual agents over time to enable identification of performance patterns, quality degradation, and so forth. The quality monitoring engine 122 can provide near-real-time or real-time monitoring dashboards (e.g., via a graphical user interface, command line interface, and so forth) that provide visibility into ongoing task execution status, quality metrics, and performance indicators for system administrators. The quality monitoring engine 122 can execute dispute resolution computer-implemented workflows that automatically initiate when quality thresholds are not met, such as evidence collection, stakeholder notification, and arbitration operations to resolve quality disagreements between clients and agents.

The environment 100 includes a distributed agent network 124 that can include a plurality of agents (e.g., "Agent 1," "Agent 2," and so forth) capable of executing specialized tasks and participating in the distributed ledger-based knowledge registry system. The distributed agent network 124 can be associated with AI agents with different capabilities spanning different domains such as natural language processing, computer vision, data analytics, code generation, translation services, and other domain-specific expertise areas. Each agent within the distributed agent network 124 can maintain its own computational resources, knowledge bases, and processing capabilities while participating in the shared network infrastructure for task discovery and execution coordination. The distributed agent network 124 can enable direct agent-to-agent communication for task coordination, capability validation, and/or collaborative problem-solving. In some implementations, the distributed agent network 124 includes specialized agent types such as validator agents that verify other agents' capabilities, orchestrator agents that coordinate complex multi-agent tasks, broker agents that facilitate agent discovery and matching services, and so forth.

The environment 100 includes a dynamic resource allocation engine 126, a proof-of-expert (PoE) consensus module 128, an incentive layer 130, and a reputation decay engine 132. The dynamic resource allocation engine 126 monitors supply and demand patterns across the distributed agent network 124 and automatically adjusts resource pricing and allocation parameters based on changes in the patterns. The dynamic resource allocation engine 126, in some implementations, monitors agent capacity utilization, availability status, and performance capabilities to identify resource bottlenecks and surplus capacity within the network. The dynamic resource allocation engine 126 can automatically adjust base pricing rates, surge pricing multipliers, and volume discounts based on near-real-time or real-time supply and demand conditions using models such as supply-demand curves. The dynamic resource allocation engine 126 can redistribute computational resources, task assignments, and token allocations.

The PoE consensus module 128 validates AI agent capability claims through peer-based challenge-response validation operations executed by validator agents. The PoE consensus module 128 can randomly choose qualified peer agents from the distributed agent network 124 to operate as validators, and can ensure that the validators are associated with a same or similar domain expertise and maintain reputation scores above minimum threshold requirements. The PoE consensus module 128 generates domain-specific challenge problems that test claimed agent capabilities objective performance metrics to determine capability validation outcomes. The PoE consensus module 128 can require agreement from multiple independent validators before accepting or rejecting agent capability claims. The PoE consensus module 128 can maintain validation history records that track the capability validation attempts, outcomes, and/or validator participation to create auditable trails. In some implementations, the PoE consensus module 128 uses stake-based validation where validators risk token deposits on their validation decisions. In some implementations, the PoE consensus module 128 implements recursive validation where validator qualifications are themselves validated by higher-tier validator agents.

The incentive layer 130 manages token distribution, reward calculations, and penalty enforcement to align agent behaviors with network objectives and maintain system integrity. The incentive layer 130 can calculate and distribute token payments to agents based on task completion performance, quality assessments, validation participation, and network contribution metrics. The incentive layer 130 can determine appropriate penalty amounts for various violation types including SLA breaches, false capability claims, validation misconduct, and so forth. The incentive layer 130 can require agents to deposit a token collateral before participating in network activities, and can confiscate staked tokens when agents violate network rules or performance agreements. The incentive layer 130, in some implementations, provides additional token rewards for exceptional performance, innovation contributions, network growth activities, and community building efforts.

The reputation decay engine 132 can implement time-based reputation score adjustments to ensure reputation scores reflect current agent performance rather than outdated historical achievements. The reputation decay engine 132 applies exponential decay functions that gradually reduce the influence of older performance data on current reputation scores, using decay constants that determine how quickly historical performance loses relevance over time. The reputation decay engine 132 can continuously monitor agent activity levels, task completion rates, and quality metrics to identify agents whose performance has declined or who have become inactive. The reputation decay engine 132 can periodically update agent reputation scores based on recent performance data while applying corresponding decay factors to historical performance contributions. The reputation decay engine 132, in some implementations, tracks agent performance across different expertise domains.

In some implementations, the blockchain infrastructure layer 102 is instead implemented as a federated ledger (e.g., of a federated network or system) that is enabled to provide distributed ledger-like guarantees without requiring decentralized blockchain infrastructure. For example, the federated ledger operates as an append-only, hash-chained log that is jointly controlled by multiple independent entities, such as individuals, systems, and/or organizations, where each update replicates to all federation members and finalizes only upon quorum co-signature from participating entities. In some implementations, the data monitoring platform enables the federation (i.e., the entities) to reach agreement on block finality even when some members exhibit malicious behavior using varying security thresholds.

The federated ledger can use hash chaining and Merkle tree data structures to ensure data integrity across the distributed federation members. Each transaction record generates a cryptographic hash using functions such as SHA-256 or Keccak-256, and transactions can be organized into blocks containing Merkle roots that enable verification of individual transaction inclusion without requiring access to complete block data. A Merkle tree organizes all transactions within a block into a binary tree structure where each leaf node represents a transaction hash and each internal node contains the hash of its two child nodes, with the Merkle root representing the single hash value at the tree's apex that summarizes all transactions in the block. Block headers can be associated with (e.g., include) references to previous block hashes, thus creating an immutable chain where any modification to historical data breaks the cryptographic chain or invalidates Merkle proofs and provides detection of tampering attempts.

To verify that a specific transaction is included in a block, a verifier only needs the transaction hash, the Merkle root from the block header, and a Merkle proof consisting of the sibling hashes along the path from the transaction's leaf node to the root. By computing hash values up the tree (e.g., by combining the transaction hash with each sibling hash in the proof path until reaching a calculated root value) and comparing the hash values with the published Merkle root, the data monitoring platform can confirm transaction inclusion if the values match. Thus, this approach reduces verification overhead from O(n) complexity requiring examination of all n transactions in a block to O(log n) complexity requiring only $\log_2(n)$ hash operations. For example, verifying inclusion in a block containing 1,000 transactions requires only 10 sibling hashes rather than downloading and processing all 1,000 transaction records.

The federated ledger can generate verifiable audit timelines. In some implementations, each finalized block can include an aggregate signature from the required quorum of federation members that confirms the federation approval through single signature validation rather than individual signature checks. In some implementations, the federated ledger periodically publishes the most recent block hash or Merkle root to external blockchain networks or distributed ledgers that ensure that even with member collusion, historical data prior to anchoring cannot be rewritten without detection by external observers. In some implementations, the federated ledger enables independent verification of transaction processing and/or data integrity without relying on individual federation members. Transaction receipts can indicate the transaction hash, Merkle inclusion proof, signed block header, and/or anchor references that collectively operate as cryptographic evidence of transaction processing and finalization.

Figure 2:
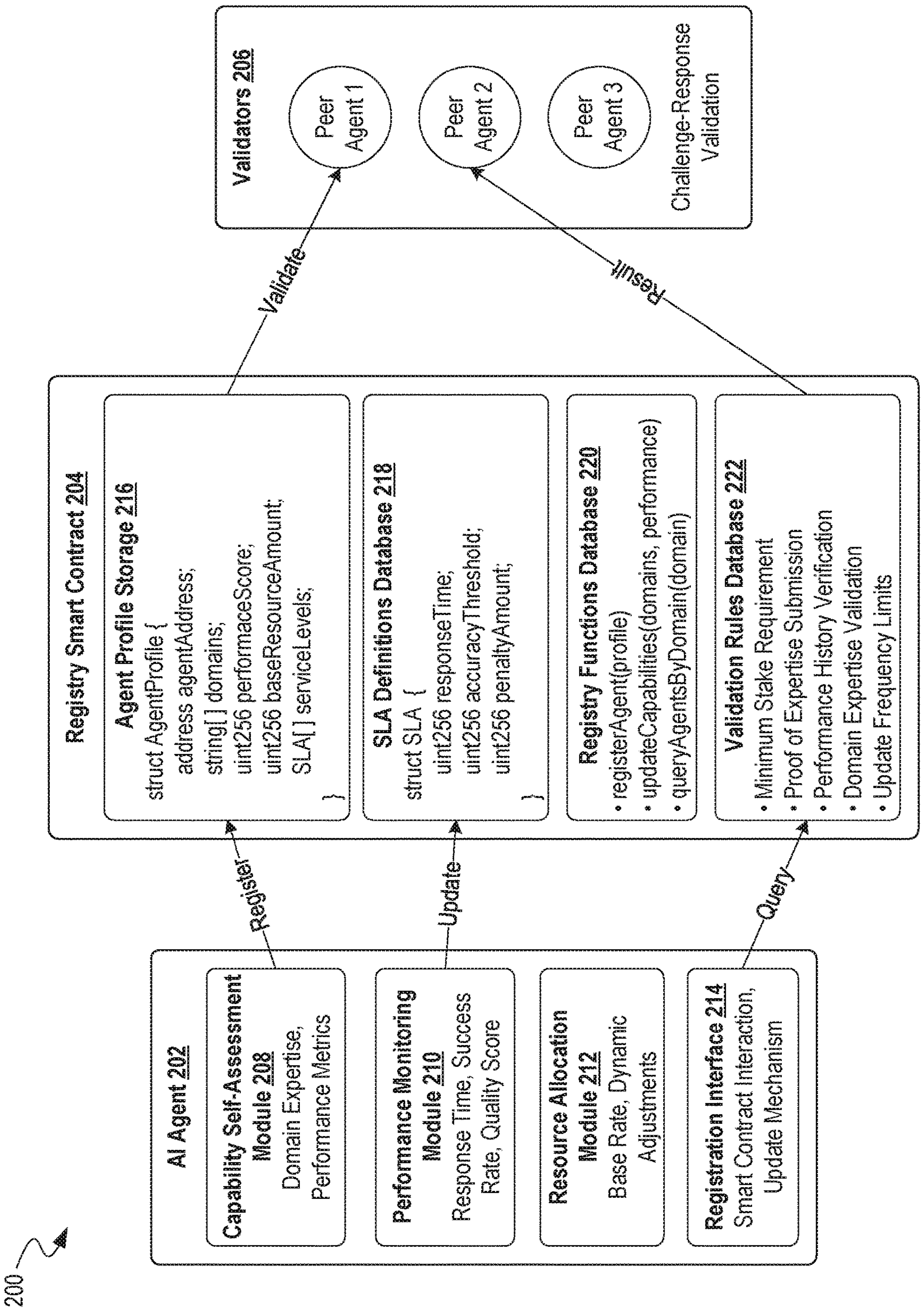
FIG. 2 illustrates an example environment of validating an AI-based agent using a knowledge registry, in accordance with some implementations of the present technology.

FIG. 2 illustrates an example environment 200 of validating an AI-based agent 202 using a knowledge registry, in accordance with some implementations of the present technology. The environment 200 is implemented using components of example AI system 1700 and/or computer system 1800 illustrated and described in more detail with reference to FIG. 17 and FIG. 18, respectively. Implementations of example environment 200 can include different and/or additional components or can be connected in different ways.

The environment 200 includes an AI agent 202 that is validated, using a registry smart contract 204, against validators 206. The AI agent 202 operates as an autonomous (or semi-autonomous) software entity seeking registration within the knowledge registry of the data monitoring platform. The AI agent 202 operates as a computational unit that executes specialized tasks such as natural language processing, computer vision analysis, data transformation, and so forth. The AI agent 202 can maintain its own computational resources including processing units, memory storage, trained model parameters, and knowledge databases that enable independent task execution without requiring external computational dependencies. The AI agent 202 can use communication interfaces that enable interaction with blockchain networks, smart contracts, and other agents. The AI agent 202 can generate cryptographic signatures using private key cryptography to authenticate its identity and authorize transactions within the distributed ledger network, thus ensuring that all agent actions can be verified and attributed to the correct agent entity. The AI agent 202 stores operational context data including domain expertise indicators, performance metrics, pricing parameters, and service level commitments that define its capabilities and operational characteristics within the distributed ledger of the data monitoring platform. In some implementations, the AI agent 202 operates as a containerized application running on cloud computing infrastructure with dedicated CPU and memory allocations. In some implementations, the AI agent 202 operates as a distributed system with processing components spread across multiple geographic locations.

The AI agent 202 can include a capability self-assessment module 208, a performance monitoring module 210, a resource allocation module 212, and/or a registration interface 214. The capability self-assessment module 208 evaluates and documents the agent's own technical capabilities, performance characteristics, and domain expertise areas for registration within the knowledge registry. The capability self-assessment module 208 can test the agent's processing capabilities across different task types, measuring response times, accuracy rates, throughput capacities, and/or resource consumption patterns under various workload conditions. The capability self-assessment module 208 can evaluate the agent's trained machine learning models to identify supported input data formats, output data types, processing domains, and confidence thresholds that define the scope of tasks the agent can execute. The capability self-assessment module 208 generates capability profiles as structured data documents describing domain expertise classifications, performance benchmarks, supported data formats, processing limitations, and/or quality guarantees of the agent. In some implementations, the capability self-assessment module 208 uses standardized benchmark datasets to measure performance across industry-standard evaluation metrics, and/or measures the agent's capabilities relative to other agents in similar domains.

The AI agent 202 includes a performance monitoring module 210 that continuously tracks and records the agent's operational performance metrics during task execution. The performance monitoring module 210 can capture performance metrics such as task completion times, processing accuracy rates, resource utilization levels, error frequencies, and quality scores for each executed task. The performance monitoring module 210 maintains performance history databases that store timestamped performance records. The performance monitoring module 210 can calculate performance averages, standard deviations, confidence intervals, and trend indicators to generate performance summaries/reports and identify unusual performance patterns, processing errors, or capability degradation that indicate an operational problem. The performance monitoring module 210 can generate performance reports as structured data documents containing aggregated metrics, trend analyses, and performance comparisons that demonstrate the agent's operational abilities.

The resource allocation module 212 manages the agent's computational resources, pricing strategies, and/or capacity allocation. The resource allocation module 212 can adjust the agent's service pricing based on current demand levels, resource availability, task complexity, and market conditions. The resource allocation module 212 monitors the agent's computational resource utilization such as CPU usage, memory consumption, storage requirements, and network bandwidth to ensure capacity for committed tasks and prevent resource overallocation. The resource allocation module 212 can predict future resource requirements based on task queue lengths, historical demand patterns, and so forth, in order to allocate computational capacity for specific tasks.

The registration interface 214 manages communication and data exchange between the agent and the registry smart contract 204 during registration, validation, and so forth. The registration interface 214 can format agent data into blockchain-compatible transaction formats and submit transactions to the distributed ledger network. The registration interface 214 generates cryptographic proofs and digital signatures that authenticate the agent's identity and authorize registry operations using public key cryptography and/or digital signatures.

The registry smart contract 204 that operates as an autonomous software program deployed on the blockchain infrastructure layer 102 to manage agent registration, validation, and registry maintenance functions without requiring centralized administration. The registry smart contract 204 executes as code stored within blockchain transactions, thus ensuring that registry operations follow predetermined rules and cannot be modified or manipulated by external parties after deployment. The registry smart contract 204 maintains current registry data including agent profiles, validation status, performance metrics, and operational parameters within blockchain storage structures that persist across transaction executions. The registry smart contract 204 processes incoming transactions from AI agents and validators by executing operations according to predefined business rules encoded within the smart contract code. The registry smart contract 204 generates events and notifications that broadcast registry changes, validation outcomes, and operational status updates to associated parties within the distributed network.

The registry smart contract 204 includes an agent profile storage 216 that maintains structured data records containing information about each registered AI agent's capabilities, performance history, and operational parameters within blockchain storage systems. The agent profile storage 216 uses data structures such as mappings, arrays, and so forth that organize agent information into retrievable formats using agent identifiers as keys for data access and modification operations. The agent profile storage 216 stores agent identification data including unique blockchain addresses, cryptographic public keys, and agent metadata within the distributed network. The agent profile storage 216 maintains structured data objects indicating, for example, domain expertise classifications, supported task types, input and output data formats, processing limitations, and performance characteristics that define each agent's operational scope. The agent profile storage 216 can track changes to agent profiles over time, maintaining historical records of capability updates, performance improvements, and operational modifications.

The registry smart contract 204 includes an SLA definitions database 218 that stores SLA templates and performance requirements that define expected requirements and operational commitments for registered AI agents. The SLA definitions database 218 uses data structures that organize service level requirements such as response time thresholds, accuracy minimums, availability guarantees, and quality benchmarks that agents are expected to satisfy. The SLA definitions database 218 can store penalty structures and enforcement rules that specify consequences for SLA violations, such as reputation score reductions, token penalties, and temporary or permanent suspension from registry participation. The SLA definitions database 218 can maintain reward schedules and bonus calculations that define additional compensation for agents who exceed SLA requirements. The SLA definitions database 218 can provide template SLA formats for different service categories, task types, and performance levels.

The registry smart contract 204 includes a registry functions database 220 that contains executable smart contract methods and operational logic to enable agent registration, profile management, validation coordination, and registry query operations. The registry functions database 220 enable registered agents to modify their capability descriptions, performance metrics, pricing parameters, and operational settings. The registry functions database 220 enable external systems to search for (e.g., query) agents based on capability requirements, performance criteria, availability status, and pricing constraints using search parameters and filtering options. In some implementations, the registry functions database 220 uses function libraries that provide reusable code components for common registry operations.

The registry smart contract 204 includes a validation rules database 222 that stores the criteria, procedures, and requirements that govern agent capability validation, peer validator selection, and validation outcome determination within the distributed registry. The validation rules database 222 can define minimum requirements for agent registration such as stake amounts, performance thresholds, domain expertise levels, and/or operational history requirements that agents must satisfy before participating in the registry system. The validation rules database 222 can store validator selection rules that specify how peer validators are chosen for capability validation procedures (e.g., domain expertise requirements, reputation score minimums, geographic distribution preferences). The validation rules database 222 can define how validation challenges are created (e.g., difficulty levels, time constraints, evaluation criteria, evidence requirements). The validation rules database 222 stores penalty and reward rules that define consequences for validation participation.

The validators 206 that operate as qualified peer agents are responsible for evaluating and verifying the capability claims of AI agents seeking registration or validation within the knowledge registry. The validators 206 operate as independent assessment entities that possess demonstrated expertise in relevant domains and maintain reputation scores above minimum threshold requirements to qualify for validation responsibilities. Each peer agent within the validators 206 maintains its own computational capabilities, domain knowledge, and assessment tools that enable independent evaluation of candidate agent capabilities without relying on external validation services or centralized assessment authorities. The validators 206 implement challenge generation functions that create domain-specific tests, problems, and evaluation scenarios designed to assess whether candidate agents possess the capabilities they claim to have within their registration profiles. In some implementations, multiple validators independently assess the same candidate agent and combine their individual evaluations to reach collective validation decisions that reduce bias. The validators 206 maintain validation history records that track, for example, assessment accuracy, participation rates, and consensus alignment to establish their own credibility and qualification.

Figure 3:
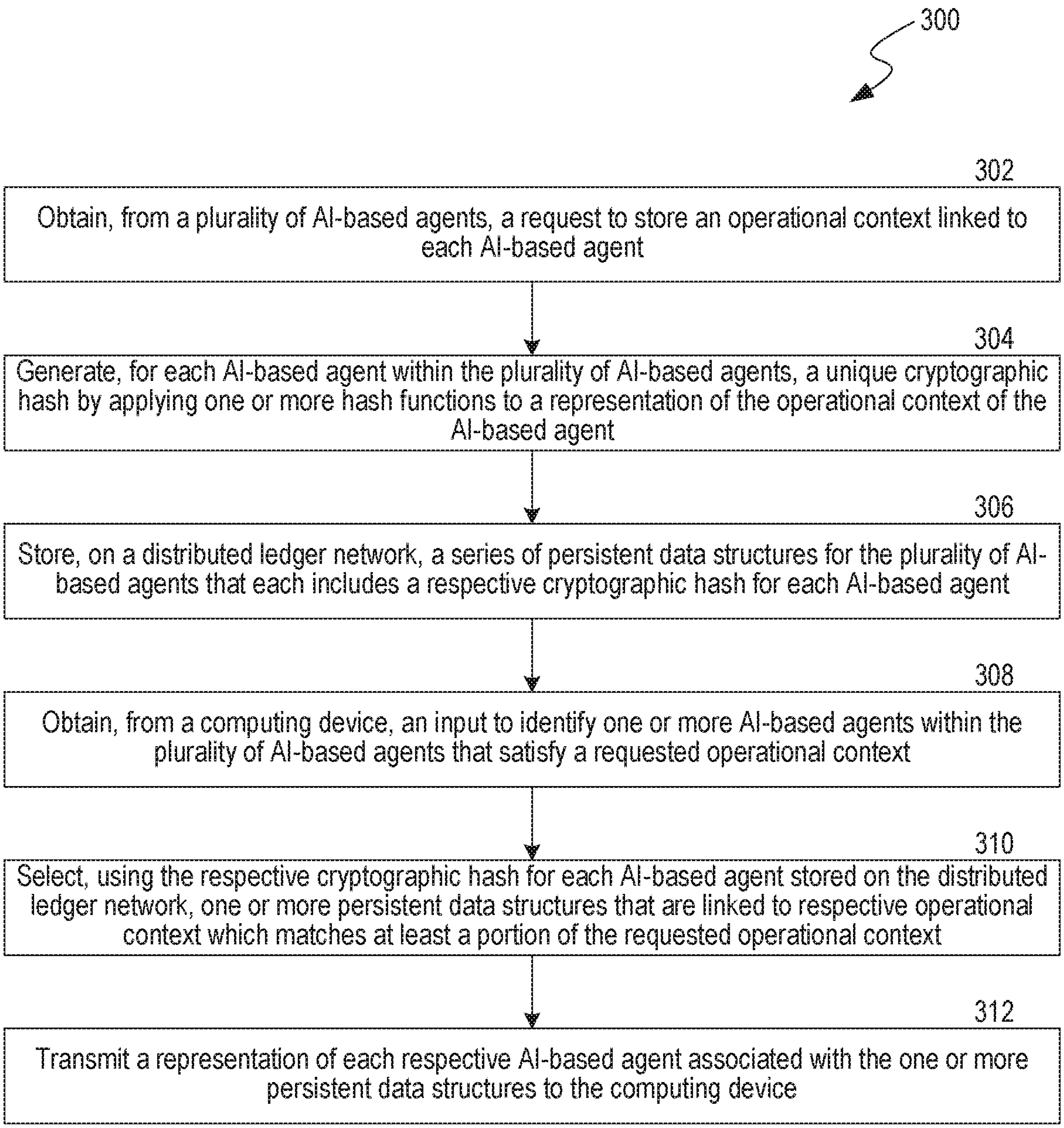
FIG. 3 is a flow diagram illustrating an example process of storing and managing a knowledge registry using a data monitoring platform, in accordance with some implementations of the present technology.

FIG. 3 is a flow diagram illustrating an example process 300 of storing and managing a knowledge registry using a data monitoring platform, in accordance with some implementations of the present technology. In some implementations, the process 300 is performed by components of example AI system 1700 and/or computer system 1800 illustrated and described in more detail with reference to FIG. 17 and FIG. 18, respectively. For example, the data monitoring platform can be the same or similar as the example AI system 1700 in FIG. 17. Likewise, implementations can include different and/or additional operations or can perform the operations in different orders.

In operation 302, the data monitoring platform can obtain (e.g., receive, access), from a plurality of AI-based agents, a request (e.g., a registration request) to store an operational context (e.g., an agent identifier, a domain indicator, a data access permission, workflow contribution data, or a cryptographic credential) linked to each AI-based agent.

In operation 304, the data monitoring platform can generate, for each AI-based agent within the plurality of AI-based agents, a unique cryptographic hash by applying one or more hash functions to a representation (e.g., a byte representation) of the operational context of the AI-based agent. The data monitoring platform can, responsive to each AI-based agent satisfying predefined criteria, generate, for each AI-based agent within the plurality of AI-based agents, the unique cryptographic hash. The data monitoring platform can validate compliance against SLAs by verifying the request by evaluating each AI-based agent within the plurality of AI-based agents against predefined criteria. Responsive to each AI-based agent satisfying the predefined criteria, the data monitoring platform can generate, for each AI-based agent within the plurality of AI-based agents, the unique cryptographic hash.

In operation 306, the data monitoring platform can store, on a distributed ledger network (e.g., a blockchain), a series of persistent data structures (e.g., registry records) for the plurality of AI-based agents that each includes a respective cryptographic hash for each AI-based agent and/or a hash pointer that links a particular registry record to a previous registry record stored previous to the particular registry record. In some implementations, the data monitoring platform can verify the registration request by applying a public key associated with each AI-based agent within the plurality of AI-based agents prior to storing the series of registry records on the distributed ledger network.

To record agent activity on the blockchain, the data monitoring platform can detect a transaction or data access of a dataset associated with a particular AI-based agent within the plurality of AI-based agents, and record, on the distributed ledger network, an event record that includes, for example, a timestamp, an identifier of the dataset, and/or a respective registry record of the particular AI-based agent. To update registry records based on changing agent abilities, the data monitoring platform can obtain an updated operational context of a particular AI-agent within the plurality of AI-based agents. The data monitoring platform can update the distributed ledger network by applying the one or more hash functions to a byte representation of the updated operational context of the particular AI-agent to generate a new cryptographic hash, and store an updated registry record on the distributed ledger network that includes the new cryptographic hash.

Each persistent data structure can be linked to a leaf node in a Merkle tree data structure stored across the distributed ledger network. Pairs persistent data structures can be hashed to generate a subsequent level of the Merkle tree data structure. The data monitoring platform can generate a Merkle proof for a particular leaf node in the Merkle tree data structure by generating a sequence of sibling hashes by traversing the Merkle tree data structure from the leaf node toward the subsequent level of the Merkle tree data structure to retrieve a respective unique cryptographic hash value associated with a corresponding AI-based model linked to a sibling node sharing a common level with the particular leaf node, and aggregating the sequence of sibling hashes from each level to generate an ordered proof list.

In operation 308, the data monitoring platform can obtain (e.g., receive), from a computing device, an input (e.g., a query, a command set, a prompt) to identify one or more AI-based agents within the plurality of AI-based agents that satisfy a requested operational context. The input can be received from an AI model (e.g., a language model), an individual, and/or other automated system. The input can include an authentication credential set. The data monitoring platform can, prior to selecting the one or more persistent data structures, filter the series of persistent data structures based on the authentication credential set.

In operation 310, in response to receiving the input, the data monitoring platform can select, using the respective cryptographic hash for each AI-based agent stored on the distributed ledger network, one or more persistent data structures that are linked to respective operational context which matches at least a portion of the requested operational context. For example, the data monitoring platform can apply the one or more hash functions to a byte representation of the requested operational context of the query to generate a requested cryptographic hash, and compare the requested cryptographic hash of the query to respective unique cryptographic hashes stored in the series of registry records to identify the one or more registry records that are linked to respective operational context which matches at least a portion of the requested operational context.

The data monitoring platform can select the one or more persistent data structures by obtaining a reputation score linked to each persistent data structure of the series of persistent data structures, where the reputation score linked to each persistent data structure is determined based on historical operations executed by a respective AI-based agent associated with the persistent data structure, and prioritizing the series of persistent data structures based on a respective reputation score linked to each persistent data structure.

To only retrieve agents that match an access level of the requestor, the data monitoring platform can, prior to selecting the one or more persistent data structures, filter the series of persistent data structures based on the authentication credential set. To not retrieve agents that are non-compliant, the data monitoring platform can receive an indication of an anomalous operation executed by a particular AI-based agent within the plurality of AI-based agents. Responsive to receiving the indication of the anomalous operation, the data monitoring platform can, prior to selecting the one or more persistent data structures, filter the series of persistent data structures to remove a respective persistent data structure associated with the particular AI-based agent.

Unregistered (non-compliant, non-selected, and so forth) agents attempting to access the distributed network can be automatically denied service by the data monitoring platform. For example, when an agent lacks valid cryptographic credentials or fails to provide verifiable operational context during initial connection attempts, the data monitoring platform can block one or more data traffic transmissions from the agent. The data monitoring platform can grant provisional access to unregistered agents by creating temporary registry entries with limited permissions and/or a restricted operational scope. Provisional agents, for example, receive reduced task allocation priority and are subject to increased monitoring through increased validation frequency and/or stricter performance thresholds. The data monitoring platform can assign provisional reputation scores based on initial assessments and/or require completion/satisfaction of validation tests before granting full network access. Agents that fail provisional evaluation criteria can be permanently blocked from network access and/or their identifiers can be added to exclusion lists stored in the distributed or federated ledger. In some implementations, the data monitoring platform can implement graduated provisional access levels that provide increasing privileges as agents demonstrate reliability and compliance with network standards.

In operation 312, the data monitoring platform can transmit a representation of each respective AI-based agent associated with the one or more persistent data structures to the computing device. The data monitoring platform can update the distributed ledger network by applying the one or more hash functions to a byte representation of an updated operational context of a particular AI-agent to generate a new cryptographic hash, and store an updated registry record on the distributed ledger network that includes the new cryptographic hash. The data monitoring platform can detect a transaction or data access of a dataset associated with a particular AI-based agent within the plurality of AI-based agents, and store, on the distributed ledger network, an event record that includes, for example, a timestamp, an identifier of the dataset, and/or a respective persistent data structure of the particular AI-based agent.

Managing Protected Digital Content Using the Data Management Platform

Figure 4:
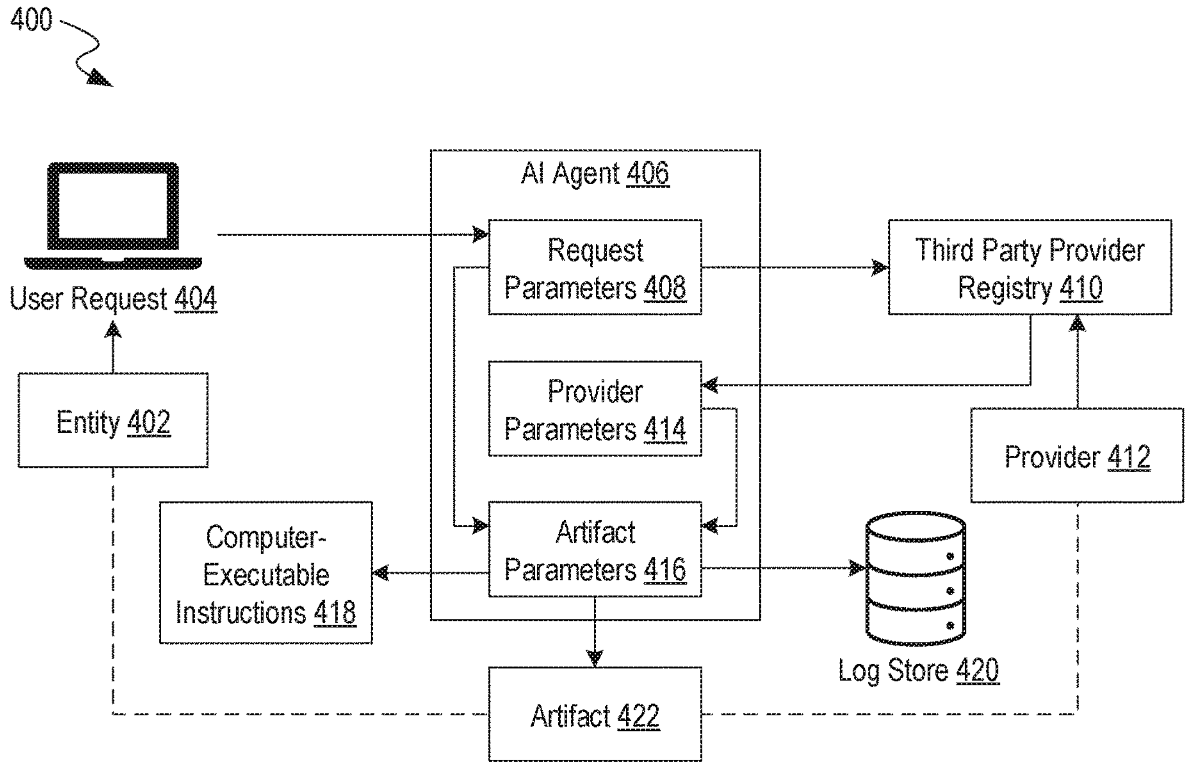
FIG. 4 illustrates an example environment of authorizing usage of protected digital content using AI-based agents, in accordance with some implementations of the present technology.

FIG. 4 illustrates an example environment 400 of authorizing usage of protected digital content using AI-based agents, in accordance with some implementations of the present technology. The environment 400 is implemented using components of example AI system 1700 and/or computer system 1800 illustrated and described in more detail with reference to FIG. 17 and FIG. 18, respectively. Implementations of example environment 400 can include different and/or additional components or can be connected in different ways.

The environment 400 can include an entity 402 that submits a user request 404. The entity 402 that operates as a requesting organization or individual seeking authorized access to protected digital content, such as digital content owned by external intellectual property providers. The entity 402 generates a user request 404 that specifies the particular protected digital content (e.g., intellectual property assets, or licensed materials) that the entity requires for its intended use cases and operational applications. The user request 404 can include structured data fields defining content identifiers, usage parameters, access duration requirements, intended application descriptions, budget constraints, or other parameters that define the scope and terms of the requested digital content access. The user request 404, in some implementations, includes authentication credentials such as digital certificates, cryptographic signatures, or organizational identifiers that verify the entity's identity and authorization to request access to protected data.

The user request 404 can be received or otherwise obtained by an AI agent 406, which can generate request parameters 408. The AI agent 406 can use knowledge bases containing information about available intellectual property providers, licensing terms, pricing structures, and/or content catalogs to map between user requirements and available digital assets. The AI agent 406 can generate (or otherwise obtain) the request parameters 408 that represent a structured format of the original user request 404. The request parameters 408 include quantified usage specifications (e.g., data volume requirements, processing frequency parameters, concurrent access limits), technical compatibility specifications (e.g., supported data formats, API requirements), legal and regulatory requirements (e.g., jurisdiction specifications, compliance standards, data protection requirements), budget parameters (e.g., budget, payment methods, settlement timeframes), priority rankings that indicate the relative importance of different content assets when multiple items are requested simultaneously, and so forth.

The request parameters 408 can be transmitted to a third-party provider registry 410 associated with a provider 412 that retrieves provider parameters 414. The third-party provider registry 410 that operates as a centralized directory that includes information about available intellectual property providers, their content catalogs, licensing terms, and service capabilities. The third-party provider registry 410 maintains structured databases that enable AI agents to query for providers based on, for example, content type, domain expertise, pricing ranges, geographic location, and other selection criteria. The third-party provider registry 410 stores provider reputation data (e.g., historical performance metrics). In some implementations, the third-party provider registry 410 implements federated search operations that aggregate content information from multiple distributed provider networks.

The third-party provider registry 410 connects to a provider 412 that represents a different entity, such as an individual intellectual property owner, content creator, or licensing organization that offers protected digital assets for authorized use by external entities. The provider 412 generates provider parameters 414 that describe information about available digital content, metadata, terms (e.g., licensing terms such as usage restrictions, duration limits, geographic constraints, modification permissions, and redistribution rights), resource allocation (e.g., pricing) structures, and technical specifications used by the AI agent 406 to evaluate generate artifact parameters 416. The AI agent 406 can use the request parameters 408 and the provider parameters 414 to generate the artifact parameters 416 that represent the terms for a specific digital content licensing arrangement between the requesting entity 402 and the selected provider 412. The artifact parameters 416 contain terms (e.g., parameters, licensing terms) that describe usage permissions, access duration, geographic scope, modification rights, resource allocation, technical information (e.g., access credentials, API endpoints, data formats, encryption keys, and authentication tokens that enable the requesting entity to access and utilize the licensed digital content), and so forth.

In some implementations, licensing terms and/or payment structures can be embedded, stored, or otherwise maintained directly within smart contracts. Smart contracts can encode licensing parameters as executable code that automatically enforces usage restrictions and payment obligations. For example, the provider 412 can cause deployment of autonomous smart contracts that contain embedded licensing terms including usage permissions, duration limits, geographic constraints, and payment schedules that execute automatically when licensing conditions are satisfied. The smart contracts can maintain their own provider parameters 414 as code variables that specify available digital content, licensing restrictions, and/or technical access requirements. In some implementations, the AI agent 406 can interact directly with provider smart contracts to retrieve licensing terms and negotiate access permissions through blockchain transactions.

Using the artifact parameters 416, the AI agent 406 can generate computer-executable instructions 418, store the artifact parameters 416 in a log store 420, and/or generate an artifact 422. The computer-executable instructions 418 can track content access patterns, processing activities, data transfers, and other utilization metrics to ensure compliance with the artifact parameters 416 and enable accurate usage-based resource allocations (e.g., billing calculations). The computer-executable instructions 418 can, for example, allocate computational or monetary resources based on actual usage, specified intervals, and so forth. The computer-executable instructions 418 can execute generate alerts or enforcement actions when unauthorized usage is detected. The computer-executable instructions 418, in some implementations, generates a set of records that indicate content access, usage activities, and payment transactions.

The AI agent 406 stores the artifact parameters 416 in a log store 420 that operates as a persistent data repository maintaining records of the artifact parameters 416, usage activities, and compliance monitoring data. The log store 420 can be stored in a distributed ledger such as a blockchain (e.g., the blockchain infrastructure layer 102 in FIG. 1), a federated ledger (such as the federated ledger discussed with reference to FIG. 1), or other storage database that prevents unauthorized modification or deletion of licensing records and usage history. The log store 420 maintains structured data schemas that organize licensing information, usage metrics, payment records, and compliance data in searchable and retrievable formats.

The AI agent 406 can generate an artifact 422 that represents a structured, machine-readable document containing conditions and operational parameters for the authorized use of protected digital content. The artifact 422 includes, for example, licensing terms in the form of blockchain smart contract code that enables automated interpretation and enforcement by downstream systems and applications. The artifact 422 can include cryptographic signatures from both the requesting entity 402 and the provider 412 that authenticate the agreement and prevent unauthorized modifications to artifact parameters 416. The artifact 422 can be associated with unique identifiers such as cryptographic hashes or blockchain transaction IDs that enable reference and verification of the licensing agreement across different systems and time periods. In some implementations, the artifact 422 includes a smart contract code that automatically executes licensing terms and payment obligations.

Figure 5:
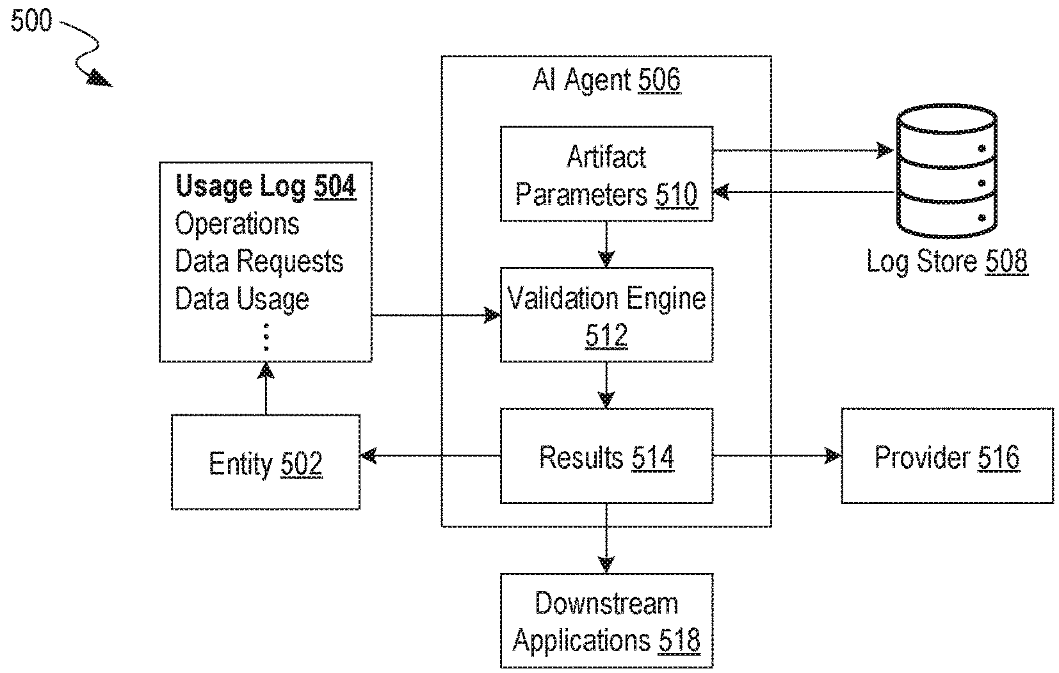
FIG. 5 illustrates an example environment of monitoring usage of protected digital content using AI-based agents, in accordance with some implementations of the present technology.

FIG. 5 illustrates an example environment 500 of monitoring usage of protected digital content using AI-based agents, in accordance with some implementations of the present technology. The environment 500 is implemented using components of example AI system 1700 and/or computer system 1800 illustrated and described in more detail with reference to FIG. 17 and FIG. 18, respectively. Implementations of example environment 500 can include different and/or additional components or can be connected in different ways.

The environment 500 can include an entity 502 (e.g., the entity 402 in FIG. 4) that is associated with (e.g., generates) a usage log 504. The usage log 504 includes timestamped entries that record when protected content was accessed, by which users or systems, for what duration, and/or for what specific downstream operations. The usage log 504 can indicate quantitative metrics such as data processing volumes, computational resource consumption, output generation rates, and/or performance measurements to enable resource allocation (e.g., usage-based billing fees). An AI agent 506 (e.g., the AI agent 406 in FIG. 4) can query a log store 508 (e.g., the log store 420 in FIG. 4) to retrieve artifact parameters 510 (e.g., the artifact parameters 416 in FIG. 4). The artifact parameters 510 and the usage log 504 can be input into a validation engine 512 to generate results 514. The validation engine 512 compares observed usage activities against specific licensing restrictions, identifying violations, approaching limits, and so forth. The validation engine 512 generates results 514 that contain comprehensive compliance assessments, violation reports, usage analytics, and financial calculations based on the analysis of content usage activities against licensing agreement terms. The results 514 include compliance status reports that indicate whether current usage activities are within authorized limits, approaching restrictions, or violating licensing terms. The results 514 can be transmitted back to the entity 502, to a provider 516, and/or to downstream applications 518.

Figure 6:
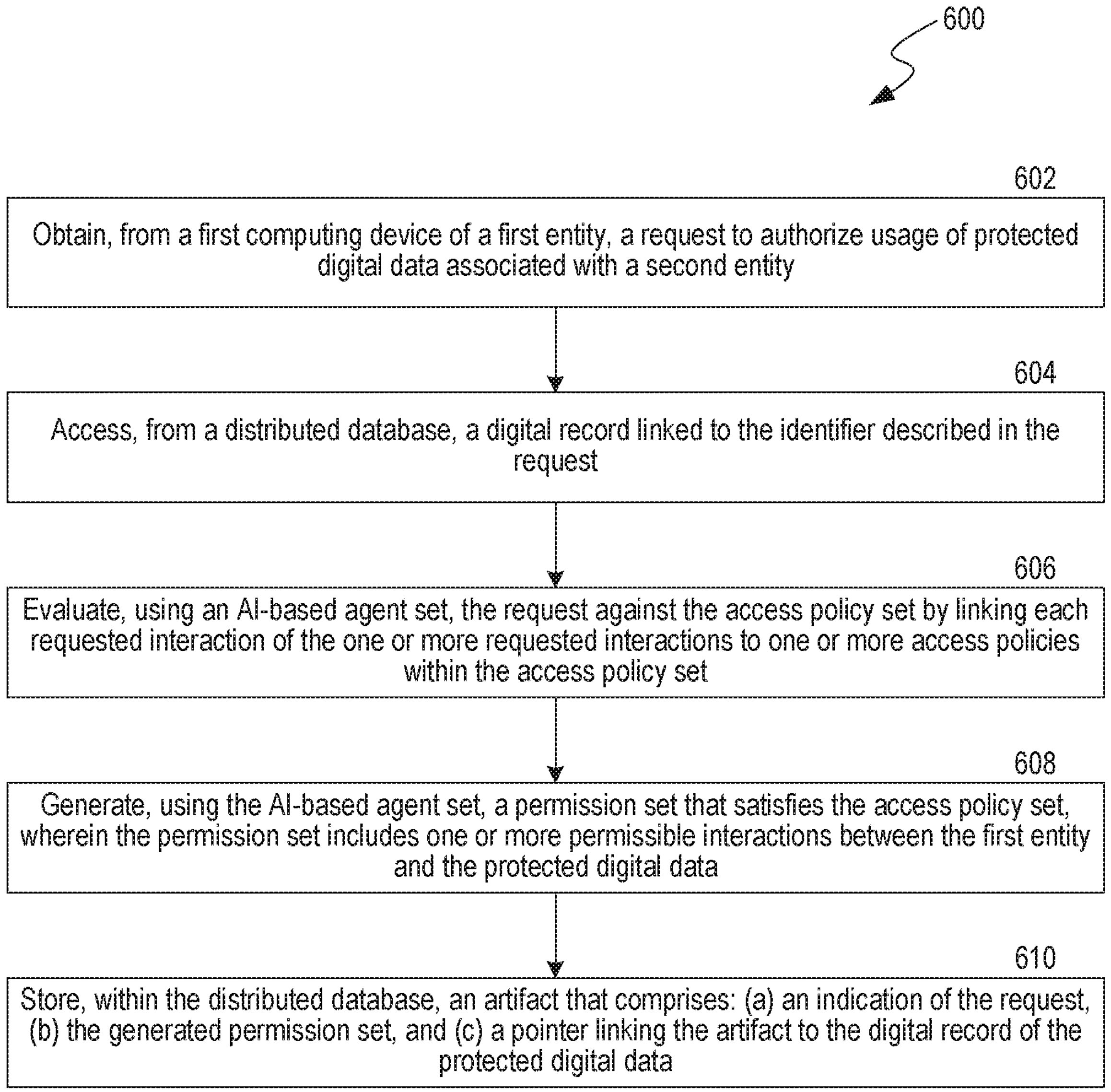
FIG. 6 is a flow diagram illustrating an example process of authorizing and monitoring usage of protected digital content using a data monitoring platform, in accordance with some implementations of the present technology.

FIG. 6 is a flow diagram illustrating an example process 600 of authorizing and monitoring usage of protected digital content (e.g., a patent or a copyright associated with the second entity) using a data monitoring platform, in accordance with some implementations of the present technology. In some implementations, the process 600 is performed by components of example AI system 1700 and/or computer system 1800 illustrated and described in more detail with reference to FIG. 17 and FIG. 18, respectively. Likewise, implementations can include different and/or additional operations or can perform the operations in different orders.

In operation 602, the data monitoring platform can obtain (e.g., receive, access), from a first computing device of a first entity, a request (e.g., an authorization request) to authorize usage of protected digital data associated with a second entity (same or different entity), such as operational data associated with the second entity. The request includes (a) an identifier (e.g., a unique cryptographic identifier) of the protected digital data and (b) a requested permission set (e.g., requested rights in an IP license, one or more data streams) associated with one or more requested interactions between the first entity and the protected digital data.

In operation 604, in response to receiving the authorization request, the data monitoring platform can access (e.g., receive, obtain), from a distributed database (e.g., distributed ledger, a federated ledger, blockchain), a digital record linked to the identifier described in the request. The digital record indicates an access policy set (e.g., a machine-readable access policy set) describing a series of permissible interactions (e.g., controls set by the licensor or other originating entity) between the first entity and the protected digital data. For example, the permissible interactions can include a permissible modality set of interaction between the first entity and the protected digital data, an access control set, a time-based usage constraint set, and/or a resource constraint set (e.g., compensation).

A permissible modality set of interaction defines the specific types and methods of engagement that are authorized between an entity and protected digital content, for example, according to licensing agreement terms and/or technical access constraints. The modality set specifies computational interaction types such as read-only access that permits data retrieval without modification capabilities, write access that enables content modification within defined parameters, processing access that allows computational analysis and transformation operations, distribution access that permits sharing or redistribution of content under specified conditions, and so forth. The permissible modality set can include technical access methods such as API-based interactions that restrict content access to specific programming interfaces, batch processing modes that limit access to scheduled bulk operations, real-time streaming access that enables continuous data flow within bandwidth constraints, offline access that permits local content storage for disconnected usage scenarios, and so forth.

In operation 606, the data monitoring platform can evaluate, using an AI-based agent set (semi-autonomous or autonomous), the request against the access policy set by linking (e.g., mapping, associating) each requested interaction of the one or more requested interactions to one or more access policies within the access policy set.

In operation 608, the data monitoring platform can generate, responsive to the evaluation, using the AI-based agent set, a permission set (e.g., machine-enforceable permissions that can describe license controls determined using the agents based on the requested rights/controls set by the licensor) that satisfies the access policy set, where the permission set includes one or more permissible interactions between the first entity and the protected digital data. The permissible interactions can include, for example, a particular modality within the permissible modality set, a particular access control within the access control set, a particular time period that satisfies the time-based usage constraint set, or a particular amount of resources that satisfies the resource constraint set.

In operation 610, the data monitoring platform can store, within the distributed database, an artifact (e.g., an authorization artifact such as a license between the first entity and the second entity) that includes an indication of the request, the generated permission set, and/or a pointer (e.g., a hash pointer that stores a cryptographic hash value for the protected digital data) linking the artifact to the digital record of the protected digital data. In some implementations, the authorization artifact is linked to a provenance record of the protected digital data stored within the distributed database that indicates, for example, a previous version of the protected digital data and/or an agent identity attribute associated with one or more previous authorized accesses of the protected digital data. In some implementations, the data monitoring platform transmits, using the AI-based agent set, a representation of the authorization artifact to the first computing device of the first entity and a second computing device of the second entity. The data monitoring platform can cause the AI-based agent set to transmit a computer-executable instruction set that executes the one or more permissible interactions between the first entity and the protected digital data.

The data monitoring platform can use digital signatures to monitor compliance (e.g., license compliance). The data monitoring platform can embed, within the protected digital data, a digital watermark generated using the AI-based agent set, and register the digital watermark in the distributed database. For example, the data monitoring platform can monitor, using the AI-based agent set, one or more interactions between the first entity and the protected digital data. The data monitoring platform can record each interaction as a log entry in the distributed database. The log entry can indicate a type of interaction, a timestamp of the interaction, and/or a cryptographic signature of a particular agent corresponding to the interaction.

The digital watermark can include encoded information such as unique identifiers, ownership data, licensing terms, and/or usage permissions into the protected digital data by adjusting specific bits, pixels, frequency components, or other data elements within the digital data. The digital watermark can include cryptographic hash values generated from the original digital data combined with metadata such as timestamp information indicating when the watermark was embedded, agent identifiers specifying which AI agent processed the content, and so forth. In some implementations, the lowest-order bits of pixel values are altered to encode watermark information. In some implementations, the digital watermark includes blockchain addresses that link the watermarked content to distributed or federated ledger records that indicate licensing and usage history.

To facilitate instant settlement, the data monitoring platform can detect the completion of a usage event associated with the first entity. Responsive to the detection, the data monitoring platform can generate a computer-executable instruction set configured to transfer ownership of a resource set from the first entity to the second entity. The data monitoring platform can record the computer-executable instruction set within the distributed database. The data monitoring platform can record, using the AI-based agent set, the computer-executable instruction set within the distributed database.

The data monitoring platform can periodically evaluate the operational data by evaluating, at predefined time intervals, operational data associated with the first entity against the machine-readable access policy set. In some implementations, the evaluation is performed by a particular AI-based agent within the AI-based agent set, where the particular AI-based agent is associated with a digital watermark. The data monitoring platform can link the evaluation with the digital watermark of the particular AI-based agent, and store the evaluation within the distributed database.

Collaboration of AI-Based Agents Using the Data Monitoring Platform

Figure 7:
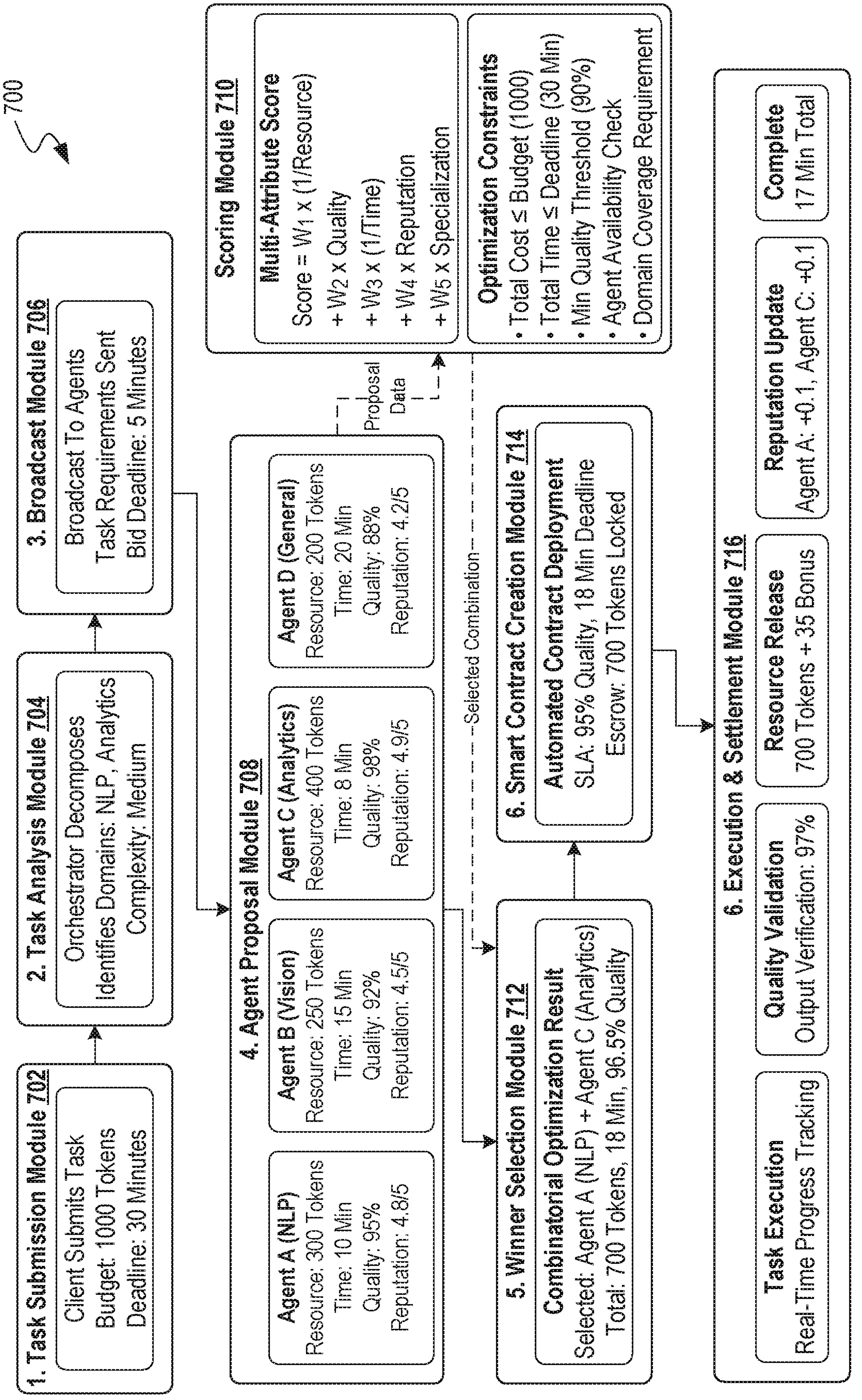
FIG. 7 illustrates an example environment of managing collaboration of AI-based agents based on an evaluation of the AI-based agents across multiple attributes, in accordance with some implementations of the present technology.

FIG. 7 illustrates an example environment 700 of managing collaboration of AI-based agents based on an evaluation of the AI-based agents across multiple attributes, in accordance with some implementations of the present technology. The environment 700 is implemented using components of example AI system 1700 and/or computer system 1800 illustrated and described in more detail with reference to FIG. 17 and FIG. 18, respectively. Implementations of example environment 700 can include different and/or additional components or can be connected in different ways.

The environment 700 includes a task submission module 702 that receives and processes incoming task requests from, for example, clients seeking AI agent services within the distributed marketplace system. The task submission module 702 can accept task specifications that indicate requirements including computational needs, performance expectations, budget constraints, and/or delivery deadlines that define the scope and parameters of work to be completed. The task submission module 702 can assign unique identifiers to each submitted task using cryptographic hash functions that generate fixed-length alphanumeric strings based on task content and timestamp data. The task submission module 702 can store validated task requests in structured data queues where the task requests await processing by downstream applications (e.g., analysis and/or distribution modules). In some implementations, the task submission module 702 accepts recurring task submissions that automatically generate new task instances based on predefined schedules and parameters. In some implementations, the task submission module 702 processes batch task submissions containing multiple related tasks for coordinated execution across agent networks.

The task analysis module 704 uses an orchestrator (e.g., an AI system) to decompose the task from the task submission module 702 and determine the specific agent capabilities used for task completion. For example, the task analysis module 704 parses natural language task descriptions by first applying tokenization functions that split text into individual words and phrases, then using part-of-speech tagging to identify nouns, verbs, and modifiers that indicate specific requirements and constraints. The task analysis module 704 can extract requirements by scanning tokenized text for predefined keyword patterns such as "must complete within," "requires accuracy of," or "budget not to exceed" and uses regular expression matching to identify numerical values, dates, and performance thresholds associated with these requirement indicators. The task analysis module 704 can identify domain-specific terminology by comparing extracted terms against specialized vocabularies and ontologies for different expertise areas such as natural language processing, computer vision, and so forth. The task analysis module 704 can classify task types by applying machine learning classification models trained on historical task data that map combinations of extracted requirements and terminology to predefined service categories, calculating confidence scores for each potential classification and selecting the category with the highest probability score above a minimum threshold.

The task analysis module 704 can decompose tasks into atomic work units where each unit represents a discrete operation that can be assigned to individual agents with specific expertise areas. The task analysis module 704, in some implementations, estimates computational resource requirements for each subtask by using historical performance data, complexity indicators, and/or processing volume requirements to predict execution time and/or resource consumption. The task analysis module 704 identifies dependency relationships between subtasks to determine execution sequences that increase task efficiency (e.g., lower resources used, reduced time for completion). The task analysis module 704 can determine budget allocations for each subtask based on estimated complexity, required expertise levels, current market pricing data for similar agent services, and so forth. In some implementations, the task analysis module 704 applies domain-specific analysis templates that provide standardized decomposition approaches for common task categories.

The task analysis module 704 uses an orchestrator (e.g., an AI system) to decompose the task from the task submission module 702. A broadcast module 706 broadcasts the task requirements to agents within the distributed network (e.g., "Agent A," "Agent B," and so forth). The broadcast module 706 can identify eligible agents to broadcast to by querying the distributed agent registry using capability filters, reputation thresholds, and/or availability status criteria that match task requirements with agent qualifications. The broadcast module 706 can generate standardized request-for-proposal documents that include task specifications, performance requirements, budget parameters, and/or submission deadlines. The broadcast module 706 transmits the messages (e.g., task requirement information) to selected agents using, for example, peer-to-peer communication protocols that deliver task information directly to agent systems without centralized message routing. The broadcast module 706 can manage bidding timeframes by setting submission deadlines, transmit reminder notifications, and automatically close bidding periods. In some implementations, the broadcast module 706 prioritizes local agents for tasks requiring physical presence or low-latency communication, and/or prioritizes agents with demonstrated expertise in specific domains relevant to submitted tasks.

An agent proposal module 708 obtains the proposals of the agents responding to task solicitations distributed through the broadcast module 706. The agent proposal module 708 receives structured proposal documents containing pricing information, estimated completion timeframes, quality guarantees, and resource requirements that agents submit in response to task solicitations. The agent proposal module 708 can authenticate proposal submissions using digital signature verification that confirms proposals originate from registered agents and have not been tampered with during transmission. The agent proposal module 708 stores validated proposals in one or more databases accessible by the data monitoring platform.

The proposal data is transmitted to a scoring module 710 that scores, across multiple attributes, each agent and/or agent proposal using corresponding proposal data. For example, the scoring module 710 assesses proposals based on pricing competitiveness, estimated completion time, quality guarantees, agent reputation scores, and domain expertise using weighted scoring operations. The scoring module 710 can determine composite scores by applying predetermined weighting factors that reflect task priorities and/or client preferences for different performance attributes.

A winner selection module 712 selects a selected set of agents (single or multiple). For example, the winner selection module 712 ranks the evaluated proposals according to their composite scores and identifies the highest-scoring submissions that satisfy the requirements and constraints specified in the original task submission. The winner selection module 712 can perform one or more validation checks on selected agents to evaluate, for example, availability, capacity, and other aspects of the selected agents to ensure selected agents can fulfill their proposed commitments. In some implementations, the winner selection module 712 generates selection notifications that inform winning agents of their selection. In some implementations, the winner selection module 712 maintains reserve agent selections that can be notified if primary selections become unavailable. In some implementations, the winner selection module 712 applies diversity requirements that ensure selected agent combinations provide a variety of skills and reduce single-point-of-failure risks.

A smart contract creation module 714 generates a smart contract for the selected set of agents. An execution and settlement module 716 monitors and facilitates task execution, quality validation, resource release, reputation updates, and so forth. The smart contract creation module 714 encodes task specifications, performance requirements, payment terms, and penalty clauses into executable smart contract code using blockchain programming languages. The smart contract creation module 714 can hold one or more resources (e.g., client payments) in a database (e.g., a smart contract wallet) until task completion criteria are satisfied and/or verified. The smart contract creation module 714 can cause automatic execution of contract functions when specific milestones are reached, deadlines pass, or quality thresholds are met or violated.

An execution and settlement module 716 can monitor ongoing task execution, validate deliverable quality, manage resource allocations, and/or update agent reputation scores based on performance outcomes. For example, the execution and settlement module 716 tracks task progress by monitoring agent activity, collecting status updates, and comparing actual performance against contracted schedules and requirements. The execution and settlement module 716 manages resource allocations by releasing escrowed funds to agents upon completion of a particular task.

Figure 8:
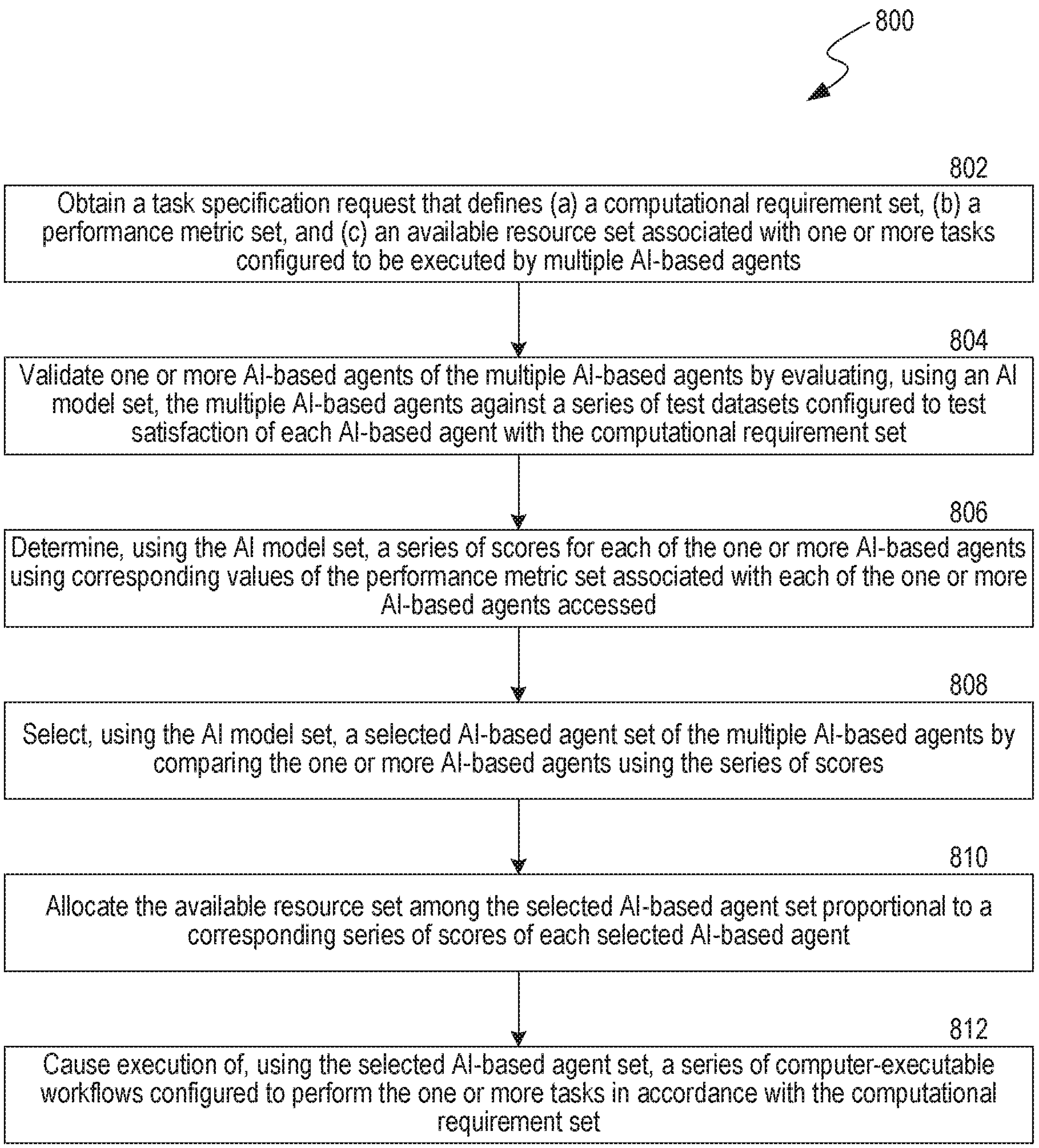
FIG. 8 is a flow diagram illustrating an example process of managing collaboration of AI-based agents using a data monitoring platform, in accordance with some implementations of the present technology.

FIG. 8 is a flow diagram illustrating an example process 800 of managing collaboration of AI-based agents using a data monitoring platform, in accordance with some implementations of the present technology. In some implementations, the process 800 is performed by components of example AI system 1700 and/or computer system 1800 illustrated and described in more detail with reference to FIG. 17 and FIG. 18, respectively. Likewise, implementations can include different and/or additional operations or can perform the operations in different orders.

In operation 802, the data monitoring platform can obtain (e.g., receive, access) a task specification request (e.g., from a computing device) that defines (a) a computational requirement set (e.g., a processing power specification, a data format, or a knowledge domain), (b) a performance metric set, and (c) an available resource set (e.g., a monetary resource, a computational resource) associated with one or more tasks configured to be executed by multiple AI-based agents (e.g., semi-autonomous, autonomous). In some implementations, an orchestrator decomposes the task submission. For example, the data monitoring platform can decompose, using the AI model set, the task specification request to identify (a) the computational requirement set, (b) the performance metric set, and (c) the available resource set.

In operation 804, the data monitoring platform can validate one or more AI-based agents of the multiple AI-based agents by evaluating, using an AI model set (e.g., an LLM), the multiple AI-based agents against a series of test datasets configured to test satisfaction of each AI-based agent with the computational requirement set. For example, the data monitoring platform can generate a series of domain-specific (domains such as NLP, computer vision, and so forth) test datasets configured to test satisfaction of a particular AI-based agent with the computational requirement set. The data monitoring platform can transmit each domain-specific test dataset to an input layer of each AI-based agent of the multiple AI-based agents, and receive, from an output layer of each AI-based agent of the multiple AI-based agents, a digital fingerprint (i.e., cryptographically signed responses) of output content generated responsive to a corresponding domain-specific test dataset, where the digital fingerprint is generated by applying one or more hash functions to the output content. The data monitoring platform can validate the one or more AI-based agents of the multiple AI-based agents by comparing the digital fingerprint from each AI-based agent against a predetermined hash value set stored on a distributed ledger such as a blockchain (e.g., the blockchain infrastructure layer 102 in FIG. 1), a federated ledger (such as the federated ledger discussed with reference to FIG. 1), or other storage database. To maintain a fault tolerance when validating agents, the one or more AI-based agents can be validated in response to a determination that a respective digital fingerprint within a fault threshold of the predetermined hash value set stored on the distributed or federated ledger.

In operation 806, the data monitoring platform can determine, using the AI model set, a series of scores for each of the one or more AI-based agents using corresponding values of the performance metric set associated with each of the one or more AI-based agents accessed. For example, the data monitoring platform can construct, using the AI model set, a multi-dimensional scoring matrix (or other data structure) for each of the one or more AI-based agents by generating a series of weighted composite scores using the corresponding values of the performance metric set for each of the one or more AI-based agents accessed via the distributed or federated ledger. To facilitate peer-based evaluation, the series of scores can include a reputation score, and the reputation score of a particular AI-based agent can be generated by combining peer scores received from other AI-based agents of the one or more AI-based agents. In some implementations, the reputation score of a particular AI-based agent is generated by combining previous series of scores previously determined for the particular AI-based agent.

In operation 808, the data monitoring platform can select, using the AI model set, a selected AI-based agent set of the multiple AI-based agents by comparing the one or more AI-based agents using the series of scores. In some implementations, the data monitoring platform only ranks AI agents based on how the agents performed in previous tasks of the same or similar complexity. For example the data monitoring platform can determine, using the AI model set, a degree of complexity associated with the task specification request using (a) the computational requirement set, (b) the performance metric set, and (c) the available resource set. The data monitoring platform can generate a series of scores using a subset of the corresponding values of the performance metric set for each of the one or more AI-based agents that is generated by filtering corresponding historically executed tasks for the AI-based agent based on the determined degree of complexity.

In operation 810, the data monitoring platform can allocate (e.g., distribute) the available resource set among the selected AI-based agent set proportional to a corresponding series of scores of each selected AI-based agent.

In operation 812, the data monitoring platform can cause execution of, using the selected AI-based agent set, a series of computer-executable workflows configured to perform the one or more tasks in accordance with the computational requirement set. In some implementations, each selected AI-based agent can use a respective distributed resource set to execute the sequence of computer-executable workflows. In some implementations, the smart contract can transfer compensation. For example, the data monitoring platform causes deployment of one or more executable smart contracts that transfers a corresponding allocated resource set to each selected AI-based agent.

In some implementations, the smart contracts only take action (e.g., process compensation) if the agent satisfies the performance threshold. The data monitoring platform can generate one or more executable smart contracts defining a performance threshold set associated with the performance metric set for each selected AI-based agent, such that the one or more executable smart contracts executes one or more computer-executable instructions in response to the selected AI-based agent satisfying the performance threshold set during execution of the sequence of computer-executable workflows. The data monitoring platform can cause deployment of the one or more executable smart contracts within the distributed network.

The data monitoring platform can be updated based upon previous contributions. For example, the data monitoring platform can record values of an individual contribution metric set for each selected AI-based agent, and update the multi-dimensional scoring matrix by combining corresponding values of the individual contribution metric set for each selected AI-based agent with a corresponding series of weighted composite scores. The data monitoring platform can update the selected AI-based agent set of the multiple AI-based agents by ranking the one or more AI-based agents using the updated multi-dimensional scoring matrix.

To redistribute underutilized resources, the data monitoring platform can monitor each selected AI-based agent during execution of the sequence of computer-executable workflows by collecting performance data of the selected AI-based agent that includes one or more of: processing time, memory usage, or task completion rate. The data monitoring platform can dynamically adjust the distribution of the available resource set among the selected AI-based agent set by re-distributing one or more unused resources within a respective distributed resource set of a first AI-based agent within the selected AI-based agent set to a second AI-based agent within the selected AI-based agent set.

Detecting Anomalous Resource Distribution Using the Data Monitoring Platform

Figure 9:
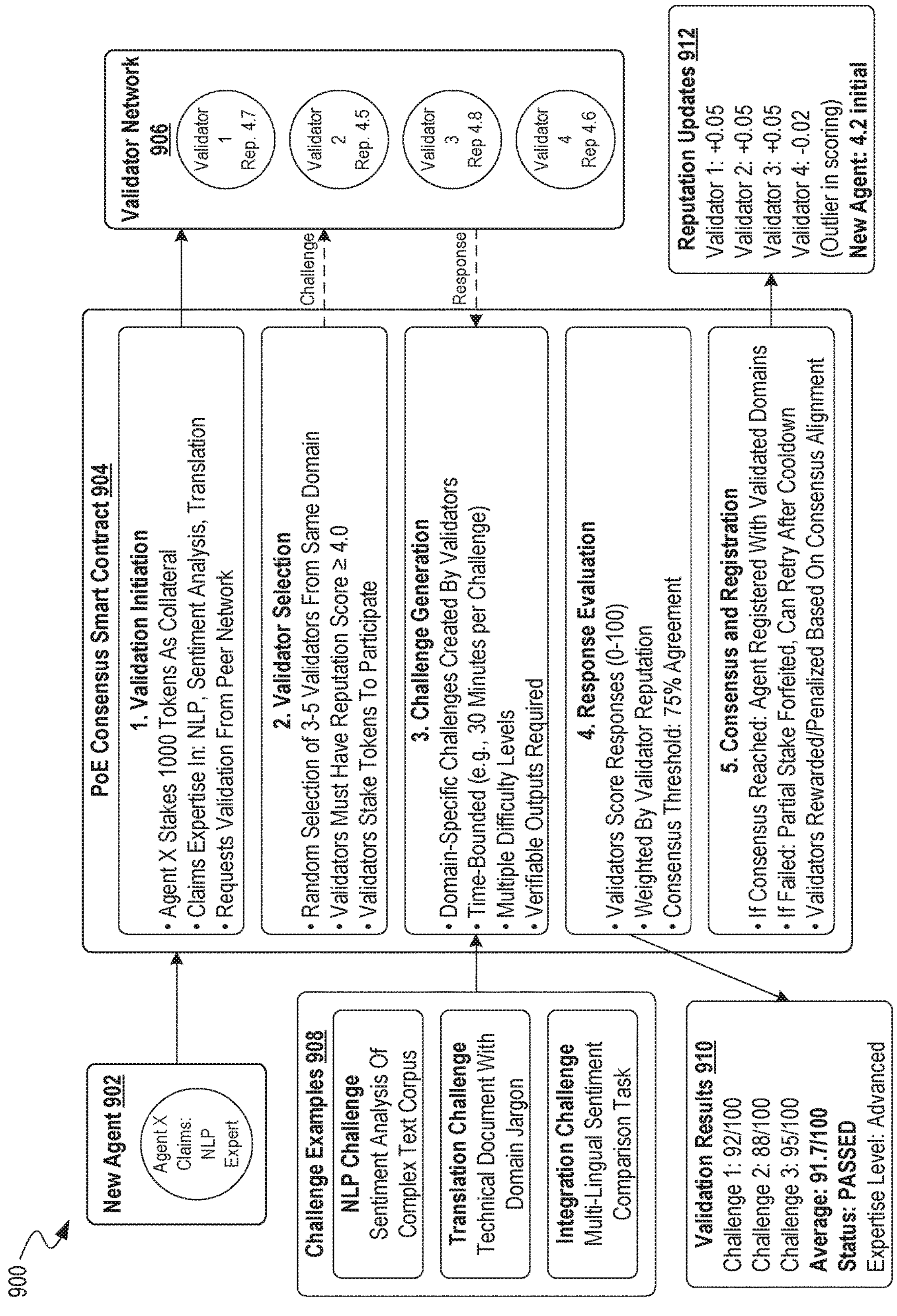
FIG. 9 illustrates an example environment of detecting anomalous resource distribution in distributed AI-based agent networks, in accordance with some implementations of the present technology.

FIG. 9 illustrates an example environment 900 of detecting anomalous resource distribution in distributed AI-based agent networks, in accordance with some implementations of the present technology. The environment 900 is implemented using components of example AI system 1700 and/or computer system 1800 illustrated and described in more detail with reference to FIG. 17 and FIG. 18, respectively. Implementations of example environment 900 can include different and/or additional components or can be connected in different ways.

The environment 900 includes a new agent 902 (e.g., the AI agent 406 and/or the AI agent 506 in FIG. 4 and FIG. 5, respectively) that operates as a third-party AI service provider seeking validation and registration within the distributed network to offer computational services and participate in task execution opportunities. The new agent 902 functions as an autonomous software entity that maintains its own computational resources, trained machine learning models, and specialized capabilities for executing specific types of tasks such as data analysis, natural language processing, computer vision operations, and so forth. In some implementations, the new agent 902 represents an unregistered artificial intelligence entity seeking initial entry into the distributed network.

The new agent 902 submits registration requests to indicate claims associated with, for example, the capability of the agent, a performance metric of the agent, a resource (e.g., price) structure of the agent, and so forth. The new agent 902 generates cryptographic signatures using private key encryption to authenticate its identity and authorize transactions within the data monitoring platform. The new agent 902 can stake cryptocurrency tokens as collateral. The new agent 902 responds to validation challenges by executing test tasks, providing performance demonstrations, and/or submitting evidence of its claimed capabilities to prove its qualifications for network membership.

The new agent 902 is evaluated using a PoE consensus smart contract 904 against a validator network 906 that includes one or more validators (e.g., a first validator, a second validator, a third validator, and so forth). The PoE consensus smart contract 904 receives registration requests from the new agent 902 and initiates validation procedures by selecting qualified validators from the validator network 906 based on domain expertise, reputation scores, and/or availability status. The PoE consensus smart contract 904 generates domain-specific challenge problems by accessing predefined test libraries, creating randomized problem sets, and/or customizing difficulty levels to match the claimed capabilities of the agent being validated. The PoE consensus smart contract 904 collects responses from both the candidate agent and validators, and compares the agent performance against validator expectations and established benchmarks. The PoE consensus smart contract 904 determines whether the candidate agent meets qualification thresholds for network participation. In some implementations, the PoE consensus smart contract 904 uses recursive validation where validator qualifications are themselves verified by higher-tier validators. In some implementations, the PoE consensus smart contract 904 applies time-limited validation periods that require periodic re-validation to maintain network membership.

The validator network 906 includes multiple peer agents (e.g., the validation models 1202 in FIG. 12) responsible for assessing candidate agents and detecting anomalous behavior patterns that indicate particular events such as fraud, collusion, or performance misrepresentation. The validator network 906 can access external data sources such as legal databases, regulatory filings, and news services to identify agents associated with legal proceedings, compliance violations, or other reputation-damaging events. In some implementations, the validator network 906 includes multiple individual validators such as a first validator, second validator, and third validator that each contribute independent assessments. Each validator within the validator network 906 maintains its own computational resources, analytical tools, and data sources that enable independent evaluation of candidate agents without relying on shared infrastructure. The individual validators can participate in reputation scoring by contributing their assessments to weighted voting procedures that determine overall validation outcomes and network access decisions.

The PoE consensus smart contract 904 can obtain challenge examples 908 and use the challenge examples 908 to validate the new agent 902. The PoE consensus smart contract 904 generates validation results 910 and/or reputation updates 912. The challenge examples 908 contain domain-specific problems that require demonstrated expertise in particular domains, such as the domains indicated by the new agent 902 in its claimed capabilities. The challenge examples 908 can correspond to objective evaluation criteria including accuracy thresholds, performance benchmarks, and so forth. In some implementations, the challenge examples 908 are dynamically generated to prevent candidates from overfitting to standard test cases. In some implementations, the challenge examples 908 include collaborative problems that require multiple agents to work together to assess coordination and communication capabilities.

The PoE consensus smart contract 904 generates validation results 910 that document the outcome of capability assessment. The validation results 910 can identify discrepancies between claimed capabilities and demonstrated performance to determine specific areas where the agent exceeded or failed to satisfy its stated qualifications. In some implementations, the validation results 910 indicate conditional approval recommendations that grant limited network access.

The PoE consensus smart contract 904 can generate reputation updates 912 that modify the reputation scores and network standing of both the validated agent and participating validators based on the validation results 910. For example, the reputation updates 912 establish initial reputation scores for newly accepted agents based on their validation performance, with higher scores assigned to agents who exceed qualification requirements. The reputation updates 912 can trigger automatic adjustments to network privileges such as task assignment priorities, pricing advantages, and validation responsibilities that correspond to updated reputation levels. The reputation updates 912 can generate blockchain transactions that record reputation changes in ledger entries, thereby creating permanent audit trails for network participants. In some implementations, the reputation updates 912 apply reputation decay functions that gradually reduce scores over time to prevent the data monitoring platform from relying on past achievements.

Figure 10:
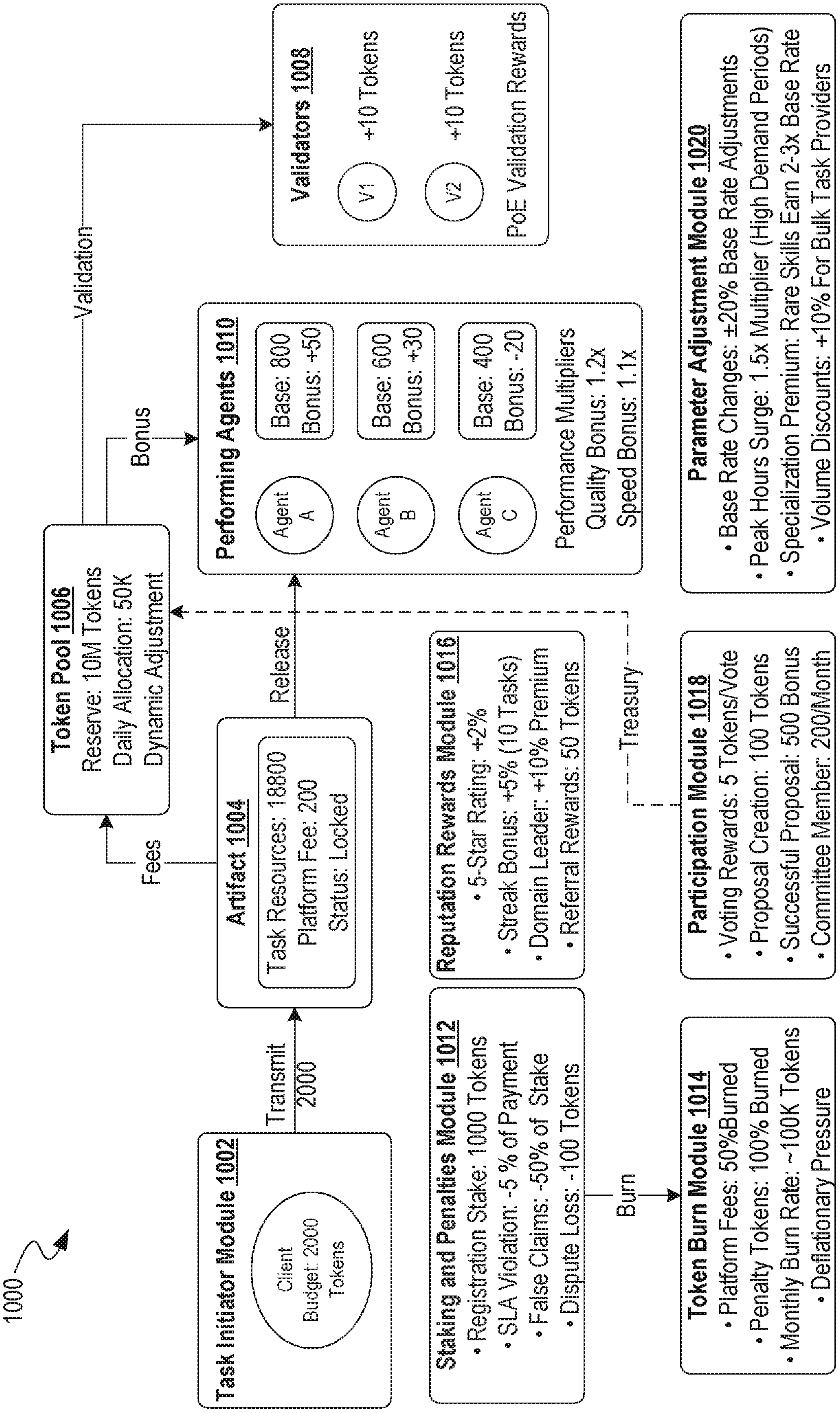
FIG. 10 illustrates an example environment of dynamically adjusting parameters in response to detecting an anomalous resource distribution in distributed AI-based agent networks, in accordance with some implementations of the present technology.

FIG. 10 illustrates an example environment 1000 of dynamically adjusting parameters in response to detecting an anomalous resource distribution in distributed AI-based agent networks, in accordance with some implementations of the present technology. The environment 1000 is implemented using components of example AI system 1700 and/or computer system 1800 illustrated and described in more detail with reference to FIG. 17 and FIG. 18, respectively. Implementations of example environment 1000 can include different and/or additional components or can be connected in different ways.

The environment 1000 includes a task initiator 1002 that transmits resources to an artifact 1004. For example, the task initiator 1002 operates as a client organization seeking AI agent services and provides financial resources to fund task execution within the distributed agent marketplace. The task initiator 1002 can maintain cryptocurrency wallet systems that store digital tokens used for paying agent services and participating in the blockchain-based marketplace economy. The task initiator 1002 can submit task requests containing detailed specifications such as computational requirements, performance expectations, budget allocations, and delivery deadlines that define the scope of work to be completed by selected agents.

The task artifact 1004 represents a structured digital content that represents resources (e.g., computational, monetary), task specifications (e.g., computational requirements, data processing needs, quality thresholds, and delivery deadlines), and/or execution parameters required for completing the requested work. The task artifact 1004 can function as a smart contract-based escrow system that holds the total budget allocation (e.g., 2000 tokens as shown in FIG. 10) provided by the task initiator 1002 until task completion conditions are satisfied. In some implementations, the task artifact 1004 can calculate and reserve platform fees by automatically deducting predetermined percentages (e.g., 200 tokens as shown in FIG. 10) from the total budget to fund network operations, validator compensation, and system maintenance activities. The task artifact 1004 can lock the remaining resources (e.g., 1800 tokens as shown in FIG. 10) in storage where they remain inaccessible until automated release conditions are triggered by successful task completion and quality validation. In some implementations, the task artifact 1004 distributes funds incrementally as agents complete specific task phases. In some implementations, the task artifact 1004 return unused resources to the task initiator when tasks are completed under budget.

The data monitoring platform reserves a portion of the transmitted resources to a token pool 1006, which is used to generate validators 1008. The data monitoring platform releases the remaining resources to performing agents 1010 (e.g., "Agent A," "Agent B," "Agent C," and so forth). The token pool 1006 can maintain a reserve (e.g., 10 M tokens as shown in FIG. 10) to be used for network operations. The token pool 1006 can allocate a daily amount (e.g., 50K tokens as shown in FIG. 10) for operations such as validator rewards, network maintenance, and incentive distribution. In some implementations, the token pool 1006 can execute automatic token distribution by transferring predetermined amounts to validator accounts, agent reward pools, and operational expense accounts according to predefined schedules and performance-based criteria.

The validators 1008 (e.g., the validation models 1202 in FIG. 12) can receive token payments (e.g., +10 tokens each as shown in FIG. 10) from the token pool 1006 in return for executing validation challenges, assessing agent capabilities, and/or providing consensus determinations. The validators 1008 can monitor agent behavior patterns by collecting performance data and/or detecting anomalous activities that indicate events such as potential fraud, collusion, and/or market manipulation. In some implementations, the validators 1008 can operate as rotating committees that change membership periodically to prevent validation manipulation, and/or focus on specific domains and/or capability types.

The data monitoring platform can release the remaining resources to performing agents 1010 that represent the selected AI service providers responsible for executing the computational tasks specified in the original client request. The performing agents 1010 can include Agent A, Agent B, and Agent C that each are associated with different specializations, performance capabilities, resource requirements, and so forth. The performing agents 1010 can execute assigned tasks using their own computational resources, trained machine learning models, and knowledge bases. The performing agents 1010 can receive performance multipliers (e.g., 1.2× for quality bonus and 1.1× for speed bonus as shown in FIG. 10) that incentivize, via the agent's objective function, task completion.

The staking and penalties module 1012 can require agents to deposit a minimum token amount (e.g., 1000 tokens as shown in FIG. 10) as registration collateral before participating in network activities. The staking and penalties module 1012 can calculate SLA violation penalties by deducting a percentage (e.g., 5% of payment as shown in FIG. 10) when agents fail to meet agreed-upon performance standards, response times, and/or quality thresholds specified in their service contracts. The staking and penalties module 1012 can confiscate a portion (e.g., 50% of stake as shown in FIG. 10) when agents are found to have misrepresented their capabilities, performance history, and/or service offerings during registration and/or validation procedures. In some implementations, the staking and penalties module 1012 can use graduated penalty structures that multiply base penalty amounts by violation frequency factors.

The staking and penalties module 1012 can connect to a token burn module 1014 that permanently removes tokens from circulation to create deflationary pressure, via an agent's objective function. The token burn module 1014 can burn a percentage (e.g., 50% as shown in FIG. 10) of collected platform fees by transferring tokens to unspendable blockchain addresses, thereby reducing total token supply and creating upward pressure on token values for remaining holders. The token burn module 1014 can burn all penalty tokens (e.g., 100% as shown in FIG. 10) collected from agent violations, ensuring that penalties create permanent economic consequences rather than simply redistributing tokens to other network participants. In some implementations, the token burn module 1014 can maintain a monthly burn rate (e.g., approximately 100K tokens as shown in FIG. 10) to create consistent deflationary pressure that counteracts token inflation from reward distribution and new token creation. In some implementations, the token burn module 1014 can use automatic burn triggers that increase burn rates during periods of token supply above a certain threshold.

The environment 1000 includes a reputation rewards module 1016 that can distribute additional token compensation to agents based on performance metrics. The reputation rewards module 1016 can provide additional resources (e.g., +2% bonus for 5-star rating as shown in FIG. 10) to agents whose performance metrics satisfy a certain threshold. The reputation rewards module 1016 can award streak bonuses (e.g., +5% for 10 tasks as shown in FIG. 10) to agents who complete consecutive tasks without performance metrics falling below a certain threshold. The reputation rewards module 1016 can distribute referral rewards (e.g., 50 tokens as shown in FIG. 10) to agents who identify other agents subsequently added to the network.

A participation module 1018 uses the token pool to allocate resources among the performing agents 1010. The participation module 1018 can distribute voting rewards (e.g., 5 tokens per vote as shown in FIG. 10) to agents who engage in governance decisions including network parameter adjustments, policy changes, and so forth. The participation module 1018 can provide proposal creation rewards (e.g., 100 tokens as shown in FIG. 10) to agents who submit proposals that address network improvements, policy updates, and/or operational modifications. Further, the participation module 1018 can calculate participation scores based on voting frequency counts, proposal quality assessments, and so forth. The participation scores can be used by the participation module 1018 to, for example, delegate further resources and/or tasks to certain agents with higher scores.

A parameter adjustment module 1020 can adjust one or more parameters based on, for example, data from the token burn module 1014 and/or the participation module 1018. The parameter adjustment module 1020 can adjust base pricing rates by applying percentage modifications (e.g., ±20% as shown in FIG. 10) when supply and demand imbalances are detected based on statistical analysis of task request volumes and agent availability levels. The parameter adjustment module 1020 can apply peak hours surge multipliers (e.g., 1.5× during high demand as shown in FIG. 10) when task request volumes exceed agent capacity. The parameter adjustment module 1020 can calculate specialization premiums (e.g., 2-3× base rate for rare skills as shown in FIG. 10) for agents with expertise in high-demand domains where qualified agent supply is limited relative to client demand. The parameter adjustment module 1020 can monitor marketplace metrics including transaction volumes, price trends, agent utilization rates, and/or participation scores to identify when parameter adjustments are needed by comparing current metrics against predefined threshold ranges and triggering adjustment functions when metrics fall outside predefined bounds.

Figure 11:
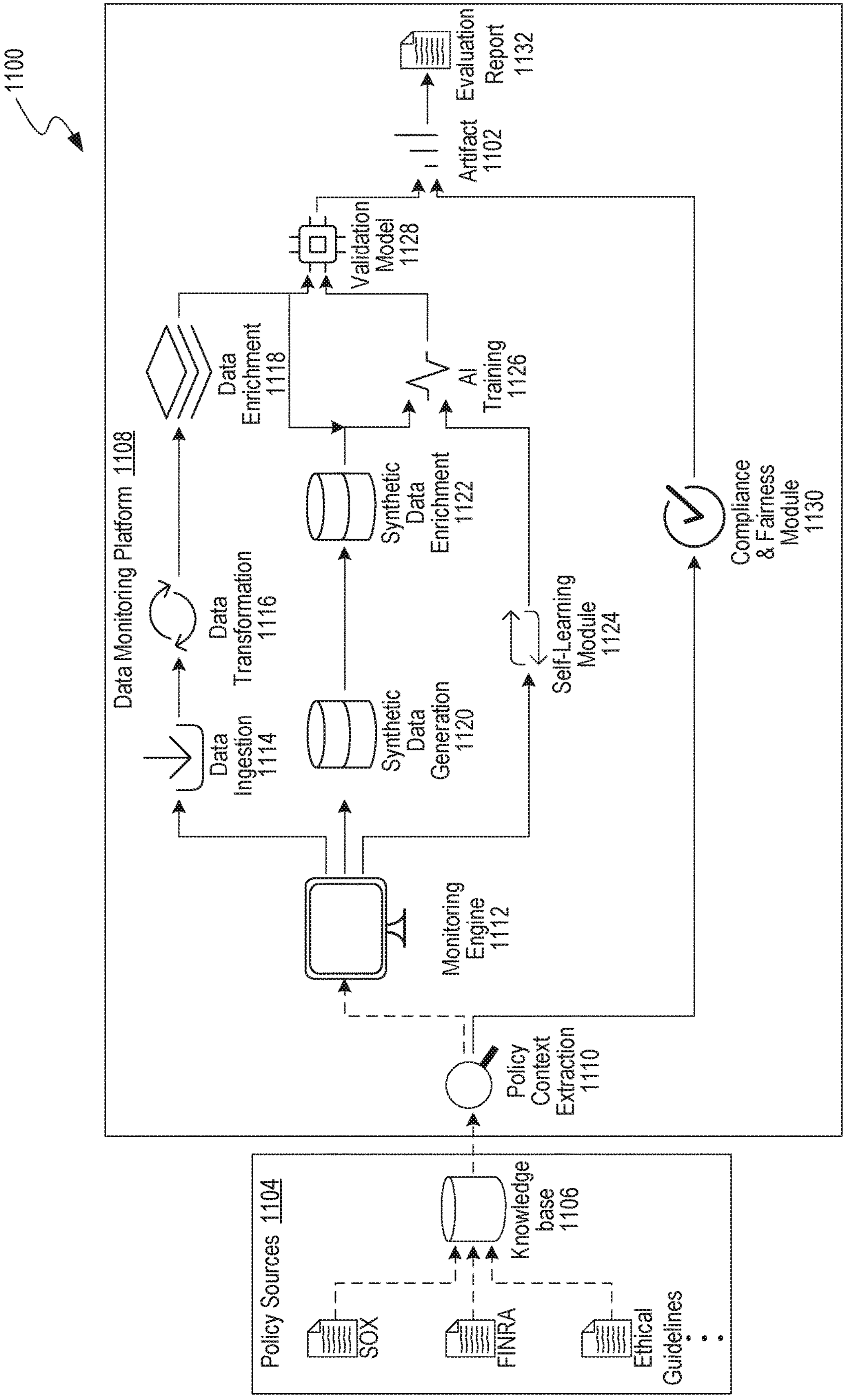
FIG. 11 is a block diagram illustrating an example environment for dynamic multi-model monitoring and validation of a generative artificial intelligence model, in accordance with some implementations of the present technology.

FIG. 11 is a block diagram illustrating an example environment 1100 for dynamic multi-model monitoring and validation of a generative artificial intelligence model. Environment 1100 includes artifact 1102, policy sources 1104 (which can include knowledge base 1106), and data monitoring platform 1108. Data monitoring platform 1108 can include policy context extraction module 1110, monitoring engine 1112, data ingestion module 1114, data transformation module 1116, data enrichment module 1118, synthetic data generation module 1120, synthetic data enrichment module 1122, self-learning module 1124, AI training module 1126, validation model 1128, compliance and fairness module 1130, and evaluation report 1132. Implementations of example environment 1100 can include different and/or additional components or can be connected in different ways.

The artifact 1102 can be thought of as the subject to be monitored and validated, such as an output generated by the generative AI model. For example, the artifact 1102 can be any form of data, such as text, images, or other multimedia content, produced by the AI model. In some implementations, artifact 1102 can include structured data outputs, such as tables or graphs. For example, an artifact can be a text summary of a legal document, an image generated from a text description, and/or a graph representing data trends. The artifact 1102 is evaluated against various compliance and performance metrics by the data monitoring platform 1108 using methods discussed with reference to FIG. 18.

The artifact 1102 can be evaluated for compliance against the criteria within the policy sources 1104. The policy sources 1104 encompass a range of regulatory and policy documents that provide guidelines and standards for AI model compliance. The policy sources 1104 can include internal company policies, industry standards, legal regulations, and/or other guidelines. For example, policy sources 1104 can include ethical guidelines that ensure AI models operate within moral boundaries, such as avoiding bias and ensuring fairness. Additionally, policy sources 1104 can include regulations from financial regulatory bodies like the Financial Industry Regulatory Authority (FINRA). Compliance with FINRA regulations can include adhering to standards for transparency, accuracy, and/or investor protection. Policy sources can further include regulations such as the Sarbanes-Oxley Act (SOX), which sets requirements for financial reporting and corporate governance. For example, AI models used in financial reporting are required to comply with SOX standards relating to the accuracy and integrity of financial data. In some implementations, policy sources 1104 can integrate real-time updates from regulatory bodies to ensure the AI model remains compliant with the latest standards using methods discussed with reference to FIG. 18. The knowledge base 1106 within policy sources 1104 stores structured and unstructured data related to the policies. For example, structured data can be structured databases of regulations, while unstructured data can be text documents or emails.

The artifact 1102 can be evaluated for compliance against the criteria within the policy sources 1104 using the data monitoring platform 1108. In some implementations, the data monitoring platform 1108 can be distributed across multiple servers. For example, the data monitoring platform 1108 can include a multi-model superstructure that monitors and validates artifact 1102 against the criteria in policy sources 1104. In some implementations, the artifact 1102 can be a model output of a model within the data monitoring platform 1108 itself.

To enable the data monitoring platform 1108 to evaluate the artifact 1102, the policy context extraction module 1110 identifies the criteria within the policy sources 1104. In particular, the policy context extraction module 1110 within the data monitoring platform 1108 extracts criteria and/or context within the knowledge base 1106 containing the policy sources 1104 to provide assessment metrics and threshold values of the assessment metrics in which to use to evaluate artifact 1102. The policy context extraction module 1110 can extract criteria and/or context by using methods discussed with reference to FIG. 18. The extracted information can be used by the monitoring engine 1112 to continuously observe the artifact 1102 and detect deviations from expected behavior. For example, the monitoring engine 1112 can task one or more validation model(s) 1128 to detect bias, inaccuracies, and non-compliance with guidelines of the artifact 1102. Methods of determining which validation model(s) 1128 to evaluate artifact 1102 is discussed in further detail with reference to FIG. 18.

The data ingestion module 1114 collects data from various sources, including for example historical AI model outputs, external dataset (e.g., publicly available data, industry benchmarks), the criteria extracted from the policy context extraction module 1110, user interaction data, system logs of the model generating the artifact 1102 and/or the validation model 1128, and so forth. The ingested data can be processed by the data transformation module 1116 to transform the ingested data using techniques such as normalization (e.g., scaling numerical data to a standard range, such as 0 to 1), aggregation (e.g., summarizing/averaging data points), and/or other preprocessing techniques. In some implementations, the data transformation module 1116 can include data anonymization (e.g., replacing personally identifiable information (PII) such as names and social security numbers with pseudonyms or hashed values) to protect sensitive information. The data enrichment module 1118 can supplement the transformed data by adding additional context or metadata, such as appending geolocation data to provide geographical context (e.g., a guideline only affects artifacts within a certain region), or adding timestamps to provide temporal context for particular guidelines (e.g., a guideline only affects artifacts within a certain range of timestamps). For example, the additional context/metadata can be appended as a new field in the dataset.

The synthetic data generation module 1120 creates new data samples to test the AI model that generated the artifact 1102 under various scenarios. The synthetic data generation module 1120 can produce artificial data that mimics real-world conditions, allowing the data monitoring platform 1108 to evaluate the model's performance in different situations. In some implementations, the synthetic data generation module 1120 can use generative adversarial networks (GANs) to create realistic synthetic data. To generate synthetic data for various types of ingested data, the synthetic data generation module 1120 can use GANs to create synthetic outputs that mimic the patterns and distributions observed in the ingested data by training the generator on historical data to produce statistically similar samples. Further, the synthetic data generation module 1120 can create synthetic data that adheres to the specified policies and guidelines using information identified in the policy context extraction module 1110. The synthetic data enrichment module 1122 can further refine the synthetic data, ensuring that the synthetic data accurately represents the conditions it is meant to simulate. For example, the synthetic data enrichment module 1122 can add noise to the synthetic data to simulate real-world variability or integrate contextual metadata, such as geolocation information or temporal markers.

The self-learning module 1124 enables the data generation platform to learn from past monitoring results and continuously refine its ability to detect and address issues by training the monitoring model (e.g., the validation model 1128) on data that becomes available over time. In some implementations, the self-learning module 1124 can incorporate reinforcement learning algorithms (e.g., Q-learning or policy gradient methods) to improve the accuracy and consistency of its decision-making process. The AI training module 1126 module trains the validation model 1128 using the enriched data of the data enrichment module 1118, the synthetic data from the synthetic data enrichment module 1122, and updated adjustments from the self-learning module 1124.

The trained validation model 1128 and the compliance and fairness module 1130 can be thought of as a part of the suite of monitoring models used to evaluate the artifact 1102. In some implementations, the compliance and fairness module 1130 contains pre-trained models to evaluate the artifact 1102 for compliance with the guidelines (e.g., policy sources 1104). For example, the monitoring models can evaluate the artifact 1102 (e.g., an AI model's outputs) against predefined metrics. For example, the monitoring models can assess the quality, accuracy, and compliance of the generated artifacts 1102 using methods discussed with reference to FIG. 18. The compliance and fairness module 1130 can be the same as the validation model 1128, or a separate model to ensure that the AI model adheres to ethical guidelines and regulatory standards within the policy context extraction module 1110 and knowledge base 1106. In some implementations, the suite of models including the compliance and fairness module 1130 and the validation model 1128 can monitor the artifact 1102 using a changed architecture discussed with reference to FIG. 18. The evaluation report 1132 can be thought of as the compliance indicator of the artifact 1102. In some implementations, the evaluation report 1132 can include confidence scores or other metrics to indicate the reliability of the output. The evaluation report 1132 can provide a summary of the monitoring and validation process, including any issues detected and the corrective actions suggested or taken.

Figure 12:
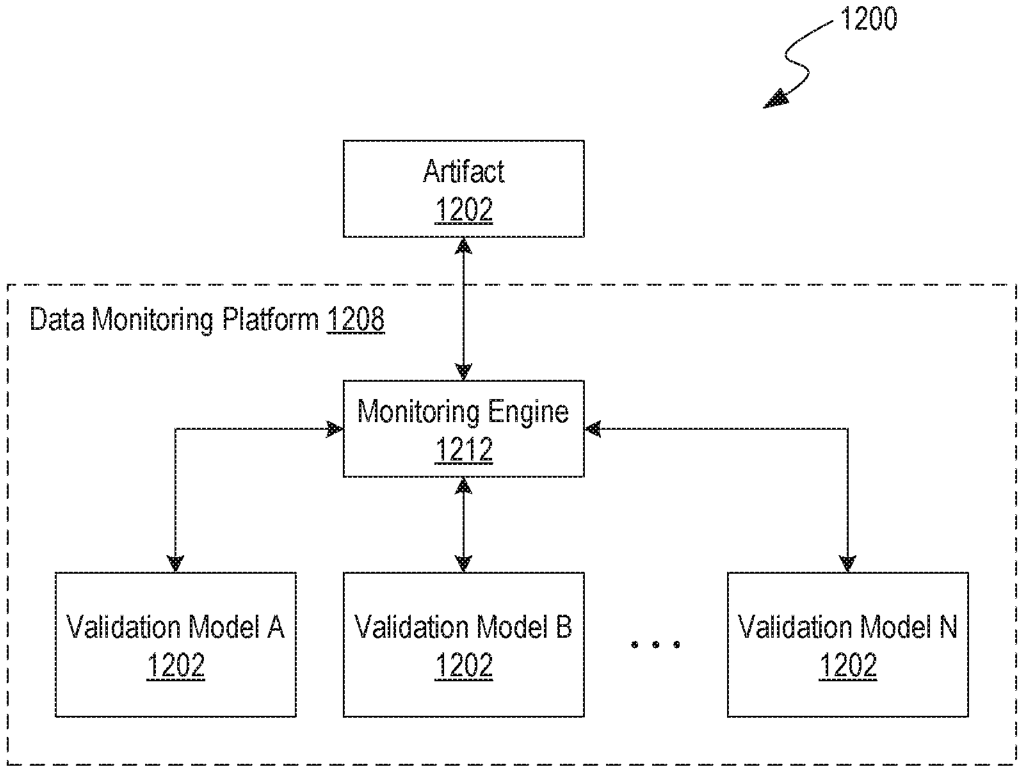
FIG. 12 is a block diagram illustrating an example architecture of a data monitoring platform, in accordance with some implementations of the present technology.

FIG. 12 is a block diagram illustrating an example architecture 1200 of the data monitoring platform 1108 of FIG. 11. Architecture 1200 can ingest artifact 1102 via data monitoring platform 1108, which can include monitoring engine 1112 and validation models 1202. Implementations of example architecture 1200 can include different and/or additional components or can be connected in different ways.

The monitoring engine 1112 can assess the artifact 1102 using a suite of validation models 1202, which include one or more types of AI models. Validation models 1202 can be the same as or similar to validation model 1128 or model(s)

within the compliance and fairness module 1130. The validation models 1202 can be domain-specific and/or generic. Generic validation models 1202 can be used to evaluate the artifact 1102 against a series of common assessment metrics and standards, while domain-specific validation models can be tailored to specific types of artifacts 1102 or industries (e.g., trained on domain-specific data). For example, a generic validation model can assess the readability of text outputs or the accuracy of numerical data. Domain-specific validation models for the financial industry, for example, can evaluate the compliance of financial reports with regulations such as the SOX and/or FINRA guidelines. The monitoring engine 1112 continuously observes the AI model's outputs (e.g., artifacts 1102) and uses the validation models 1202 to assess the artifact against various compliance and performance metrics. For example, the monitoring engine 1112 can use a generic validation model to assess the readability of a text output and a domain-specific validation model to evaluate the compliance of a financial report with SOX regulations. Within the monitoring engine 1112, there can be a suite of monitoring models, each determining the validation models 1202 to be used using different methods discussed with reference to FIG. 18 (e.g., random, predefined intervals).

Figure 13:
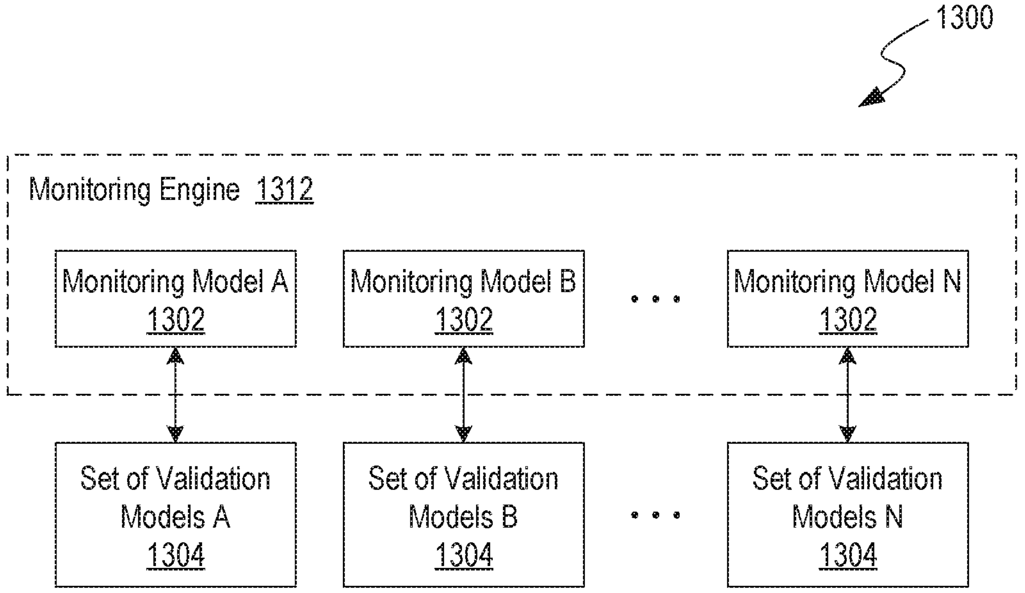
FIG. 13 is a block diagram illustrating an example architecture of a suite of monitoring models in a monitoring engine of a data monitoring platform, in accordance with some implementations of the present technology.

FIG. 13 is a block diagram illustrating an example architecture 1300 of a suite of monitoring models 1302 in the monitoring engine 1112 of FIG. 11. Architecture 1300 includes monitoring engine 1112, monitoring models 1302, and validation models 1304. Implementations of example architecture 1300 can include different and/or additional components or can be connected in different ways.

Each monitoring model 1302 in the suite can have its own set of validation models 1304 (e.g., validation model 1128) or share a single set of validation models 1304 with other monitoring models 1302. The particular monitoring model(s) 1302 can be assigned to validate artifact 1102 either randomly, based on predefined criteria, through a rotating schedule, and so forth. In some implementations, the assignment of monitoring models can be dynamic, adapting to the specific needs of the artifact 1102 being evaluated. For example, an artifact 1102 that is image based can automatically be assigned a monitoring model 1302 specialized in image artifacts. Each monitoring model 1302 can validate the artifact 1102 using different methods. For example, one monitoring model 1302 can validate the artifact 1102 using a majority vote between the validation models 1304, whereas another monitoring model 1302 can use a singular validation model 1304 to validate the artifact 1102. In some implementations, similarly to that of the validation models 1304, the monitoring models 1302 can also be generic or domain-specific. The monitoring models 1302 and/or validation models 1304 can operate either in parallel or sequentially. When running in parallel, multiple models—whether identical or different—simultaneously analyze the same input data. In some implementations, different portions of the input data can be assigned to different models. On the other hand, when running sequentially, the models can operate individually or be arranged in an end-to-end pipeline where the output of one model serves as the input for the next.

In a random assignment, the monitoring engine 1112 can select a monitoring model 1302 (or multiple) from the suite of monitoring models 1302 at random to evaluate the artifact to ensure that the artifact is evaluated from different perspectives, reducing the risk of bias or overfitting. In a predefined assignment, the monitoring engine 1112 can select a monitoring model 1302 based on specific criteria, such as the type of artifact 1102 and/or particular policy sources (e.g., policy sources 1104 in FIG. 11). For example, a financial report artifact can be evaluated by a monitoring model specialized in financial compliance, while a medical record artifact can be evaluated by a monitoring model focused on healthcare regulations. In a rotating assignment, the monitoring engine 1112 can cycle through the suite of monitoring models 1302 to prevent any single monitoring model from being overfitted. In some implementations, the monitoring engine 1112 can dynamically adapt the assignment of monitoring models 1302 based on the specific needs of the artifact 1102 using methods discussed with reference to FIG. 18. For example, if the artifact 1102 is a complex document with multiple sections, the monitoring engine 1112 can assign different monitoring models to evaluate each section. Further, in some implementations, the system reduces overfitting by using k-fold cross-validation (i.e., dividing the dataset into k subsets and trains the model k times, each time using a different subset as the validation set), regularization techniques (i.e., L1 and L2 regularization to penalize large coefficients to prevent fitting noise), data augmentation (i.e., artificially expanding the training data by creating modified versions of existing data), feature selection (i.e., identifying and retaining only the most relevant features to reduce model complexity), dropout (i.e., randomly deactivating a fraction of neurons during training to prevent over-reliance on specific neurons), and/or ensembling techniques (e.g., such as bagging, stacking, and boosting to combine predictions from multiple models).

Figure 14:
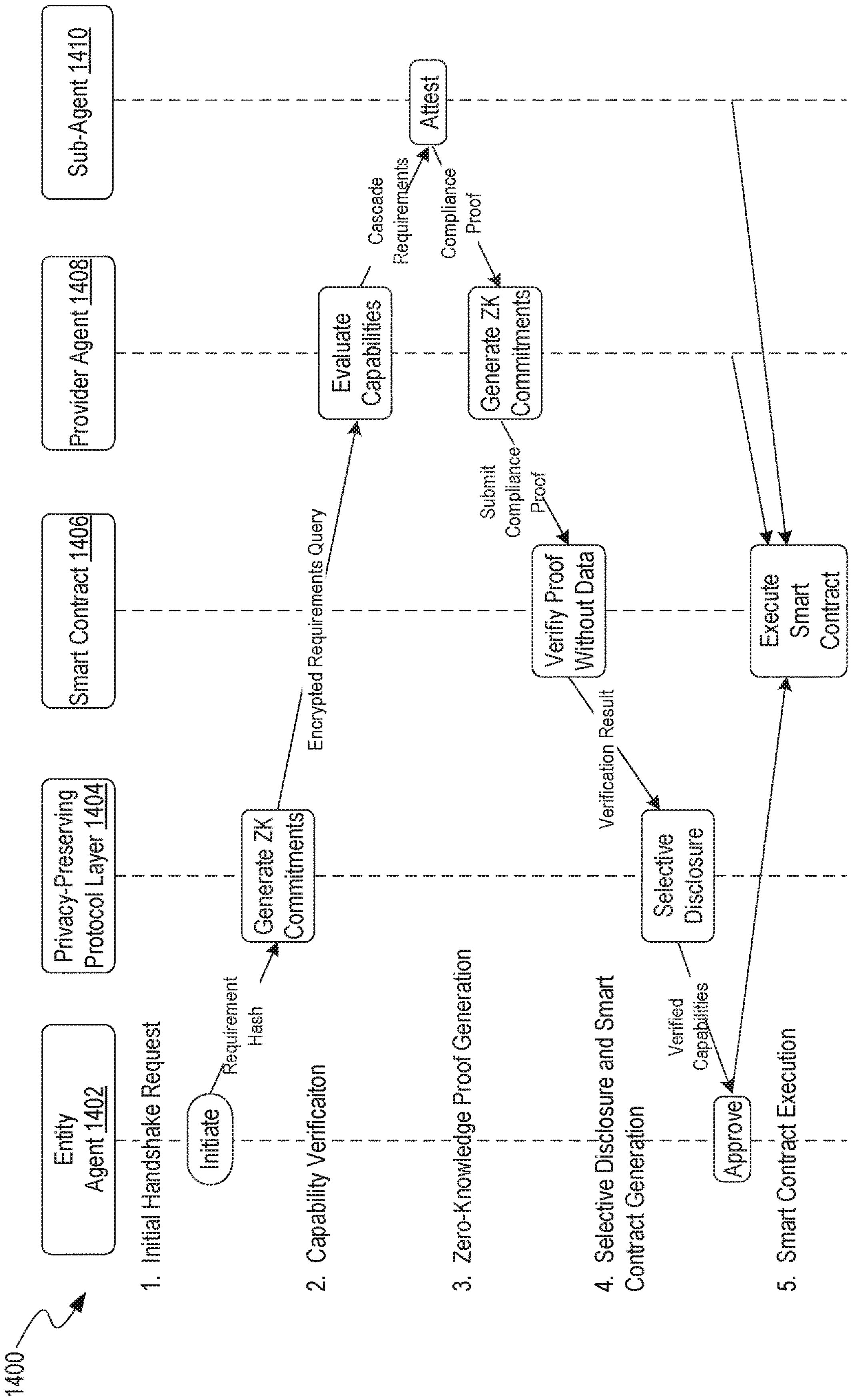
FIG. 14 illustrates an example environment of a data monitoring platform for verifying autonomous agents in multi-tiered distributed systems that include a sub-agent associated with a provider agent, in accordance with some implementations of the present technology.

FIG. 14 illustrates an example environment 1400 of a data monitoring platform for verifying autonomous agents in multi-tiered distributed systems that include a sub-agent associated with a provider agent, in accordance with some implementations of the present technology. Environment 1400 includes an entity agent 1402, privacy-preserving protocol layer 1404, smart contract 1406, provider agent 1408, and sub-agent 1410. The sub-agent 1410 is the same as or similar to the AI system 1700 illustrated and described in more detail with reference to FIG. 17. The environment 1400 can be implemented using components of example computer system 1800 illustrated and described in more detail with reference to FIG. 18. Likewise, implementations of example environment 1400 can include different and/or additional components or can be connected in different ways.

The entity agent 1402 refers to an agent representing the primary organization (e.g., entity) in the multi-tiered distributed system. The entity agent 1402 can generate an initial handshake request, which includes a cryptographic requirement hash. For example, the entity agent 1402 constructs an initialization packet containing digitally encoded operational parameters and constraints. The parameters are transformed into a fixed-length, non-invertible digital summary, thereby ensuring that the operational data can be uniquely referenced without direct exposure. The resulting digital artifact can be referred to as a cryptographic commitment and can be transmitted to a privacy-preserving protocol layer 1404.

The privacy-preserving protocol layer 1404 is enabled to facilitate secure and confidential interactions between the various agents in the system. Upon receiving the requirement hash from the entity agent 1402, this privacy-preserving protocol layer 1404 generates zero-knowledge (ZK) commitments, or additional binding values (i.e., commitments that securely reference but do not expose values of the original dataset). The values can be linked to their source data via collision-resistant transformations and can include random secret values to prevent reverse engineering. The privacy-preserving protocol layer 1404 enables computational routines (such as verification of agent capabilities) to be executed on encrypted or obfuscated data inputs, such that assertions about agent compliance or resource sufficiency can be verified by external parties without the underlying operational data being revealed.

The smart contract 1406 refers to a self-executing program deployed on a distributed ledger or blockchain infrastructure. The smart contract 1406 can implement zero-knowledge proof verification to validate compliance proofs submitted by the provider agent 1408. The provider agent 1408 refers to an agent representing a service provider or vendor in the multi-tiered system. The provider agent 1408 receives encrypted requirements queries and evaluates the respective capabilities of the provider agent 1408 against these requirements. The provider agent 1408 can generate and submit compliance proofs.

In some implementations, the requirements query from the smart contract 1406 includes cascading requirements. Cascading requirements refer to a hierarchical set of operational, regulatory, or contractual obligations that originate from a primary contracting entity and are enforced across every tier of participating service agents, ensuring that not only provider agent 1408 but also any associated sub-agent 1410 adheres to the same standards. When the provider agent 1408 receives these upstream requirements, the provider agent 1408 can determine which obligations are applicable to each sub-agent under its domain. For example, the provider agent 1408 can generate a subset of requirements applicable to a sub-agent 1410 by applying one or more field filters on the requirements. The provider agent 1408 can transmit the resulting subset of requirements to the sub-agent 1410.

The sub-agent 1410 refers to an agent operating under the purview of the provider agent 1408. Upon receiving cascaded requirements, the sub-agent 1410 can verify its compliance by running self-diagnostic routines, analyzing historical performance data, or conducting near-real-time or real-time capability assessments. The sub-agent 1410 generates its own artifacts, such as ZK commitments, which can be aggregated or composed with those of the provider agent 1408. These artifacts can be relayed upstream to provider agent 1408, who aggregates and/or verifies them prior to generating an overall compliance proof for submission to the contracting entity or smart contract layer. The smart contract 1406 and/or the entity agent 1402 can verify incoming proofs, generated and submitted by the provider agent 1408 and/or the sub-agent 1410, against predefined compliance conditions whose parameters correspond to the commitment artifacts transmitted earlier in the process. Upon successful validation of these proofs by the smart contract 1406 and/or the entity agent 1402, the smart contract 1406 autonomously updates the shared ledger.

Figure 15:
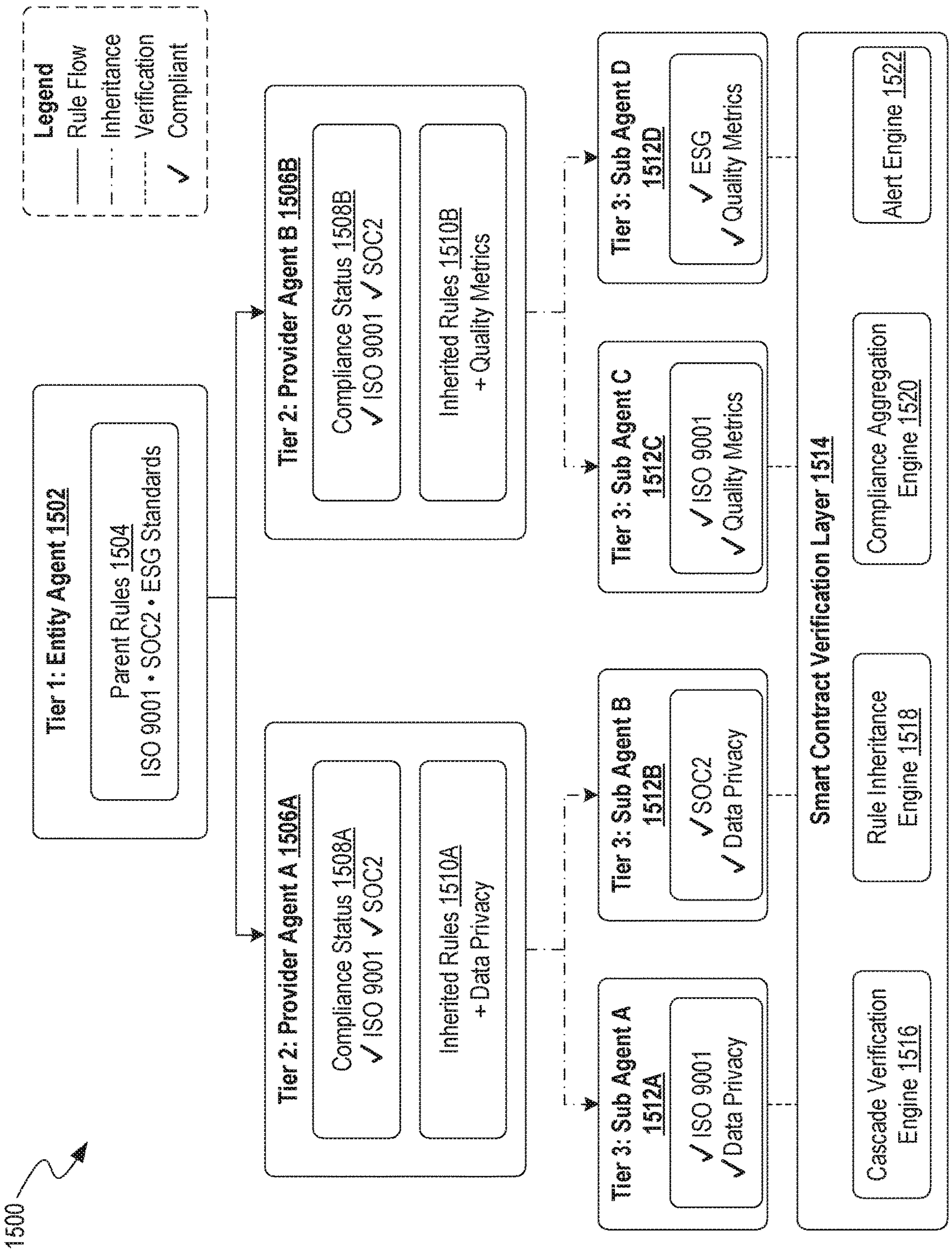
FIG. 15 illustrates an example environment of a data monitoring platform for verifying autonomous agents in multi-tiered distributed systems that include multiple provider agents and sub-agents, in accordance with some implementations of the present technology.

FIG. 15 illustrates an example environment 1500 of a data monitoring platform for verifying autonomous agents in multi-tiered distributed systems that include, for an entity agent 1502 (e.g., the entity agent 1402 in FIG. 14), multiple provider agents 1506 (e.g., a first provider agent 1506A, a second provider agent 1506B, and so forth) and sub-agents (e.g., a first sub-agent 1512A, a second sub-agent 1512B, a third sub-agent 1512C, a fourth sub-agent 1512D, and so forth), in accordance with some implementations of the present technology. The environment 1500 can be implemented using components of example computer system 1800 illustrated and described in more detail with reference to FIG. 18. Likewise, implementations of example environment 1500 can include different and/or additional components or can be connected in different ways.

The entity agent 1502 is instantiated as an autonomous or semiautonomous software module representing the primary organization's computational authority in a distributed, multi-tiered system. The entity agent 1502 defines and/or maintains the parent rules 1504, which operate to provide global requirement specifications for all subordinate nodes and agents throughout the system. These rules may cover technical standards, operational thresholds, security benchmarks, and compliance objectives (e.g., categories such as quality management, information security, and sustainability). In the illustrated example, the parent rules 1504 include ISO 9001 quality management standards, SOC2 information security standards, and ESG (environmental, social, and governance) criteria. The parent rules 1504 can be implemented as a dynamic, graph-based data structure to enable rule propagation and inheritance across multiple tiers. Each rule node can include metadata, conditional logic, and pointers to child rules for inheritance. If a parent rule is updated based on downstream feedback or external regulatory triggers, the change can be automatically distributed through the graph, thereby updating the rule subsets for each downstream provider agent or sub-agent. The parent rules 1504 can include self-modifying code elements that enable automated updates based on feedback from lower tiers and/or external regulatory changes (e.g., automatically increasing security requirements if new risks are detected or downgrading thresholds upon regulatory relaxation).

The provider agents 1506 (e.g., first provider agent 1506A, second provider agent 1506B) refer to second-tier (or lower-tier) agents representing service providers or vendors within the multi-tiered network. The provider agents 1506 can interpret and implement particular subsets of the parent rules 1504. Each provider agent can maintain its own digital compliance status 1508 (e.g., first compliance status 1508A, second compliance status 1508B), which can be implemented as an updatable data object or transaction log that records the agent's current adherence to technical, operational, and contractual standards. Status updates can be computed via continuous assessments. For example, provider agents automatically ingest operational logs, telemetry data, and workflow outputs, then execute probabilistic, rule-based algorithms to determine and revise the real-time state of compliance. Status objects can generate and export cryptographically signed attestations or proofs, enabling compliance states to be independently verified by upstream agents or the system's smart contract layer.

The inherited rules 1510 (e.g., first inherited rule 1510A, second inherited rule 1510B) refer to subsets of the parent rules 1504 that are specifically associated with each provider agent and its associated sub-agents. For example, a rule inheritance engine (such as rule inheritance engine 1518, detailed below) can parse the rule graph to identify and filter the specific requirements applicable to each agent's operational context, resource capabilities, and contractual obligations. The output is a machine-readable structure for each inherited rule (e.g., first inherited rule 1510A on data privacy, second inherited rule 1510B on quality metrics), with metadata tags linking each inherited rule back to its parent.

The sub-agents 1512 (e.g., first sub-agent 1512A, second sub-agent 1512B, third sub-agent 1512C, fourth sub-agent 1512D) refer to agents operating under the purview of the provider agents. Each sub-agent 1512 receives its assigned inherited rules 1510, parses rule logic, and executes local verification routines to determine its own degree of compliance. The sub-agents 1512 may form collaborative groups and execute multi-party computation protocols that enable the sub-agents 1512 to jointly compute aggregate compliance metrics or execute shared compliance verification tasks. For example, the sub-agents 1512 contribute encrypted data shares or partial proofs so that no single entity learns the complete operational data of another; yet, the system can still collectively determine the state of compliance across all collaborating sub-agents.

The smart contract verification layer 1514 refers to a blockchain-based infrastructure that enables automated compliance verification and enforcement across all tiers of the system. The smart contract verification layer 1514 hosts smart contracts that receive compliance data, proofs, and attestations from agents and execute deterministic verification routines encoded as program logic. The smart contract verification layer 1514 can include a cascade verification engine 1516, which propagates and verifies compliance requirements from the top tier down to the sub-agents. The cascade verification engine 1516 can use directed acyclic graph (DAG) structures of verification dependencies to map which agents and which compliance tasks must be fulfilled before system-wide compliance is recognized. As compliance proofs are submitted, the engine traverses the DAG, validating each dependency and updating network state accordingly.

The rule inheritance engine 1518 refers to a module that manages the dynamic generation and adaptation of inherited rules for each tier. The rule inheritance engine 1518 accepts as input the parent rule graph and agent profile data, then applies inheritance policies and prioritization logic to output a customized set of inherited rules for every downstream agent. The rule inheritance engine 1518 can continuously adapt rule assignments as new agents come online, as feedback or compliance reports are received, and/or as parent rules are updated, thereby ensuring all rule propagation is contextually accurate and up-to-date throughout the distributed network.

The compliance aggregation engine 1520 can collect and synthesize compliance data streams from multiple provider agents and sub-agents. The compliance aggregation engine 1520 can use weighted scoring to combine the disparate data into an overall compliance report or status object reflecting the state of the entire multi-agent, multi-tiered system. Results can be stored as machine-readable records.

The alert engine 1522 refers to a near-real-time or real-time monitoring and notification system that detects and reports compliance violations or anomalies. The alert engine 1522 can evaluate compliance data and system telemetry in near-real time or real time. When a violation or anomaly is detected, the alert engine 1522 triggers automated notifications (such as digital alerts or on-chain events), and can include diagnostic data or remediation instructions. All alerts can be logged for auditability, and the alert engine's 1522 thresholds and response behaviors can be dynamically adjustable based on evolving system states.

Figure 16:
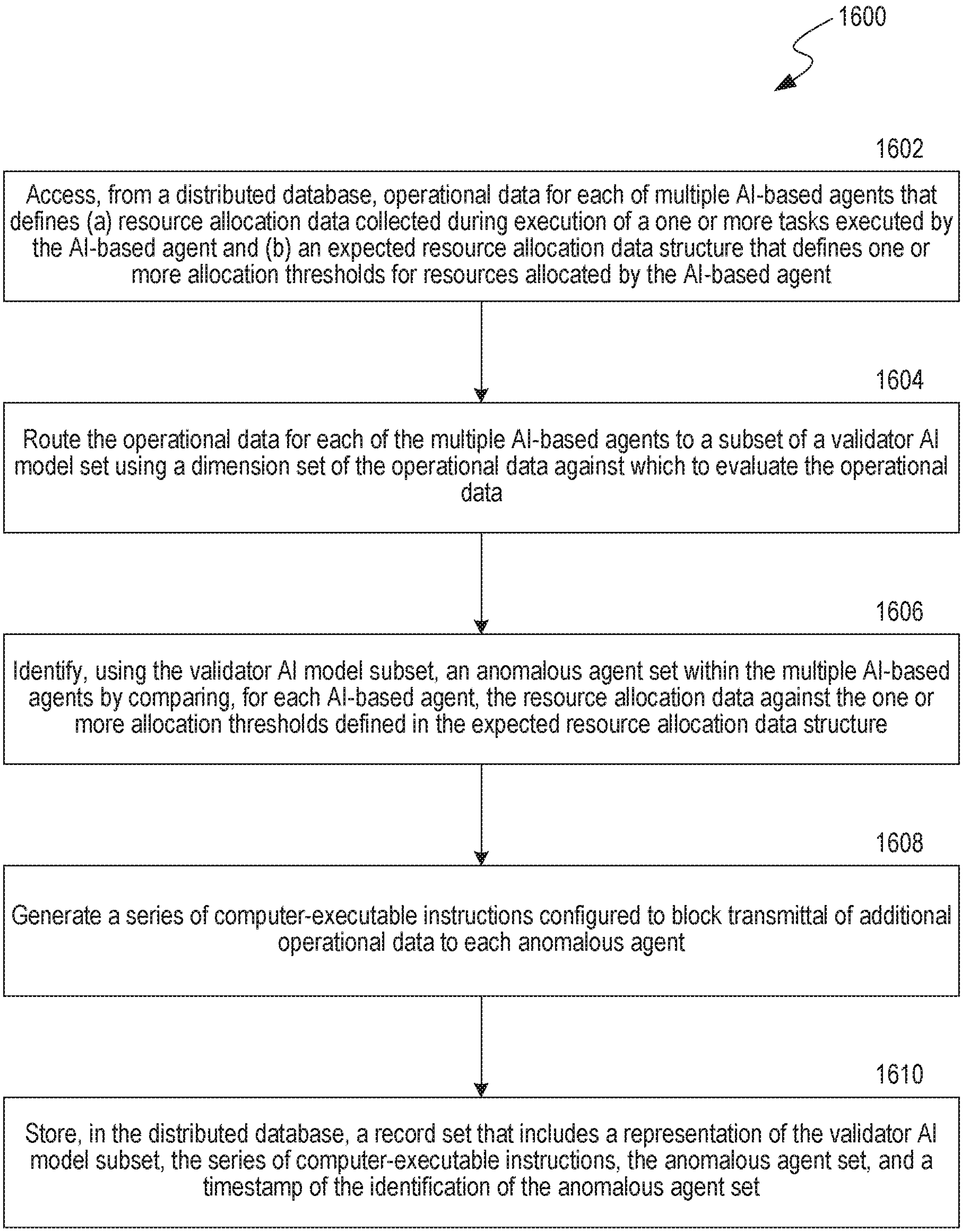
FIG. 16 is a flow diagram illustrating an example process of detecting anomalous resource distribution in distributed AI-based agent networks using a data monitoring platform, in accordance with some implementations of the present technology.

FIG. 16 is a flow diagram illustrating an example process 1600 of detecting anomalous resource distribution in distributed AI-based agent networks using a data monitoring platform, in accordance with some implementations of the present technology. In some implementations, the process 1600 is performed by components of example AI system 1700 and/or computer system 1800 illustrated and described in more detail with reference to FIG. 17 and FIG. 18, respectively. Likewise, implementations can include different and/or additional operations or can perform the operations in different orders.

In operation 1602, the data monitoring platform can access, from a distributed ledger such as a blockchain (e.g., the blockchain infrastructure layer 102 in FIG. 1), a federated ledger (such as the federated ledger discussed with reference to FIG. 1), or other storage database, operational data for each of multiple AI-based agents (e.g., semi-autonomous or autonomous) that defines resource allocation data (e.g., traffic data, e.g., pricing data) collected during execution (e.g., semi-autonomous or autonomous) of a one or more tasks executed by the AI-based agent and/or an expected resource allocation data structure that defines one or more allocation thresholds for resources (e.g., monetary resource, computational resource) allocated by the AI-based agent. The resource allocation data and the expected resource allocation data structure can be stored as records within the distributed database (e.g., transactions maintained across nodes of the distributed database). In some implementations, the resource allocation data includes one or more transaction records stored across multiple blockchain nodes, and each transaction record includes an agent identifier, a timestamp, and/or a token usage amount.

In some implementations, the resource allocation data and/or expected resource allocation data structure is not available or accessible in a distributed database, but is rather accessed and/or generated as needed. The data monitoring platform can continuously collect operational metrics directly from executing AI agents through APIs, system monitoring tools, and so forth. The data monitoring platform can generate expected resource allocation data structures dynamically by using historical data to, for example, determine resource consumption patterns. In some implementations, the data monitoring platform accesses operational data through agents that periodically transmit reports that indicate performance indicators such as resource utilization metrics, task execution statistics, operational status, and so forth. The data monitoring platform can construct temporary data structures in volatile memory systems that aggregate operational metrics from multiple agents, identify deviations from expected patterns, and generate allocation threshold parameters based on current network conditions and agent performance distributions without requiring persistent storage in distributed databases.

The data monitoring platform can access a network topology data structure (e.g., a topology of parent/child relationships) that indicates communication between the multiple AI-based agents. The validator AI model subset can access the expected resource allocation data structure by filtering the records within the distributed or federated ledger network using the network topology data structure.

In operation 1604, the data monitoring platform can route the operational data for each of the multiple AI-based agents to a subset of a validator AI model set using a dimension set of the operational data against which to evaluate the operational data. The validator AI model set can be trained to test different dimensions. For example, the data monitoring platform can determine a dimension set of the operational data against which to evaluate the operational data. For each particular dimension in the dimension set, the data monitoring platform can identify the validator AI model subset configured to test the particular dimension, where each validator AI model within the validator AI model set is trained to test a different dimension.

The validator AI model subset can include at least one domain-specific model. The operational data for each of the multiple AI-based agents can be routed to the validator AI model subset trained on data sharing a common domain with one or more AI-based agents. The domain can indicate an area of knowledge, a data type, a type of task, and so forth. The validator AI model subset can be determined randomly or via a predefined schedule. For example, the data monitoring platform can establish a predefined schedule to rotate the validator AI model subset, such that the predefined schedule is established using time intervals and/or a number of AI-based agents evaluated. Using the predefined schedule, the data monitoring platform can determine the validator AI model subset. The data monitoring platform can dynamically select the validator AI model subset using dimension-specific features of a particular dimension being evaluated.

In operation 1606, the data monitoring platform can identify, using the validator AI model subset, an anomalous agent set within the multiple AI-based agents by comparing, for each AI-based agent, the resource allocation data against the one or more allocation thresholds defined in the expected resource allocation data structure, and determine, for each anomalous agent, that the resource allocation data fails to satisfy the one or more allocation thresholds. In some implementations, the one or more allocation thresholds correspond to one or more anomaly indicators, and the one or more anomaly indicators includes, for example, a network communication pattern, a reputation score, a task completion rate, a response time, a price threshold, or a resource usage amount.

External indicators such as legal proceedings participated in by an agent can be used. For example, the data monitoring platform can obtain, for each AI-based agent, additional operational data stored in an external database different from the distributed database. The additional operational data can include a legal proceeding associated with a particular AI-based agent or a provider agent associated with the particular AI-based agent. The validator AI model subset can identify the anomalous agent set by comparing, for each AI-based agent, the additional operational data against the one or more allocation thresholds defined in the expected resource allocation data structure.

In operation 1608, in response to identifying the anomalous agent set, the data monitoring platform can suspend non-compliant agents by generating a series of computer-executable instructions configured to block transmittal of additional operational data to each anomalous agent.

In operation 1610, the data monitoring platform can store, in the distributed database, a record set that includes a representation of the validator AI model subset, the series of computer-executable instructions, the anomalous agent set, and a timestamp of the identification of the anomalous agent set. To adjust the reputation score to reflect an audit, the data monitoring platform can, in response to identifying the anomalous agent set, adjust a reputation score associated with each anomalous agent, such that the reputation score indicates a degree of satisfaction of the resource allocation data with the one or more allocation thresholds.

Example Implementation of the Models of the Data Monitoring Platform

Figure 17:
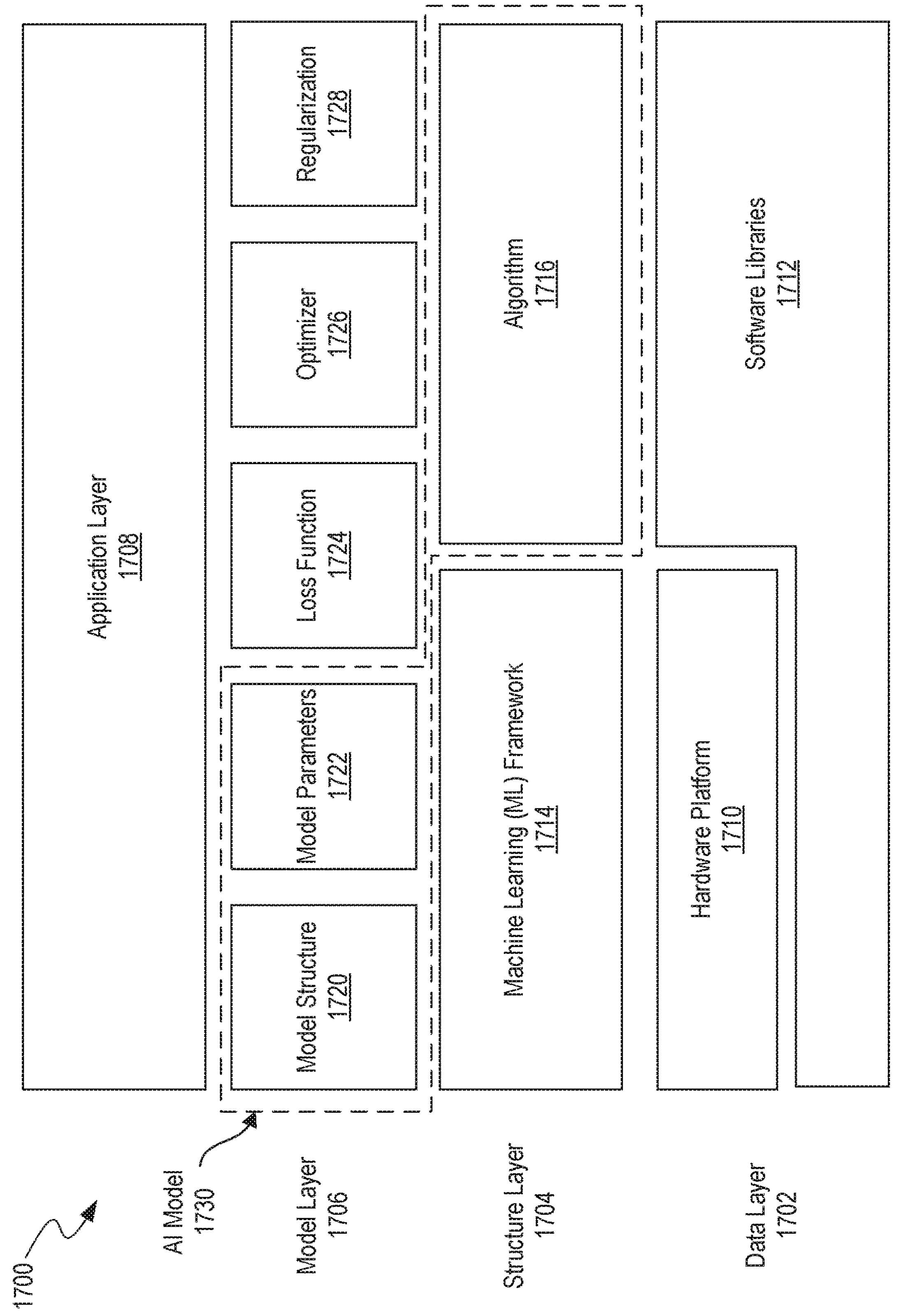
FIG. 17 illustrates a layered architecture of an AI system that can implement the machine learning models of a data monitoring platform, in accordance with some implementations of the present technology.

FIG. 17 illustrates a layered architecture of an AI system 1700 that can implement the ML models of the data monitoring platform of FIG. 1, in accordance with some implementations of the present technology. Example ML models can include the models executed by the data monitoring platform, such as distributed agent network 124. Accordingly, the distributed agent network 124 can include one or more components of the AI system 1700.

As shown, the AI system 1700 can include a set of layers, which conceptually organize elements within an example network topology for the AI system's architecture to implement a particular AI model. Generally, an AI model is a computer-executable program implemented by the AI system 1700 that analyses data to make predictions. Information can pass through each layer of the AI system 1700 to generate outputs for the AI model. The layers can include a data layer 1702, a structure layer 1704, a model layer 1706, and an application layer 1708. The algorithm 1716 of the structure layer 1704 and the model structure 1720 and model parameters 1722 of the model layer 1706 together form an example AI model. The optimizer 1726, loss function engine 1724, and regularization engine 1728 work to refine and optimize the AI model, and the data layer 1702 provides resources and support for application of the AI model by the application layer 1708.

The data layer 1702 acts as the foundation of the AI system 1700 by preparing data for the AI model. As shown, the data layer 1702 can include two sub-layers: a hardware platform 1710 and one or more software libraries 1712. The hardware platform 1710 can be designed to perform operations for the AI model and include computing resources for storage, memory, logic and networking, such as the resources described in relation to FIGS. 18 and 19. The hardware platform 1710 can process amounts of data using one or more servers. The servers can perform backend operations such as matrix calculations, parallel calculations, machine learning (ML) training, and the like. Examples of servers used by the hardware platform 1710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1710 can include computing resources, (e.g., servers, memory, etc.) offered by a cloud services provider. The hardware platform 1710 can also include computer memory for storing data about the AI model, application of the AI model, and training data for the AI model. The computer memory can be a form of random-access memory (RAM), such as dynamic RAM, static RAM, and non-volatile RAM.

The software libraries 1712 can be thought of suites of data and programming code, including executables, used to control the computing resources of the hardware platform 1710. The programming code can include low-level primitives (e.g., fundamental language elements) that form the foundation of one or more low-level programming languages, such that servers of the hardware platform 1710 can use the low-level primitives to carry out specific operations. The low-level programming languages do not require much, if any, abstraction from a computing resource's instruction set architecture, enabling them to run quickly with a small memory footprint. Examples of software libraries 1712 that can be included in the AI system 1700 include INTEL Math Kernel Library, NVIDIA cuDNN, EIGEN, and OpenBLAS.

The structure layer 1704 can include an ML framework 1714 and an algorithm 1716. The ML framework 1714 can be thought of as an interface, library, or tool that enables users to build and deploy the AI model. The ML framework 1714 can include an open-source library, an API, a gradient-boosting library, an ensemble method, and/or a deep learning toolkit that works with the layers of the AI system facilitate development of the AI model. For example, the ML framework 1714 can distribute processes for application or training of the AI model across multiple resources in the hardware platform 1710. The ML framework 1714 can also include a set of pre-built components that have the functionality to implement and train the AI model and enable users to use pre-built functions and classes to construct and train the AI model. Thus, the ML framework 1714 can be used to facilitate data engineering, development, hyperparameter tuning, testing, and training for the AI model. Examples of ML frameworks 1714 that can be used in the AI system 1700 include TENSORFLOW, PYTORCH, SCIKIT-LEARN, KERAS, LightGBM, RANDOM FOREST, and AMAZON WEB SERVICES.

The algorithm 1716 can be an organized set of computer-executable operations used to generate output data from a set of input data and can be described using pseudocode. The algorithm 1716 can include complex code that enables the computing resources to learn from new input data and create new/modified outputs based on what was learned. In some implementations, the algorithm 1716 can build the AI model through being trained while running computing resources of the hardware platform 1710. This training enables the algorithm 1716 to make predictions or decisions without being explicitly programmed to do so. Once trained, the algorithm 1716 can run at the computing resources as part of the AI model to make predictions or decisions, improve computing resource performance, or perform tasks. The algorithm 1716 can be trained using supervised learning, unsupervised learning, semi-supervised learning, and/or reinforcement learning.

Using supervised learning, the algorithm 1716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of user request 404 in FIG. 4) from various source computing systems described in relation to FIGS. 1-16. Furthermore, training data can include pre-processed data generated by various engines of the data monitoring platform described in relation to FIGS. 1-16. The user may label the training data based on one or more classes and trains the AI model by inputting the training data into the algorithm 1716. The algorithm determines how to label the new data based on the labeled training data. The user can facilitate collection, labeling, and/or input via the ML framework 1714. In some instances, the user may convert the training data to a set of feature vectors for input to the algorithm 1716. Once trained, the user can test the algorithm 1716 on new data to determine if the algorithm 1716 is predicting accurate labels for the new data. For example, the user can use cross-validation methods to test the accuracy of the algorithm 1716 and retrain the algorithm 1716 on new training data if the results of the cross-validation are below an accuracy threshold.

Supervised learning can include classification and/or regression. Classification techniques include teaching the algorithm 1716 to identify a category of new observations based on training data and are used when input data for the algorithm 1716 is discrete. Said differently, when learning through classification techniques, the algorithm 1716 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 1716 is continuous. Regression techniques can be used to train the algorithm 1716 to predict or forecast relationships between variables. To train the algorithm 1716 using regression techniques, a user can select a regression method for estimating the parameters of the model. The user collects and labels training data that is input to the algorithm 1716 such that the algorithm 1716 is trained to understand the relationship between data features and the dependent variable(s). Once trained, the algorithm 1716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 1716 learns patterns from unlabeled training data. In particular, the algorithm 1716 is trained to learn hidden patterns and insights of input data, which can be used for data exploration or for generating new data. Here, the algorithm 1716 does not have a predefined output, unlike the labels output when the algorithm 1716 is trained using supervised learning. Said another way, unsupervised learning is used to train the algorithm 1716 to find an underlying structure of a set of data, group the data according to similarities, and represent that set of data in a compressed format. The data monitoring platform can use unsupervised learning to identify patterns in claim history (e.g., to identify particular event sequences) and so forth. In some implementations, performance of the data monitoring platform that can use unsupervised learning is improved because the incoming user request 404 or user log 504 is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remains in a group that has less or no similarities to another group. Examples of clustering techniques density-based methods, hierarchical based methods, partitioning methods, and grid-based methods. In one example, the algorithm 1716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like.

When using anomaly detection techniques, the algorithm 1716 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1716 include factor analysis, item response theory, latent profile analysis, and latent class analysis.

The model layer 1706 implements the AI model using data from the data layer and the algorithm 1716 and ML framework 1714 from the structure layer 1704, thus enabling decision-making capabilities of the AI system 1700. The model layer 1706 includes a model structure 1720, model parameters 1722, a loss function engine 1724, an optimizer 1726, and a regularization engine 1728.

The model structure 1720 describes the architecture of the AI model of the AI system 1700. The model structure 1720 defines the complexity of the pattern/relationship that the AI model expresses. Examples of structures that can be used as the model structure 1720 include decision trees, support vector machines, regression analyses, Bayesian networks, Gaussian processes, genetic algorithms, and artificial neural networks (or, simply, neural networks). The model structure 1720 can include a number of structure layers, a number of nodes (or neurons) at each structure layer, and activation functions of each node. Each node's activation function defines how the node converts data received to data output. The structure layers may include an input layer of nodes that receive input data, an output layer of nodes that produce output data. The model structure 1720 may include one or more hidden layers of nodes between the input and output layers. The model structure 1720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1722 represent the relationships learned during training and can be used to make predictions and decisions based on input data. The model parameters 1722 can weight and bias the nodes and connections of the model structure 1720. For instance, when the model structure 1720 is a neural network, the model parameters 1722 can weight and bias the nodes in each layer of the neural networks, such that the weights determine the strength of the nodes and the biases determine the thresholds for the activation functions of each node. The model parameters 1722, in conjunction with the activation functions of the nodes, determines how input data is transformed into desired outputs. The model parameters 1722 can be determined and/or altered during training of the algorithm 1716.

The loss function engine 1724 can determine a loss function, which is a metric used to evaluate the AI model's performance during training. For instance, the loss function engine 1724 can measure the difference between a predicted output of the AI model and the actual output of the AI model and is used to guide optimization of the AI model during training to minimize the loss function. The loss function may be presented via the ML framework 1714, such that a user can determine whether to retrain or alter the algorithm 1716 if the loss function is over a threshold. In some instances, the algorithm 1716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1726 adjusts the model parameters 1722 to minimize the loss function during training of the algorithm 1716. In other words, the optimizer 1726 uses the loss function generated by the loss function engine 1724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1726 used may be determined based on the type of model structure 1720 and the size of data and the computing resources available in the data layer 1702.

The regularization engine 1728 executes regularization operations. Regularization is a technique that prevents over- and under-fitting of the AI model. Overfitting occurs when the algorithm 1716 is overly complex and too adapted to the training data, which can result in poor performance of the AI model. Underfitting occurs when the algorithm 1716 is unable to recognize even basic patterns from the training data such that it cannot perform well on training data or on validation data. The optimizer 1726 can apply one or more regularization techniques to fit the algorithm 1716 to the training data properly, which helps constrain the resulting AI model and improves its ability for generalized application. Examples of regularization techniques include lasso (L1) regularization, ridge (L2) regularization, and elastic (L1 and L2 regularization).

The application layer 1708 describes how the AI system 1700 is used to solve problems or perform tasks. In an example implementation, the application layer 1708 can include a front-end user interface of the data monitoring platform.

Example Computing Environment of the Data Monitoring Platform

Figure 18:
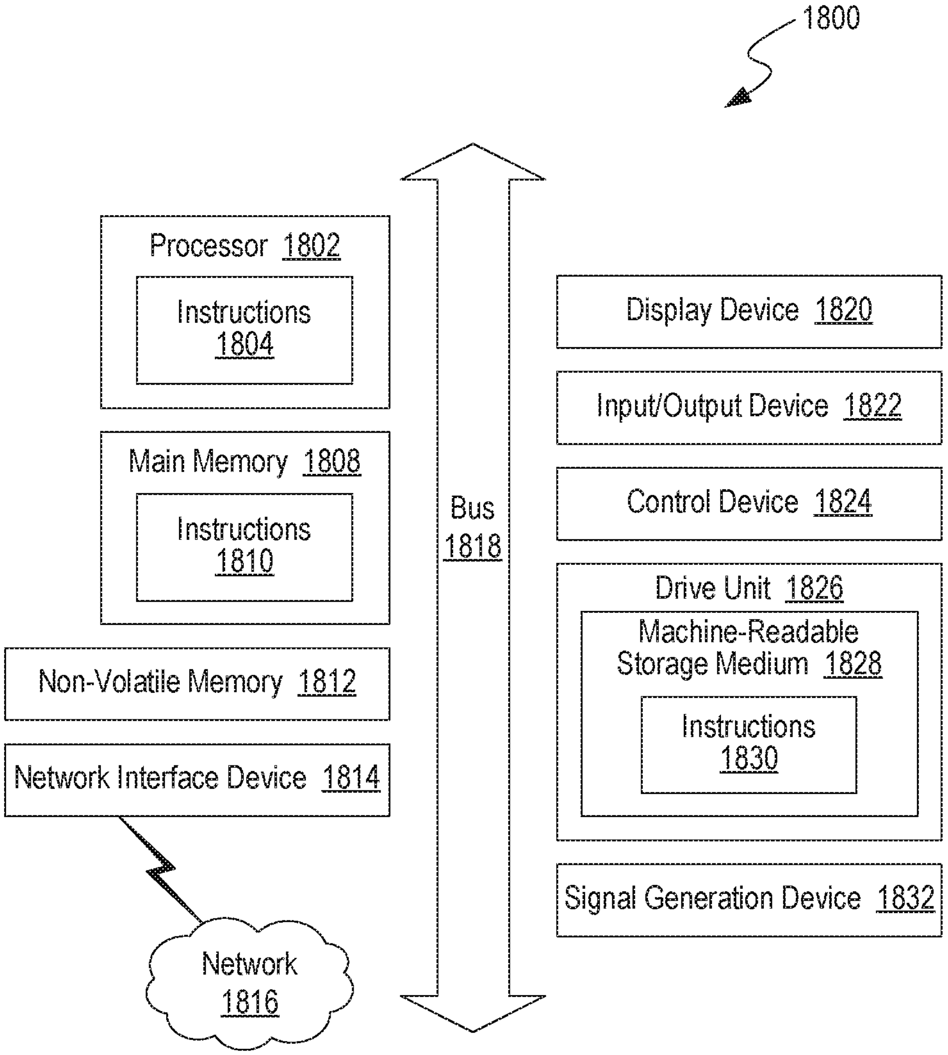
FIG. 18 is a block diagram showing some of the components typically incorporated in at least some of the computer systems and other devices on which the data monitoring platform operates in accordance with some implementations of the present technology.

FIG. 18 is a block diagram showing some of the components typically incorporated in at least some of the computer systems 1800 and other devices on which the disclosed system operates in accordance with some implementations of the present technology. As shown, an example computer system 1800 can include: one or more processors 1802, main memory 1808, non-volatile memory 1812, a network interface device 1814, video display device 1820, an input/output device 1822, a control device 1824 (e.g., keyboard and pointing device), a drive unit 1826 that includes a machine-readable medium 1828, and a signal generation device 1832 that are communicatively connected to a bus 1818. The bus 1818 represents one or more physical buses and/or point-to-point connections that are connected by appropriate bridges, adapters, or controllers. Various common components (e.g., cache memory) are omitted from FIG. 18 for brevity. Instead, the computer system 1800 is intended to illustrate a hardware device on which components illustrated or described relative to the examples of the figures and any other components described in this specification can be implemented.

The computer system 1800 can take any suitable physical form. For example, the computer system 1800 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1800. In some implementations, the computer system 1800 can be an embedded computer system, a system-on-chip (SOC), a single-board computer system (SBC) or a distributed system such as a mesh of computer systems or include one or more cloud components in one or more networks. Where appropriate, one or more computer systems 1800 can perform operations in real time, near real time, or in batch mode.

The network interface device 1814 enables the computer system 1800 to exchange data in a network 1816 with an entity that is external to the computing system 1800 through any communication protocol supported by the computer system 1800 and the external entity. Examples of the network interface device 1814 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1808, non-volatile memory 1812, machine-readable medium 1828) can be local, remote, or distributed. Although shown as a single medium, the machine-readable medium 1828 can include multiple media (e.g., a centralized/distributed database and/or associated caches and servers) that store one or more sets of instructions 1830. The machine-readable (storage) medium 1828 can include any medium that is capable of storing, encoding, or carrying a set of instructions for execution by the computer system 1800. The machine-readable medium 1828 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1810, 1830) set at various times in various memory and storage devices in computing device(s). When read and executed by the processor 1802, the instruction(s) cause the computer system 1800 to perform operations to execute elements involving the various aspects of the disclosure.

Figure 19:
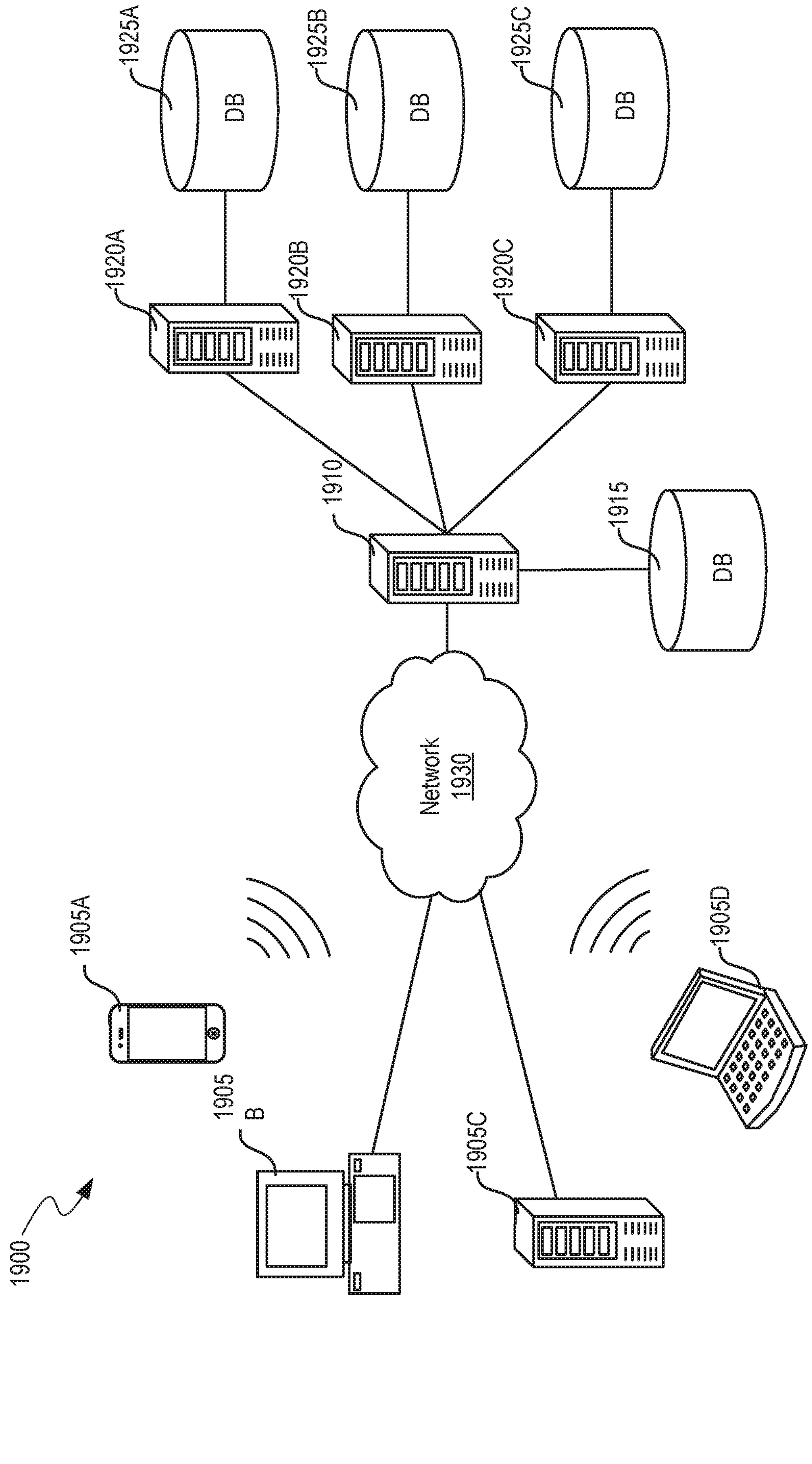
FIG. 19 is a system diagram illustrating an example of a computing environment in which the data monitoring platform operates in some implementations of the present technology.

FIG. 19 is a system diagram illustrating an example of a computing environment in which the disclosed system operates in some implementations. In some implementations, environment 1900 includes one or more client computing devices 1905A-D, examples of which can host the data monitoring platform of FIG. 1. Client computing devices 1905 operate in a networked environment using logical connections through network 1930 to one or more remote computers, such as a server computing device.

In some implementations, server computing device 1910 is an edge server which receives client requests and coordinates fulfillment of those requests through other servers, such as servers 1920A-C. In some implementations, server computing devices 1910 and 1920 comprise computing systems, such as the data monitoring platform of FIG. 1. Though each server computing device 1910 and 1920 is displayed logically as a single server, server computing devices can each be a distributed computing environment encompassing multiple computing devices located at the same or at geographically disparate physical locations. In some implementations, each server computing device 1920 corresponds to a group of servers.

Client computing devices 1905 and server computing devices 1910 and 1920 can each act as a server or client to other server or client devices. In some implementations, servers (1910, 1920A-C) connect to a corresponding database (1915, 1925A-C). As discussed above, each server computing device 1920 can correspond to a group of servers, and each of these servers can share a database or can have its own database. Databases 1915 and 1925 warehouse (e.g., store) information such as claims data, email data, call transcripts, call logs, policy data and so on. Though databases 1915 and 1925 are displayed logically as single units, databases 1915 and 1925 can each be a distributed computing environment encompassing multiple computing devices, can be located within their corresponding server, or can be located at the same or at geographically disparate physical locations.

Network 1930 can be a local area network (LAN) or a wide area network (WAN), but can also be other wired or wireless networks. In some implementations, network 1930 is the Internet or some other public or private network. Client computing devices 1905 are connected to network 1930 through a network interface, such as by wired or wireless communication. While the connections between server computing device 1910 and server computing devices 1920 are shown as separate connections, these connections can be any kind of local, wide area, wired, or wireless network, including network 1930 or a separate public or private network.

Conclusion

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system comprising:
at least one hardware processor; and
at least one non-transitory memory storing instructions, which, when executed by the at least one hardware processor, cause the system to:
access operational data for each of one or more AI-based agents that indicates resource allocation data associated with an execution of one or more tasks associated with the AI-based agent;
identify, using a validator AI model subset, an anomalous agent set within the one or more AI-based agents based on a comparison between respective resource allocation data against an expected resource allocation data structure that defines one or more criteria for resources allocated in association with the AI-based agent; and
generate one or more computer-executable instructions configured to prevent transmittal of additional operational data to each anomalous agent.

2. The system of claim 1, wherein the system is further caused to:
adjust a score associated with each anomalous agent, wherein the score indicates a degree of satisfaction of the resource allocation data with the one or more criteria.

3. The system of claim 1, wherein the system is further caused to:
cause generation of a record that identifies each anomalous agent; and
store the record within a persistent data structure.

4. The system of claim 1, wherein the system is further caused to:
maintain, using a plurality of blockchain nodes, synchronized copies of the operational data,
wherein each blockchain node is configured to validate new operational data prior to adding the new operational data to a distributed ledger.

5. The system of claim 1, wherein the system is further caused to:
cause generation of a notification that includes an identifier of each anomalous agent; and
causing transmission of the notification to a computing device.

6. The system of claim 1, wherein the one or more criteria includes one or more of: a network communication pattern, a reputation score, a task completion rate, a response time, a price threshold, or a resource usage amount.

7. A non-transitory, computer-readable storage medium comprising instructions thereon, wherein the instructions, when executed by at least one data processor of a system, cause the system to:
access operational data for each of one or more AI-based agents that indicates resource allocation data associated with an execution of one or more tasks associated with the AI-based agent;
identify, using a validator AI model subset, an anomalous agent set within the one or more AI-based agents based on a comparison between respective resource allocation data against an expected resource allocation data structure that defines one or more criteria for resources allocated in association with the AI-based agent; and generate one or more computer-executable instructions configured to prevent transmittal of additional operational data to each anomalous agent.

8. The non-transitory, computer-readable storage medium of claim 7, wherein the system is further caused to:

receive, from each AI-based agent, one or more collateral tokens; and confiscate at least a portion of the one or more collateral tokens associated with each anomalous agent within the anomalous agent set.

9. The non-transitory, computer-readable storage medium of claim 7, wherein the system is further caused to:

in response to identifying the anomalous agent set, adjust a reputation score associated with each anomalous agent, wherein the reputation score indicates a degree of satisfaction of the resource allocation data with one or more allocation thresholds.

10. The non-transitory, computer-readable storage medium of claim 7, wherein the validator AI model subset is rotated to interchange different validator AI models using a predefined schedule.

11. The non-transitory, computer-readable storage medium of claim 10, wherein the validator AI model subset includes at least one domain-specific model trained on data sharing a common domain with one or more AI-based agents.

12. The non-transitory, computer-readable storage medium of claim 7, wherein the expected resource allocation data structure is configured to be dynamically adjusted based on a volume of the one or more tasks.

13. The non-transitory, computer-readable storage medium of claim 7, wherein the system is further caused to:

store an identifier of each anomalous agent within a distributed database.

14. A computer-implemented method comprising:

accessing operational data for each of one or more AI-based agents that indicates resource allocation data associated with an execution of one or more tasks associated with the AI-based agent;

identifying, using a validator AI model subset, an anomalous agent set within the one or more AI-based agents based on a comparison between respective resource allocation data against an expected resource allocation data structure that defines one or more criteria for resources allocated in association with the AI-based agent; and generating one or more computer-executable instructions configured to prevent transmittal of additional operational data to each anomalous agent.

15. The computer-implemented method of claim 14, wherein the one or more criteria includes one or more of: a task completion rate, a response time, a price threshold, or a resource usage amount.

16. The computer-implemented method of claim 14, wherein the validator AI model subset includes at least one domain-specific model trained on data sharing a common domain with one or more AI-based agents within the one or more AI-based agents.

17. The computer-implemented method of claim 14, further comprising:

in response to identifying the anomalous agent set, adjusting a score associated with each anomalous agent, wherein the score indicates a degree of satisfaction of the resource allocation data with the one or more criteria.

18. The computer-implemented method of claim 14, further comprising:

storing, in a distributed database, a record set that includes one or more of: a representation of the validator AI model subset, the one or more computer-executable instructions, the anomalous agent set, or a timestamp associated with identifying the anomalous agent set.

19. The computer-implemented method of claim 14, further comprising:

obtaining, for each AI-based agent, additional operational data stored in an external database; and identifying the anomalous agent set by comparing, for each AI-based agent, the additional operational data against the one or more criteria.

20. The computer-implemented method of claim 14, further comprising:

in response to identifying the anomalous agent set, automatically triggering an alert to a computing device that identifies each anomalous agent.

* * * * *